United States Patent [19]

Yamaguchi et al.

[11] Patent Number: 5,023,366
[45] Date of Patent: Jun. 11, 1991

[54] SALICYLIC ACID COPOLYMERS AND THEIR METAL SALTS, PRODUCTION PROCESS THEREOF, COLOR-DEVELOPING AGENTS COMPRISING METAL SALTS OF THE COPOLYMERS, AND COLOR-DEVELOPING SHEETS EMPLOYING THE AGENTS

[75] Inventors: Keizaburo Yamaguchi, Kawasaki; Yoshimitsu Tanabe; Makoto Asano, both of Yokohama; Akihiro Yamaguchi, Kamakura, all of Japan

[73] Assignee: Mitsui Toatsu Chemicals, Incorporated, Tokyo, Japan

[21] Appl. No.: 111,763

[22] Filed: Oct. 23, 1987

[30] Foreign Application Priority Data

| Nov. 5, 1986 | [JP] | Japan | 61-262019 |
| Jan. 16, 1987 | [JP] | Japan | 62-6218 |
| Jan. 30, 1987 | [JP] | Japan | 62-18472 |
| Jan. 31, 1987 | [JP] | Japan | 62-19672 |
| Jan. 31, 1987 | [JP] | Japan | 62-19673 |
| May 11, 1987 | [JP] | Japan | 62-112296 |
| May 11, 1987 | [JP] | Japan | 62-112297 |
| May 22, 1987 | [JP] | Japan | 62-123864 |
| Jun. 4, 1987 | [JP] | Japan | 62-139026 |

[51] Int. Cl.$^5$ .............................. C07C 69/88
[52] U.S. Cl. .................................. 560/71; 560/68; 502/475; 502/477
[58] Field of Search .................. 560/71, 68; 562/475, 562/477

[56] References Cited

U.S. PATENT DOCUMENTS

| Re. 29,316 | 7/1977 | Bargain et al. | 260/30.2 |
| 3,002,285 | 10/1961 | Wahl et al. | 73/356 |
| 3,129,105 | 4/1964 | Berry et al. | 106/55 |
| 3,658,764 | 4/1972 | Bargain et al. | 260/78 UA |
| 3,669,390 | 6/1972 | Nielson | 248/42 |
| 3,695,903 | 10/1972 | Telkes et al. | 99/192 |
| 3,774,450 | 11/1973 | Godsey | 73/358 |
| 3,826,141 | 7/1974 | Pickett et al. | 73/356 |
| 3,830,777 | 8/1974 | Burton | 260/37 N |
| 3,862,918 | 1/1975 | Laurent et al. | 260/37 N |
| 3,954,011 | 5/1976 | Mauske | 73/356 |
| 4,057,029 | 11/1977 | Seiter | 116/114 |
| 4,065,345 | 12/1977 | Progar et al. | 156/309 |
| 4,075,171 | 2/1978 | D'Alelio | 260/47 CP |
| 4,076,697 | 2/1978 | Forgo et al. | 260/78 UA |
| 4,114,926 | 9/1978 | Habib et al. | 282/27.5 |
| 4,116,937 | 9/1978 | Jones et al. | 528/170 |
| 4,144,284 | 3/1979 | Semanaz et al. | 260/857 PA |
| 4,173,684 | 11/1979 | Stolfo | 428/531 |
| 4,301,054 | 11/1981 | Buirley et al. | 260/29.4 |
| 4,339,207 | 7/1982 | Hof et al. | 374/160 |
| 4,388,362 | 6/1983 | Iwata et al. | 428/211 |
| 4,390,596 | 6/1983 | Laurent | 428/473.5 |
| 4,393,177 | 7/1983 | Ishii et al. | 524/422 |
| 4,398,753 | 8/1983 | Asano et al. | 282/27.5 |
| 4,433,104 | 2/1984 | Giles, Jr. | 525/180 |
| 4,435,560 | 3/1984 | Takahashi et al. | 528/170 |
| 4,469,452 | 9/1984 | Sharpless et al. | 374/160 |
| 4,526,838 | 7/1985 | Fujioka et al. | 428/458 |

List continue on next page.

FOREIGN PATENT DOCUMENTS

| 0253586 | 1/1988 | European Pat. Off. . |
| 2352674 | 12/1977 | France . |
| 1263234 | 2/1972 | United Kingdom . |
| 1440550 | 6/1976 | United Kingdom . |

Primary Examiner—Paul J. Killos
Attorney, Agent, or Firm—Fisher, Christen & Sabol

[57] ABSTRACT

Disclosed herein are salicylic acid copolymers having a weight average molecular weight of 500–10,000 and obtained (a) by condensing salicylic acid (i) with a benzyl alcohol (ii) and/or benzyl ether (iii) or a benzyl halide (iv) in the presence of an acid catalyst or (b) by reacting a co-condensation resin of (i) and (ii) and/or

U.S. PATENT DOCUMENTS

| | | | |
|---|---|---|---|
| 4,535,101 | 8/1985 | Lee et al. | 521/189 |
| 4,598,115 | 7/1986 | Fujioka et al. | 524/376 |
| 4,599,396 | 7/1986 | Takekoshi et al. | 528/185 |
| 4,620,941 | 11/1986 | Yoshikawa et al. | 252/408 |
| 4,634,588 | 1/1987 | Postle et al. | 424/48 |
| 4,637,896 | 1/1987 | Shannon | 252/299 |
| 4,691,025 | 9/1987 | Domeier et al. | 548/521 |
| 4,707,316 | 11/1987 | Fujioka et al. | 264/135 |
| 4,725,642 | 2/1988 | Gannett et al. | 524/600 |
| 4,729,671 | 3/1988 | Asano et al. | 374/160 |
| 4,737,568 | 4/1988 | Stenzenberger | 528/170 |
| 4,777,237 | 10/1988 | Dien et al. | 528/322 |
| 4,783,521 | 11/1988 | Yamaguchi et al. | 560/71 |
| 4,831,102 | 5/1989 | Yamaya et al. | 528/170 |
| 4,938,753 | 8/1963 | Asano et al. | 282/27.5 |

(iii) with (iv) or (c) by reacting a co-condensation resin of (i) and (ii) and/or (iii) or (iv) with a styrene derivative in the presence of an acid catalyst; multivalent metal salts of the salicylic acid copolymers; color-developing agents comprising the multivalent metal salts; and color-developing sheets suited for pressure-sensitive copying paper and comprising the color-developing agents. Their production processes are also disclosed.

28 Claims, 2 Drawing Sheets

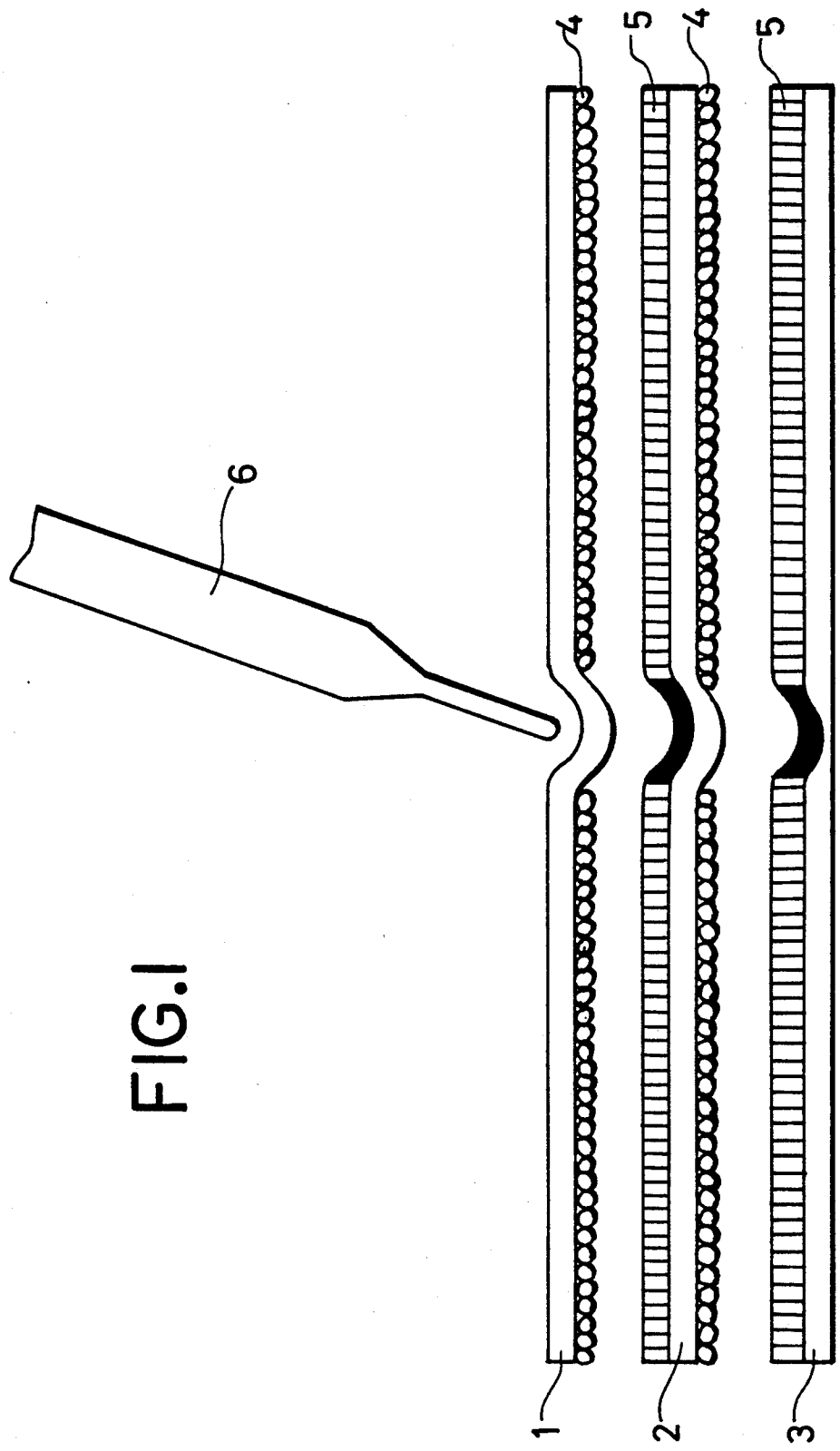

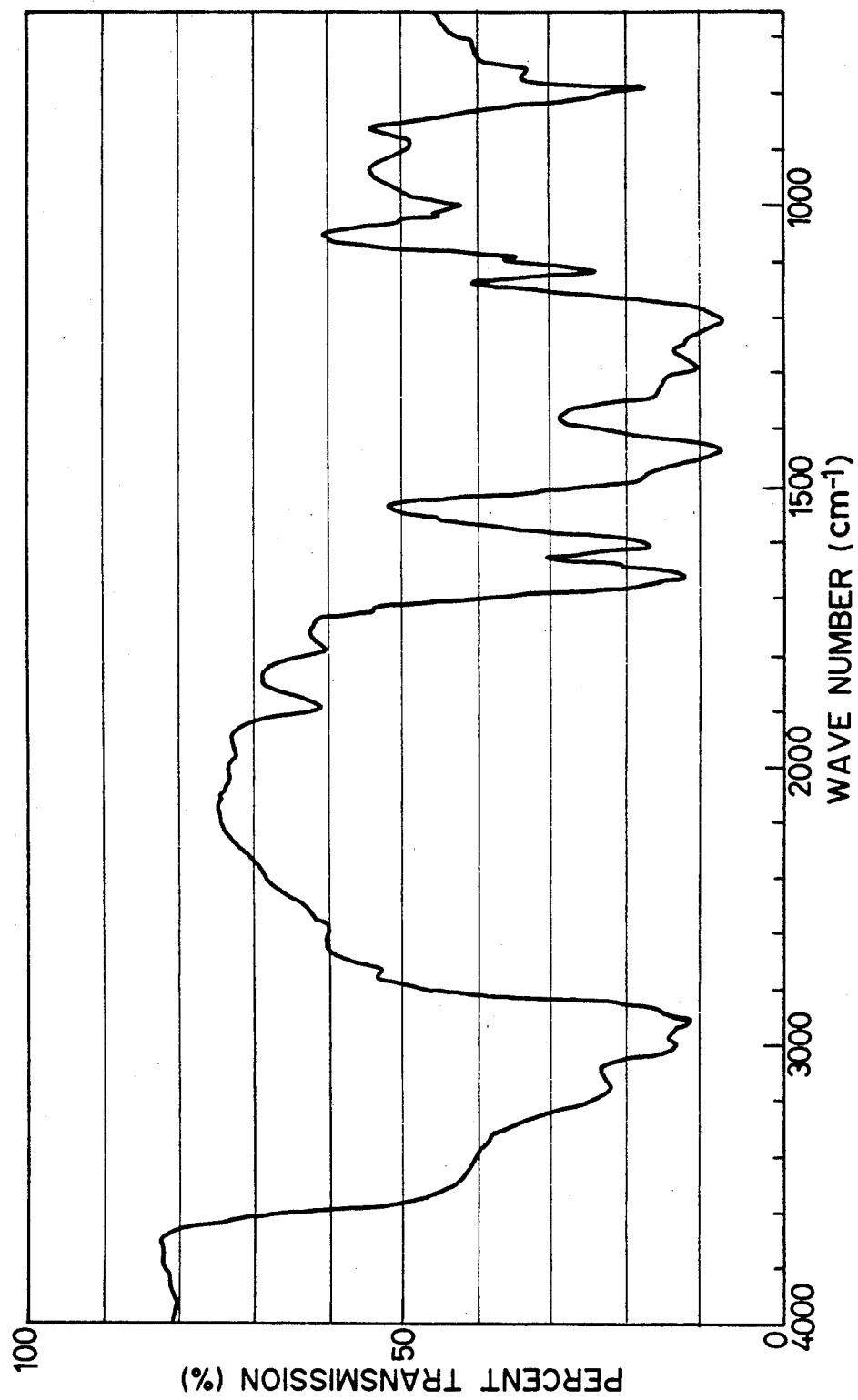

SALICYLIC ACID COPOLYMERS AND THEIR METAL SALTS, PRODUCTION PROCESS THEREOF, COLOR-DEVELOPING AGENTS COMPRISING METAL SALTS OF THE COPOLYMERS, AND COLOR-DEVELOPING SHEETS EMPLOYING THE AGENTS

BACKGROUND OF THE INVENTION

1) Field of the Invention

This invention relates to novel salicylic acid resins and metal salts thereof, color-developing agents containing the metal salts as effective components and suited for pressure-sensitive copying paper, as well as color-developing sheets making use of the color-developing agents and suited for use in pressure-sensitive copying paper.

2) Description of the Prior Art

Pressure-sensitive copying paper sheets are also called carbonless copying paper sheets. They produce a color by mechanical or impactive pressure, for example, by writing strokes or typewriter impression, thereby allowing to make a plurality of copies at the same time. Among such pressure-sensitive copying paper sheets, there are those called "transfer type copying paper sheets", those called "self-contained copying paper sheets", etc. Their color-producing mechanisms are each based on a color-producing reaction between an electron-donating colorless dyestuff precursor and an electron-attracting color-developing agent. Taking a pressure-sensitive copying paper sheet of the transfer type by way of example, it will be described with reference to FIG. 1 which is a schematic cross-sectional view showing the structure of the exemplary pressure-sensitive copying paper sheet.

The back sides of a CB-sheet 1 and CF/CB-sheet 2 are coated with microcapsules 4 which have diameters of several micrometers to somewhat greater than 10 micrometers and have been obtained by dissolving a colorless pressure-sensitive dyestuff precursor in a non-volatile oil and then encapsulating the resultant solution with high-molecular films such as gelatin films. On the other hand, the front sides of the CF/CB-sheets 2 and a CF-sheet 3 are coated with a coating formulation containing a color-developing agent 5 which has such properties that upon contact with the pressure-sensitive dyestuff precursor, the color-developing agent 5 undergoes a reaction with the dyestuff precursor, thereby causing the dyestuff precursor to produce its color. In order to make copies, they are stacked in the order of the CB-sheet, (CF/CB-sheet), (CF/CB-sheet) and CF-sheet with the sides coated with the dyestuff precursor maintained in contiguous relation with the sides coated with the color-developing agent. The CF/CB-sheets are optional. When a pressure is applied locally by a ball-point pen 6 or a typewriter, the capsules 4 are ruptured there. As a result, the solution containing the pressure-sensitive dyestuff precursor is transferred to the color-developing agent 5, so that one or more copied records are obtained.

As electron-attracting color-developing agents, there have been proposed (1) inorganic solid acids such as acid clay and attapulgite, as disclosed in U.S. Pat. No. 4,173,684; (2) substituted phenols and diphenols, as disclosed in Japanese Patent Publication No. 9309/1965; (3) p-substituted phenol-formaldehyde polymers, as disclosed in Japanese Patent Publication No. 20144/1967; (4) metal salts of aromatic carboxylic acids, as disclosed in Japanese Patent Publication Nos. 10856/1974 and 1327/1977; etc. Some of them have already been employed actually.

As performance conditions which a color-developing sheet is supposed to satisfy, may be mentioned little yellowing during storage and upon exposure to radiant rays such as sunlight and good fastness of produced color marks so that they do not disappear or fade easily by radiant rays, water or a plasticizer, to say nothing of excellent color-developing ability not only right after its fabrication but also after its storage over a long period of time.

Color-developing agents, which have been proposed to date, and sheets coated with such conventional color-developing agents have both advantages and disadvantages in performance. For example, inorganic solid acids are inexpensive but adsorb gas and moisture in the air during storage. They hence result in yellowing of paper surfaces and reduced color-producing performance. Substituted phenols have insufficient color-producing ability and produced color marks have low color densities. Para-phenylphenol-novolak resins which are usually employed as p-substituted phenol-formaldehyde polymers have excellent color-producing ability, but their coated paper sheets undergo yellowing and produced color marks are faded significantly upon exposure to sunlight or during storage (especially, by nitrogen oxides in the air). In addition, metal salts of aromatic carboxylic acids are good in yellowing resistance but their color-producing ability at low temperatures, resistance to water or plasticizers and light fastness cannot still be considered sufficient.

SUMMARY OF THE INVENTION

A first object of this invention is to provide a novel copolymer which has excellent properties in flexibility, oxidation resistance, formability and moldability, etc. and can form multi-valent metal salts excellent as color-developing agents for pressure-sensitive copying paper.

A second object of this invention is to provide an excellent color-developing agent for pressure-sensitive copying paper, which is a metal-modified product composed of a multi-valent metal salt of the above copolymer or a molten mixture containing a multi-valent metal salt of the above copolymer.

A third object of this invention is to provide an excellent pressure-sensitive copying paper which makes use of the above color-developing agent.

The present invention therefore provides a copolymer comprising 5–40 mole % of structural units (I), 10–95 mole % of structural units (II) and 0–85 mole % of structural units (III) and having a weight average molecular weight of 500–10,000, each of said structural units (I) being coupled via the $\alpha$-carbon of one of said structural units (II) with the benzene ring of said one of said structural units (II), one or more of said structural units (II) being optionally coupled via the $\alpha$-carbon or $\alpha$-carbons thereof to the benzene ring or rings of another or other structural units (II), each of said structural units (III) being coupled via the $\alpha$-carbon thereof with the benzene ring of one of the structural units (II), and said structural units (I), (II) and (III) being represented respectively by the following formulae (I), (II) and (III):

Formula (I):

-continued

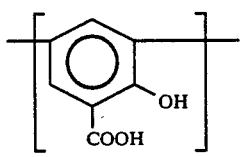

Formula (II):

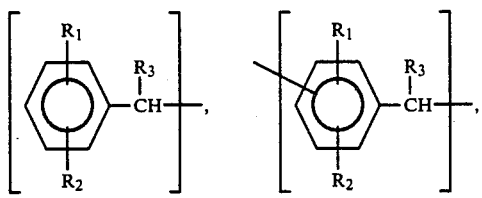

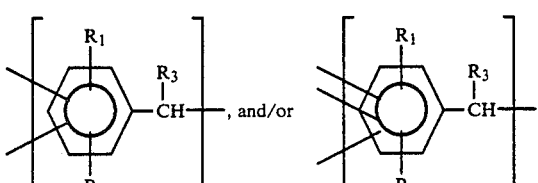

Formula (III):

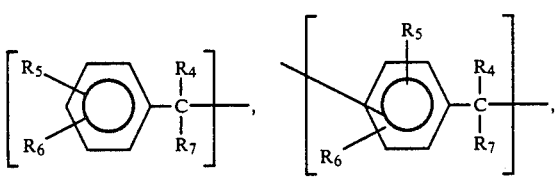

and/or

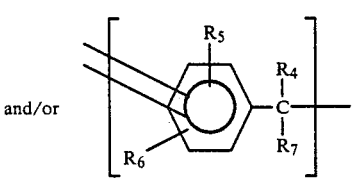

wherein $R_1$, $R_2$, $R_5$ and $R_6$ mean independently a hydrogen atom or a $C_{1-12}$ alkyl, aralkyl, aryl or cycloalkyl group, $R_3$ and $R_4$ denote independently a hydrogen atom or a $C_{1-4}$ alkyl group, and $R_7$ stands for a hydrogen atom or —$CH_2$—$R_8$ ($R_8$: hydrogen atom or methyl group); or a multi-valent metal salt of said copolymer, in which at least one multi-valent metal atom forms said multi-valent metal salt between carboxyl groups within the same molecule of said copolymer or between carboxyl groups in different molecules of said copolymer; a production process of the copolymer; a color-developing agent suited for pressure-sensitive copying paper and containing the multi-valent metal salt either as is or in the form of a molten mixture containing the multi-valent metal salt; as well as a color-developing sheet suited for pressure-sensitive copying paper and containing the color-developing agent distributed almost evenly on at least one side thereof.

The copolymer and their multi-valent metal salt thereof, both of which pertain to the present invention, are a novel high molecular compound and salt which have not been produced to date. Accordingly, the color-developing agent of this invention is also a novel color-developing agent.

The color-developing sheet making use of the novel color-developing agent of this invention has either comparable or superior color-producing properties compared with color-developing sheets making use of an inorganic solid acid or p-phenylphenol novolak resin. Compared with color-developing sheets making use of a metal salt of an aromatic carboxylic acid, the color-developing sheet making use of the novel color-developing agent of this invention has better color-producing properties at low temperatures. Further, color marks produced by the color-developing sheet making use of the novel color-developing agent of this invention have high resistance that they are not easily faded by water, plasticizers or light.

The present invention has a still further merit that a color-developing sheet, which has improved yellowing tendency upon exposure to sunlight, especially, significantly improved yellowing resistance to oxygen oxides in the air and is extremely advantageous in handling and storage, can be provided at a low cost.

BRIEF DESCRIPTION OF THE DRAWINGS

FIG. 1 illustrates the structure of a pressure-sensitive copying paper sheet; and FIG. 2 is an IR spectrum of a salicylic acid resin synthesized in Example 31.

DETAILED DESCRIPTION OF THE INVENTION AND PREFERRED EMBODIMENTS

The salicylic acid resins (copolymers) of this invention are novel resins which have not been produced to date. Namely, the resins of this invention may be divided preferably into (A) a class of salicylic acid resins obtained by condensing salicylic acid and a benzyl alcohol or benzyl ether or a mixture thereof, or a benzyl halide in the presence of an acid catalyst, containing 5-40 mole % of structural units represented by the formula (I) and 60-95 mole % of structural units represented by the formula (II) and having a weight average molecular weight of 500-10,000, each structural unit (I) being coupled via the α-carbon of one of said structural units (II) with the benzene ring of said one of said structural units (II), and one or more of said structural units (II) being coupled via the α-carbon or α-carbons thereof to the benzene ring or rings of another or other structural units (II); and (B) another class of salicylic acid resins obtained by condensing in the presence of an acid catalyst a benzyl halide or styrene derivative with a co-condensation product which has in turn been obtained by condensing salicylic acid and the above benzyl compound in the presence of an acid catalyst, containing 5-35 mole % of structural units represented by the structural formula (I), 10-85 mole % of structural units represented by the structural formula (II) and 4-85 mole % of structural units represented by the structural formula (III) and having a weight average molecular weight of 500-10,000, each structural unit (I) being coupled via the α-carbon of one of said structural units (II) with the benzene ring of said one of said structural units (II), one or more of said structural units (II) being optionally coupled via the α-carbon or α-carbons thereof to the benzene ring or rings of another or other structural units (II) and each of said structural units (III) being coupled via the α-carbon thereof with the benzene ring of one of the structural units (II).

A detailed description will hereinafter be made of production processes of salicylic acid resins in the classes (A) and (B) and the like.

Class (A)

Salicylic acid resins belonging to this class can be obtained by condensing, in the presence of an acid catalyst, salicylic acid and a benzyl alcohol and/or benzyl ether represented by the following general formula (IV):

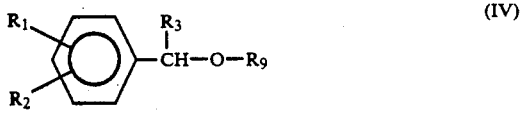

wherein $R_1$ and $R_2$ may be the same or different and mean independently a hydrogen atom or a $C_{1-12}$ alkyl, aralkyl aryl or cycloalkyl group, $R_3$ denotes a hydrogen atom or a $C_{1-4}$ alkyl group, and $R_9$ stands for a hydrogen atom, a $C_{1-4}$ alkyl group or

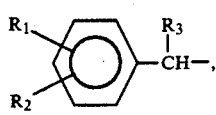

or a benzyl halide represented by the following general formula (V):

wherein $R_1$, $R_2$ and $R_3$ have the same meaning as in the formula (IV) and X denotes a halogen atom. (A)-1. Condensation between salicylic acid and the benzyl alcohol:

A description will be made firstly of condensation of a benzyl alcohol of the formula (IV) in which $R_9$ is a hydrogen atom.

It has conventionally been practiced routinely to obtain alkyl-substituted salicylic acids by reacting various alcohols with salicylic acid and alkylating the latter. Several processes have been known.

Included in such conventional processes are, for example, to react isobutanol with salicylic acid to obtain tert-butylsalicylic acid ["Jikken Kagaku Koza (Handbook of Experimental Chemistry)", 18, 30 (1958), The Maruzen Publishing Co., Ltd.] and to react 2 moles of phenyl ethanol with 1 mole of salicylic acid to obtain 5-[α-methyl-4'-(α-methylbenzyl)-benzyl]-salicylic acid (Japanese Patent Laid-Open Nos. 100493/1986 and 96449/1987).

These conventional processes are all related to the production of substituted salicylic acid compounds. It has not been known to produce a co-condensation resin of salicylic acid by using an alcohol as in the present invention. In the process of this invention, a benzyl alcohol is caused to exist in an excess amount so as to obtain a novel co-condensation resin between the benzyl alcohol and salicylic acid.

Namely, the present inventors have found that when a benzyl alcohol is caused to exist in an amount of 2 moles or more per mole of salicylic acid and reacted with salicylic acid in a molten state at a reaction temperature of 80° C. or higher by an acid catalyst, one or more benzyl groups can be introduced to one or both positions ortho to and/or the position para to the hydroxyl group of salicylic acid and moreover, excess benzyl alcohol undergoes successive condensation with the benzyl groups introduced in salicylic acid while undergoing concurrent self-condensation, thereby to form a resinous substance.

When a salicylic acid composition obtained as such a resin is modified by a metal and is then used as a color-developing agent, it exhibits superb miscibility with an oil in microcapsules on a CB-sheet and the velocity of color production at low temperatures is improved significantly compared with conventional products. Owing to the lack of any water solubility, the waterproofness of produced color marks is extremely good.

In the process for the production of such a useful salicylic acid resin and its metal-modified product, various starting benzyl alcohols are represented by the general formula (V) in which $R_9$ stands for H.

Although a hydrogen atom or a lower alkyl group having 1-4 carbon atoms is bonded to the α-position of the benzyl group, a hydrogen atom or methyl group is preferred. The nucleus of the benzyl group is either unsubstituted or substituted at o-, m- and/or p-positions with at least one $C_{1-12}$ alkyl, aralkyl, aryl or cycloalkyl group.

As various benzyl alcohols useful in the practice of this invention to afford co-condensation resins, may hence be mentioned benzyl alcohol, o-methylbenzyl alcohol, m-methylbenzyl alcohol, p-methylbenzyl alcohol, o-ethylbenzyl alcohol, m-ethylbenzyl alcohol, p-ethylbenzyl alcohol, o-isopropylbenzyl alcohol, p-n-propylbenzyl alcohol, p-tert-butylbenzyl alcohol, p-nonylbenzyl alcohol, o-phenylbenzyl alcohol, p-cyclohexylbenzyl alcohol, p-(benzyl)benzyl alcohol, p-(α-methylbenzyl)benzyl alcohol, p-(α,α-dimethyl)-benzyl alcohol, 2,3-dimethylbenzyl alcohol, 2,4-dimethylbenzyl alcohol, 2,5-dimethylbenzyl alcohol, 2,6-dimethylbenzyl alcohol, 3,4-dimethylbenzyl alcohol, 3,5-dimethylbenzyl alcohol, 2,4-diethylbenzyl alcohol, 3-methyl-4-ethylbenzyl alcohol, 3-(α-methylbenzyl)-4-methylbenzyl alcohol, 2,5-(dimethylbenzyl)benzyl alcohol, α-methylbenzyl alcohol, o-ethylbenzyl alcohol, α-n-propylbenzyl alcohol, α-isopropylbenzyl alcohol, α-n-butylbenzyl alcohol, o-methyl-α-methylbenzyl alcohol, p-methyl-α-methylbenzyl alcohol, m-methyl-α-methylbenzyl alcohol, p-methyl-α-ethylbenzyl alcohol, p-methyl-α-isopropylbenzyl alcohol, p-methyl-α-n-propylbenzyl alcohol, p-methyl-α-n-butylbenzyl alcohol, p-ethyl-α-methylbenzyl alcohol, m-ethyl-α-ethylbenzyl alcohol, o-ethyl-α-methylbenzyl alcohol, p-isopropyl-α-methylbenzyl alcohol, p-phenyl-α-methylbenzyl alcohol, p(α-methylbenzyl)-α-methylbenzyl alcohol, p-(α,α-dimethylbenzyl)α-methylbenzyl alcohol, 2,3-dimethyl-α-methylbenzyl alcohol, 2,4-dimethyl-α-methylbenzyl alcohol, 2,5-dimethyl-α-methylbenzyl alcohol, 3,4-dimethyl-α-methylbenzyl alcohol, 2-methyl-5-tert-butyl-α-methylbenzylalcohol, etc. It should however be borne in mind that the process of the present invention is not necessarily limited to the use of the above specific benzyl alcohols. Preferable benzyl alcohols include benzyl alcohol, p-methylbenzyl alcohol, α-methylbenzyl alcohol, p-methyl-α-methylbenzyl alcohol, and the like.

In the production of the co-condensation resin in accordance with the present invention, the benzyl alcohol may be used in an amount of 2-30 moles, preferably, 2-10 moles per mole of salicylic acid. So long as the benzyl alcohol is used within the above amount range, the weight average molecular weight of the resulting resin falls within a range of 500–10,000, preferably, 500–5,000 and the content of salicylic acid in the resultant resin composition ranges from 3 wt. % to 70 wt. %, preferably, from 5 wt. % to 50 wt. %.

The reaction temperature is required to be at least 80° C. The reaction velocity becomes extremely slow at any temperatures lower than 80° C. In order to shorten the reaction time as much as possible, a temperature range of 100°–240° C. is desired. The reaction time may range from 1 to 20 hours.

As the acid catalyst, inorganic and organic acids, especially, mineral acids, for example, hydrochloric acid, phosphoric acid and sulfuric acid, formic acid, Friedel-Crafts catalysts such as zinc chloride, stannic chloride and ferric chloride, and organic sulfonic acids such as methanesulfonic acid and p-toluenesulfonic acid may be used either singly or in combination. The catalyst may be used in an amount of about 0.01–20 wt. %, preferably, 0.5–5 wt. % based on the total weight of salicylic acid and the benzyl alcohol.

As a usual procedure for producing the resin useful in the practice of this invention, salicylic acid, the benzyl alcohol and the catalyst are added in their respective predetermined amounts at the same time and are then heated to conduct a reaction at a pre-determined temperature or the reaction is allowed to proceed while adding dropwise a portion of the benzyl alcohol in the course of the reaction. Water, which is formed as the reaction proceeds, is taken out of the reaction system by means of nitrogen gas.

After completion of the reaction, the contents are taken out and then cooled to obtain the intended product. Where the benzyl alcohol is used at a smaller molar ratio with a view toward obtaining a resin having a composition of a relatively low molecular weight, unreacted salicylic acid remains. As a method for the elimination of the remaining salicylic acid, it is practiced, for example, to wash the resin with warm water either as is or after dissolving the resin in an organic solvent such as methyl isobutyl ketone or cyclohexanone. (A).-2. Condensation between salicylic acid and benzyl ethers:

The benzyl ethers are other than those of the formula (IV) in which $R_9$ is a hydrogen atom.

A benzyl ether can introduce a benzyl group into certain aromatic compounds. In the case of benzyl propyl ether by way of example, it has been known to introduce its benzyl group into benzene, naphthalene, phenol and the like ["Jikken Kagaku Koza (Handbook of Experimental Chemistry)", 18, 84 (1958), The Maruzen Publishing Co., Ltd.]. These reactions make use of an extremely strong acid catalyst such as boron fluoride and moreover, compounds relatively prone to nucleophilic substitution have been chosen.

It has however not been known to react salicylic acid with a benzyl ether as in the present invention. This reaction have not yet been contemplated of, since difficulties have been expected to lie in reacting a benzyl ether with a compound, which is rather resistant to nucleophilic substitution due to inclusion of a carboxylic acid like salicylic acid, to introduce a benzyl or substituted benzyl group therein.

Upon production of the resin of this invention, an alcohol is formed through a dealcoholytic reaction. It is easily foreseeable that salicylic acid, one of the reactants, would yield a mixture of a salicylic ester and its resin through a reaction with the resulting alcohol in the presence of an acid catalyst and difficulties would be encountered in obtaining the intended product.

The present inventors have surprisingly found that when various benzyl ethers are each reacted with salicylic acid at a reaction temperature of 80° C. or higher in the presence of an acid catalyst by overcoming such difficult circumstances, the various benzyl groups can be introduced to positions ortho and/or para to the hydroxyl group of the salicylic acid without inducing any substantial side reactions such as corresponding esterifications. It has also been found that when a benzyl ether is used in an excess amount, the excess portion of the benzyl ether undergoes condensation with the benzyl groups introduced in salicylic acid while undergoing its self-condensation reaction concurrently, thereby to form a resinous substance.

The condensation with the above-described benzyl ethers will next be divided into four cases for more detailed description.

(a) Benzyl alkyl ethers:

The benzyl alkyl ethers are represented by the formula (IV), in which $R_3$ means a hydrogen atom and $R_9$ denotes a $C_{1-4}$ alkyl group [p-methylbenzyl alkyl ethers will however be described in a subsequent item (b)]. So long as $R_9$ contains 4 or fewer carbon atoms and the reaction is performed at a temperature to be described subsequently, the reaction proceeds fast and no esterification occurs, thereby facilitating the provision of making a good resin. Where $R_9$ contains 4 carbon atoms, namely, $R_9$ is a butyl group, tert-butyl group tends to result in a slow reaction velocity.

As illustrative examples of the benzyl alkyl ether useful in the practice of this invention to afford a co-condensation resin, may therefore be mentioned benzyl methyl ether, benzyl ethyl ether, benzyl isopropyl ether, benzyl n-butyl ether, o-methylbenzyl methyl ether, o-methylbenzyl ethyl ether, o-methylbenzyl isobutyl ether, m-methylbenzyl methyl ether, m-methylbenzyl ethyl ether, m-methylbenzyl isopropyl ether, o-ethylbenzyl methyl ether, o-ethylbenzyl ethyl ether, o-ethylbenzyl isopropyl ether, p-ethylbenzyl methyl ether, p-ethylbenzyl ethyl ether, p-ethylbenzyl isopropyl ether, p-ethylbenzyl n-butyl ether, o-isopropylbenzyl ethyl ether, p-isopropylbenzyl ethyl ether, p-n-propylbenzyl ethyl ether, p-tertbutylbenzyl ethyl ether, p-tert-butylbenzyl isopropyl ether, p-tert-octylbenzyl ethyl ether, p-nonylbenzyl methyl ether, p-dodecylbenzyl methyl ether, p-phenylbenzyl methyl ether, o-phenylbenzyl isopropyl ether, p-cyclohexylbenzyl ethyl ether, p-($\alpha$-methylbenzyl)benzyl methyl ether, p-($\alpha$-methylbenzyl)benzyl ethyl ether, p-($\alpha,\alpha$-dimethylbenzyl)benzyl methyl ether, 2,3-dimethylbenzyl methyl ether, 2,4-dimethylbenzyl methyl ether, 2,5-dimethylbenzyl methyl ether, 2,6-dimethylbenzyl methyl ether, 3,4-dimethylbenzyl methyl ether, 3,5-dimethylbenzyl methyl ether, 2,4-diethylbenzyl methyl ether, 3,4-dimethylbenzyl ethyl ether, 3,5-dimethylbenzyl ethyl ether, 2,4-diethylbenzyl methyl ether, 2,3-dimethylbenzyl isopropyl ether, 2,4-dimethylbenzyl n-propyl ether, 3,4-dimethylbenzyl n-butyl ether, 2,4-dimethylbenzyl sec-butyl ether, 3,5-dimethylbenzyl n-amyl ether, 2,4-diethylbenzyl methyl ether, 3,5-diethylbenzyl isopropyl ether, 2,3-diethylbenzyl n-butyl ether, 2,4-diisopropylbenzyl methyl ether, 3,5-diisopropylbenzyl ethyl ether, 3-methyl-4-ethylbenzyl methyl ether, 3-methyl-5-tert-butylbenzyl methyl ether, 2-methyl-4-($\alpha$-methylbenzyl)-benzyl methyl ether, and so on. It should however be borne in mine that the present invention is not necessarily limited to the use of such exemplary benzyl alkyl ethers.

The amount of the benzyl alkyl ether to be used in the production of the co-condensation resin and the weight average molecular weight and salicylic acid content of the resulting co-condensation resin are similar to those mentioned above with respect to the benzyl alcohol in (A) - 1. Similar reaction conditions, post-treatment and the like are also employed.

(b) p-Methylbenzyl alkyl ethers:

As exemplary p-methylbenzyl alkyl ethers, may preferably be mentioned p-methylbenzyl methyl ether, p-methylbenzyl ethyl ether, p-methylbenzyl n-propyl ether, p-methylbenzyl isopropyl ether, p-methylbenzyl n-butyl ether, p-methylbenzyl sec-butyl ether, p-methylbenzyl isobutyl ether, etc.

Reaction conditions for the production of a co-condensation resin from a p-methylbenzyl alkyl ether, for example, the amount of the p-methylbenzyl alkyl ether to be used, and the weight average molecular weight and salicylic acid content of the resulting co-condensation resin are similar to those mentioned above with respect to the benzyl alkyl ethers (a).

(c) α-Alkylbenzyl alkyl ethers:

These α-alkylbenzyl alkyl ethers are represented by the general formula (IV) in which $R_3$ and $R_9$ are independently a $C_{1-4}$ alkyl group.

So long as the carbon number of the O-bonded alkyl group is 4 or smaller in various α-alkylbenzyl alkyl ether and the reaction is performed at a temperature to be described subsequently, the reaction proceeds at a high velocity and no esterification takes place, so that a good resin is obtained. Where the O-bonded alkyl group contains 4 carbon atoms, namely, the O-bonded alkyl group is a butyl group, tert-butyl group tends to result in a slow reaction velocity.

On the other hand, the alkyl group bonded to the α-position of the benzyl group is a $C_{1-4}$ alkyl group, preferably, a methyl or ethyl group from the industrial standpoint.

Illustrative examples of the α-alkylbenzyl alkyl ether useful in the practice of this invention to afford a co-condensation resin may therefore include α-methylbenzyl methyl ether, α-methylbenzyl ethyl ether, α-methylbenzyl isopropyl ether, α-methylbenzyl n-propyl ether, α-methylbenzyl n-butyl ether, α-ethylbenzyl methyl ether, α-ethylbenzyl ethyl ether, α-ethylbenzyl isopropyl ether, α-ethylbenzyl n-butyl ether, α-n-propylbenzyl methyl ether, α-isopropylbenzyl ethyl ether, α-n-butylbenzyl isopropyl ether, o-methyl-α-methylbenzyl methyl ether, p-methyl-α-methylbenzyl methyl ether, m-methyl-α-methylbenzyl methyl ether, p-methyl-α-methylbenzyl ethyl ether, p-methyl-α-methylbenzyl isopropyl ether, p-methyl-α-methylbenzyl n-propyl ether, p-methyl-α-methylbenzyl n-butyl ether, p-methyl-α-ethylbenzyl methyl ether, p-methyl-α-ethylbenzyl ethyl ether, p-methyl-α-ethyl-benzyl isopropyl ether, p-methyl-α-ethylbenzyl n-butyl ether, o-methyl-α-ethylbenzyl methyl ether, o-methyl-α-ethylbenzyl isopropyl ether, m-methyl-α-ethylbenzyl methyl ether, p-ethyl-α-methylbenzyl methyl ether, o-ethyl-α-ethylbenzyl ethyl ether, m-ethyl-α-n-propylbenzyl methyl ether, p-isopropyl-α-methylbenzyl methyl ether, o-isopropyl-α-methylbenzyl methyl ether, p-sec-butyl-α-methylbenzyl methyl ether, p-tert-butyl-α-methylbenzyl methyl ether, p-nonyl-α-methylbenzyl methyl ether, p-dodecyl-α-methylbenzyl methyl ether, p-phenyl-α-methylbenzyl methyl ether, o-phenylbenzyl-α-ethylbenzyl methyl ether, p-cyclohexyl-α-methylbenzyl methyl ether, p-(α-methylbenzyl)-α-methylbenzyl methyl ether, p-(α,α-dimethylbenzyl)-α-methylbenzyl methyl ether, 2,3-dimethyl-α-methylbenzyl methyl ether, 2,4-dimethyl-α-methylbenzyl methyl ether, 2,5-dimethyl-α-methylbenzyl methyl ether, 2,6-dimethyl-α-methylbenzyl methyl ether, 3,4-dimethyl-α-methylbenzyl methyl ether, 3,5-dimethyl-α-methylbenzyl methyl ether, 2,3-dimethyl-α-methylbenzyl ethyl ether, 2,4-dimethyl-α-methylbenzyl isopropyl ether, 2,5-dimethyl-α-methylbenzyl n-propyl ether, 2,6-dimethyl-α-methylbenzyl n-butyl ether, 3,4-dimethyl-α-methylbenzyl sec-butyl ether, 2,3-dimethyl-α-ethylbenzyl methyl ether, 2,4-dimethyl-α-ethylbenzyl methyl ether, 2,5-dimethyl-α-ethylbenzyl ethyl ether, 2,6-dimethyl-α-ethylbenzyl n-propyl ether, 3,4-dimethyl-α-ethylbenzyl isopropyl ether, 3,5-dimethyl-α-ethylbenzyl n-butyl ether, 2,4-dimethyl-α-propylbenzyl methyl ether, 2,4-diethyl-α-methylbenzyl methyl ether, 2,6-diethyl-α-methylbenzyl methyl ether, 3,4-diethylbenzyl-α-ethylbenzyl methyl ether, 3,5-diethylbenzyl-α-propylbenzyl isopropyl ether, 2,4-diisopropyl-α-methylbenzyl methyl ether, 2,4-diisopropyl-α-ethylbenzyl methyl ether, 2,6-diisopropyl-α-propylbenzyl methyl ether, 3,5-diisopropyl-α-butylbenzyl methyl ether, 2-methyl-4-ethyl-α-methylbenzyl methyl ether, 2-methyl-4-tert-butyl-α-methylbenzyl methyl ether, 2-methyl-4-(α-methylbenzyl)-α-methylbenzyl methyl ether, 2-methyl-4-(α,α-dimethylbenzyl)-α-methylbenzyl methyl ether, etc. It should however be borne in mind that the present invention is not necessarily limited to the use of the above specific α-alkylbenzyl alkyl ethers.

Reaction conditions for the production of a co-condensation resin from an α-alkylbenzyl alkyl ether, for example, the amount of the α-alkylbenzyl alkyl ether to be used, and the weight average molecular weight and salicylic acid content of the resulting co-condensation resin are similar to those mentioned above with respect to the benzyl alkyl ethers (a).

(d) Dibenzyl ethers:

These dibenzyl ethers are represented by the formula (IV) in which $R_9$ stands for

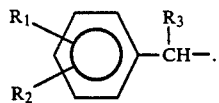

The substitutent bonded to the α-position of the benzyl group is a hydrogen atom or $C_{1-4}$ lower alkyl group. Of these, a hydrogen atom or a methyl group is preferred.

As various dibenzyl ethers capable of affording co-condensation resins according to this invention, may hence be mentioned dibenzyl ether, di(α-methylbenzyl) ether, di(m-methylbenzyl) ether, di(p-methylbenzyl) ether, di(o-ethylbenzyl) ether, di(m-ethylbenzyl) ether, di(p-ethylbenzyl) ether, di(o-isopropylbenzyl) ether, di(p-n-propylbenzyl) ether, di(p-tert-butylbenzyl) ether, di(p-nonylbenzyl) ether, di(o-phenylbenzyl) ether, di(p-cyclohexylbenzyl) ether, di[(p-benzyl)benzyl] ether, di[p-(α-methylbenzyl)benzyl] ether, dip-(α,α-dimethyl)benzyl]ether, di(2,3-dimethylbenzyl) ether, di(2,4-dimethylbenzyl) ether, di(2,5-dimethylbenzyl) ether, di(2,6-dimethylbenzyl) ether, di(3,4-dimethylbenzyl) ether, di(3,5-dimethylbenzyl) ether, di(2,4-diethylbenzyl) ether, di(3-methyl-4-ethylbenzyl) ether, di[3-(α-methylbenzyl)-4-methylbenzyl] ether, di[2,5-(dimethylbenzyl)benzyl] ether, di(α-methylbenzyl) ether, di(α-ethylbenzyl) ether, di(α-n-propylbenzyl) ether, di(α-isopropylbenzyl) ether, di(α-n-butylbenzyl) ether, di(o-methyl-α-methylbenzyl) ether, di(p-methyl-α-methylbenzyl ether, di(m-methyl-α-methylbenzyl) ether, di(p-methyl-α-ethylbenzyl) ether, di(p-methyl-α-isopropylbenzyl) ether, di(p-methyl-α-n-propylbenzyl) ether, di(p-methyl-α-n-butylbenzyl) ether, di(p ethyl-α-methylbenzyl) ether, di(m-ethyl-α-ethylbenzyl) ether, di(o-ethyl-α-methylbenzyl) ether, di(p-isopropyl-α-methylbenzyl) ether, di(p-phenyl-α-methylbenzyl) ether, di[p-(α-methylbenzyl)-α-methylbenzyl] ether, di[(p-(α,α-dimethylbenzyl)-α-methylbenzyl] ether, di(2,3-dimethyl-α-methylbenzyl) ether, di(2,4-dimethyl-α-methylbenzyl) ether, di(2,5-dimethyl-α-methylbenzyl) ether, di(3,4-dimethyl-α-methylbenzyl) ether, di(2-methyl-5-tertbutyl-α-methylbenzyl) ether, etc. It should however be borne in mind that the present invention is not necessarily limited to the use of the above specific dibenzyl ethers. Among these exemplary dibenzyl ethers, dibenzyl ether, di(p-methylbenzyl) ether, di(α-methylbenzyl) ether, di(p-methyl-α-methylbenzyl) ether and the like are preferred.

Upon production of a co-condensation resin, the dibenzyl ether may be used in an amount of 1.0–15 moles, preferably, 1.0–5 moles per mole of salicylic acid. Reaction conditions for the production of a co-condensation resin from a dibenzyl ether, for example, the amount of the dibenzyl ether to be used, and the weight average molecular weight and salicylic acid content of the resulting co-condensation resin are similar to those mentioned above with respect to the benzyl alkyl ethers (a).

Where the dibenzyl ether is used at a smaller molar ratio with a view toward obtaining a resin having a composition of a relatively low molecular weight, unreacted salicylic acid remains. As a method for the elimination of the remaining salicylic acid, it is practiced, for example, to wash the resin with warm water either as is or after dissolving the resin in an organic solvent such as benzene, toluene, monochlorobenzene, methyl isobutyl ketone or cyclohexanone. (A)-3: Condensation between salicylic acid and benzyl halides:

Specifically, this reaction is to obtain a co-condensation resin by causing a benzyl halide represented by the general formula (V) to react with salicylic acid in the presence of a Friedel-Crafts catalyst which has been described collectively as an acid catalyst.

It has been found that when a benzyl halide is caused to exist in an amount of 2.0 moles or more per mole of salicylic acid and they are reacted at a reaction temperature of 20° C. or higher by a Friedel-Crafts catalyst, the benzyl group or groups can be introduced to one or both positions ortho to and/or the position para to the hydroxyl group of salicylic acid and moreover, excess benzyl halide undergoes successive condensation with the benzyl groups introduced in salicylic acid while undergoing concurrent self-condensation, thereby to form a resinous substance.

In the starting benzyl halides, the nuclei of the benzyl groups are either unsubstituted or substituted with at least one $C_{1-12}$ alkyl, aralkyl, aryl or cycloalkyl group at an o- or m- position or the p-position and a hydrogen atom or $C_{1-4}$ lower alkyl group is contained at the α-position. As halogens, chlorine, bromine and fluorine may be mentioned with chlorine being preferred.

Illustrative examples of the benzyl halide may therefore include benzyl chloride, benzyl bromide, o-methylbenzyl chloride, m-methylbenzyl chloride, p-methylbenzyl chloride, α-ethylbenzyl chloride, m-ethylbenzyl chloride, p-ethylbenzyl chloride, o-isopropylbenzyl chloride, p-n-propylbenzyl chloride, p-tert-butylbenzyl bromide, p-nonylbenzyl chloride, o-phenylbenzyl fluoride, p-cyclohexylbenzyl chloride, p-(benzyl)benzyl chloride, p-(α-methylbenzyl)benzyl chloride, p-(α,α-dimethyl)benzyl chloride, 2,3-dimethylbenzyl fluoride, 2,4-dimethylbenzyl chloride, 2,5-dimethylbenzyl chloride, 2,6-dimethylbenzyl chloride, 3,4-dimethylbenzyl chloride, 3,5-dimethylbenzyl chloride, 2,4-diethylbenzyl chloride, 3-methyl-4-ethylbenzyl chloride, 3-(α-methylbenzyl)-4-methylbenzyl chloride, 2,5-(dimethylbenzyl)benzyl chloride, α-methylbenzyl chloride, α-ethylbenzyl bromide, α-isopropylbenzyl chloride, α-n-butylbenzyl chloride, o-methyl-α-methylbenzyl chloride, p-methyl-α-methylbenzyl chloride, m-methyl-α-methylbenzyl chloride, p-ethyl-α-methylbenzyl chloride, o-ethyl-α-methylbenzyl chloride, p-isopropyl-α-methylbenzyl chloride, p-phenyl-α-methylbenzyl chloride, p-(α-methylbenzyl)-α-methylbenzyl chloride, p-(α,α-dimethylbenzyl)-α-methylbenzyl chloride, 2,3-dimethyl-α-methylbenzyl chloride, 2,4-dimethyl-α-methylbenzyl chloride, 2,5-dimethyl-α-methylbenzyl chloride, 3,4-dimethyl-α-methylbenzyl chloride, 2-methyl-5-tert-butyl-α-methylbenzyl chloride, etc. It should however be borne in mind that the present invention is not necessarily limited to the use of the above specific dibenzyl halides. Among these exemplary benzyl halides, benzyl chloride, p-methylbenzyl chloride, α-methylbenzyl chloride, p-methyl-α-methylbenzyl chloride and the like are preferred.

In the production of co-condensation resins of this invention, the various benzyl halides may be used in an amount of 2–30 moles, preferably; 2–10 moles per mole of salicylic acid. If the benzyl halide is used in any mounts smaller than the lower limit, a metal-modified product of the resulting resin is somewhat insufficient in its miscibility with a non-volatile oil in microcapsules on a CB-sheet and in its water insolubility when the metal-modified product is used as a color-developing agent for pressure-sensitive copying paper. On the other hand, an amount greater than the upper limit result in a reduction to the relative proportion of salicylic acid, so that the density of a color to be produced will not reach a desired level. The weight average molecular weight of a resin produced by using a benzyl halide within the above range falls within a range of 500–10,000, preferably, 500–5,000.

As exemplary catalysts useful in the above reaction, may be mentioned Lewis acid catalysts such as ferric chloride, zinc chloride, aluminum chloride, stannic chloride, titanium tetrachloride and boron trifluoride; perfluoroalkanesulfonic acids known as super strong acids, for example, trifluoromethanesulfonic acid; and "Nafion H" (trade name; product of E. I. du Pont de Nemours & Co., Inc.) as a perfluoroalkanesulfonic acid resin. Among these, zinc chloride is particularly preferred. The catalyst may be used in an amount of 0.05–200 mole % based on salicylic acid, with 1–100 mole % being preferred from the economical viewpoint. In the process of this invention, the metal species of the catalyst employed in the reaction reacts with the salicylic acid resin when the catalyst is neutralized with a base in the reaction mixture subsequent to the reaction, whereby the metal species of the catalyst is obtained as the metal-modified product of the salicylic acid. This is also an advantageous feature of the process of this invention. This is economical because the catalyst is effectively used and its processing and/or treatment as a waste material is unnecessary.

In the above reaction, a solvent may also be used. Illustrative examples of such a solvent may include those inert to the reaction, for example, ethyl ether, ethylene glycol dimethyl ether, methylene chloride, 1,2-dichloroethane, acetic acid, propionic acid, carbon disulfide, nitromethane and the like.

These solvents may be used desirably in an amount of 30 or less times by volume/weight as much as the total weight of the starting materials from the economical viewpoint.

Upon practice of this reaction, the reaction temperature may be in a range of 20°–180° C., preferably, 50°–160° C. The reaction time may be 1–30 hours.

As a procedure for producing a resin by the above reaction, it is usual to charge all the starting materials at once and then to heat them in situ so as to react them at a predetermined temperature or as an alternative, to charge salicylic acid and the catalyst and then to conduct the reaction at a predetermined temperature while adding dropwise the other starting material, i.e., benzyl halide. Here, the time of the dropwise addition may preferably account for at least 50% of the overall reaction time and may usually range from 1 to 20 hours. When a solvent is used and the solvent is insoluble in water, water may be added to the reaction mixture after the reaction. After washing the reaction mixture with the water and allowing the resultant mixture to separate into two layers, the solvent may be distilled off to obtain the resin. As an alternative, the resin may be extracted out with a dilute aqueous alkali solution for use in the next step. Where the solvent is soluble in water, the reaction mixture may be poured into water and the resin may then be obtained as a precipitate.

Class (B)

Salicylic acid resins belonging to this class may be obtained by either one of the following processes (B)-1 and (B)-2.

(B)-1. Salicylic acid and the benzyl alcohol and/or benzyl ether represented by the general formula (IV) are condensed in the presence of an acid catalyst under substantially the same conditions as those employed in the case of the salicylic acid resins of the class (A) (hereinafter abbreviated as "first-stage reaction"), followed by further condensation with a benzyl halide represented by the general formula (VI):

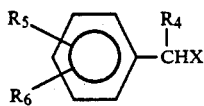
(VI)

Wherein $R_4$ stands for a hydrogen atom or a $C_1$-$C_4$ alkyl group, $R_5$ and $R_6$ mean independently a hydrogen atom or a $C_1$-$C_{12}$ alkyl, or aralkyl, aryl or cycloalkyl group and X denotes a halogen atom, in the presence of an acid catalyst (hereinafter abbreviated as "second-stage reaction").

(B)-2. Salicylic acid is condensed, in the presence of an acid catalyst and under substantially the same conditions as those employed in the production of the salicylic acid resins of the class (A), with the benzyl alcohol and/or benzyl ether represented by the general formula (IV) or a benzyl halide represented by the following general formula (V) (hereinafter abbreviated as "first-stage reaction"), followed by a reaction in the presence of an acid catalyst with a styrene derivative represented by the following general formula (VII):

wherein $R_4$ and $R_8$ mean independently a hydrogen atom or a methyl group and $R_6$ denotes a hydrogen atom or a $C_{1-4}$ alkyl group (hereinafter abbreviated as "second-stage reaction"). (B)-1. Use of the benzyl halide in the second-stage reaction:

Where the benzyl halide is used in the second-stage reaction, the benzyl alcohol or benzyl alkyl ether is used in an amount of 1.0–10 moles while the dibenzyl ether is used in an amount of 0.5–5 moles, both, per mole of salicylic acid in the first-stage reaction. Where both benzyl alcohol and dibenzyl ether are used in combination, the amount of the resulting mixture to be used is determined by converting the mixture into a benzyl alcohol corresponding to the composition of the mixture. The reactants are reacted in a molten state, at a reaction temperature of at least 80° C. and in the presence of an acid catalyst.

In the various benzyl alcohols, benzyl alkyl ethers and dibenzyl ethers useful in the practice of the above reaction, each benzyl group contains a hydrogen atom or a $C_{1-4}$ lower alkyl group at the α-position thereof. Hydrogen atom or methyl group is preferred from the industrial viewpoint. The nucleus of each benzyl group is either unsubstituted or substituted with at least one $C_{1-12}$ alkyl, aralkyl, aryl or cycloalkyl group at an o- or m- position or the p-position and a hydrogen atom. Preferably, the benzyl group is either unsubstituted or substituted with a methyl group at the p-position.

Illustrative examples of these various benzyl alcohols, various benzyl alkyl ethers and various dibenzyl ethers are identical to those described in detail with respect to the salicylic acid resins of the class (A).

As exemplary starting materials preferable from the industrial viewpoint out of the above-described specific starting materials, may be mentioned benzyl alcohol, p-methylbenzyl alcohol, α-methylbenzyl alcohol and p-methyl-α-methylbenzyl alcohol as benzyl alcohols; benzyl methyl ether, α-methylbenzyl methyl ether, p-methylbenzyl methyl ether and p-methyl-α-methylbenzyl methyl ether as benzyl alkyl ethers; and dibenzyl ether, di(p-methylbenzyl) ether, di(α-methylbenzyl) ether and di(p-methyl-α-methylbenzyl) ether as dibenzyl ethers.

Although the first-stage reaction may be carried out using a solvent inert to the reaction, the reaction is practiced usually without any solvent.

Other reaction conditions are similar to those employed above in (A)-1.

In the second-stage reaction, the benzyl halide represented by the general formula (VI) is reacted in the presence of a Friedel-Crafts catalyst with the co-condensation resin obtained by the first-stage reaction.

In this reaction, the aromatic substituents of the salicylic acid resin obtained by the first-stage reaction are converted into benzyl groups. In other words, the benzyl halide reacts with one or more benzene rings other than the skeletal benzene ring of salicylic acid.

In addition, an excess portion of the benzyl halide also reacts with aromatic substituents of the salicylic acid resin so that the molecular weight increases.

The benzyl halide useful here is practically identical to the aforementioned benzyl halide (V) as apparent from their formula (V) and (VI). The formula (VI) is used simply to show that the benzyl halide represented by the formula (VI) can serve as the structural units (III). Accordingly, the description on the benzyl halide (V) given in (A) - 3 applies equally to the benzyl halide (VI). The preferred examples of the benzyl halide (VI) are common to the benzyl halide (V). The benzyl halide may be used in an amount of 0.2–20 moles, preferably, 0.5–10 moles per mole of the salicylic acid used in the first-stage reaction. Principal merits which are derived from the use of such a benzyl halide include the lower price of the benzyl halide compared with the alcohol and/or ether employed in the first-stage reaction, in addition to an improvement to the performance as a color-developing agent. If one attempts to use the benzyl halide in a higher proportion for economical reasons alone, the relative proportion of salicylic acid will decrease and the density of a color to be produced will not reach a desired level. When the starting materials are used within their corresponding amount ranges described above, the weight average molecular weight of the resulting resin falls within a range of 500–10,000, preferably, 500–5,000.

As exemplary catalysts useful in the above second-stage reaction, may be mentioned Friedel-Crafts catalyst such as ferric chloride, zinc chloride, aluminum chloride, stannic chloride, titanium tetrachloride and boron trifluoride. Of these, zinc chloride is particularly preferred. The catalyst may be used in an amount of 0.05–200 mole % based on the salicylic acid resin obtained in the first-stage reaction. A range of 1–100 mole % is however preferred from the economical viewpoint. In this process of the present invention, the metal species of metal species of the catalyst employed in the reaction reacts with the salicylic acid resin when the catalyst is neutralized with a base subsequent to the reaction, whereby the metal species of the catalyst is obtained as the metal-modified product of the salicylic acid. This is also an advantageous feature of the process of this invention. This is economical because the catalyst is effectively used and its processing and/or treatment as a waste material is unnecessary.

In the above second-stage reaction, a solvent may also be used. Illustrative examples of such a solvent may include those inert to the reaction, for example, aliphatic hydrocarbons such as n-hexane, n-heptane, n-pentane and cyclohexane; ethers such as ethyl ether and ethylene glycol dimethyl ether; esters such as ethyl acetate and butyl acetate; halogenated hydrocarbon solvents such as methylene chloride, 1,2-dichloroethane, 1,1,2-trichloroethane, carbon tetrachloride, chloroform and monochlorobenzene; organic acids such as acetic acid and propionic acid; and in addition, carbon disulfide, nitromethane, acetonitrile, tetrahydrofuran and the like.

In view of economy, it is desirable to use such a solvent in an amount not more than 30 times by volume/weight the total weight of the starting materials.

The reaction temperature upon practice of the second-stage reaction may range from 20° C. to 180° C., preferably, from 50° C. to 160° C. The reaction time may be in a range of 1–30 hours.

As a procedure for producing the resin by the second-stage reaction, it is usual to add a catalyst to the salicylic acid resin obtained in the first-stage reaction and then to react the further starting material, i.e., the benzyl halide with the salicylic acid resin at a predetermined temperature while adding the benzyl halide dropwise. Here, the time of the dropwise addition may preferably account for at least 50% of the overall reaction time and may usually range from 1 to 20 hours. When a solvent is used and the solvent is insoluble in water, water may be added to the reaction mixture after the reaction. After washing the reaction mixture with the water and allowing the resultant mixture to separate into two layers, the solvent may be distilled off to obtain the resin. As an alternative, the resin may be extracted out with a dilute aqueous alkali solution for use in the next step. Where the solvent is soluble in water, the reaction mixture may be poured into water and the resin may then be obtained as a precipitate. (B)-2. Use of the styrene derivatives in the second-stage reaction:

When the benzyl alcohol and/or benzyl ether are used in the first-stage reaction, the procedure of the second-stage reaction making use of the styrene derivative is similar to the above-described first-stage reaction of (B)-1. When the benzyl halide is used, the reaction conditions are the same as those employed in (A)-3 except for the use of 1–10 moles of the benzyl halide per mole of the salicylic acid.

Next, the second-stage reaction comprises reacting the styrene derivative represented by the general formula (VII) with the co-condensation resin, which has been obtained in the first-stage reaction, in the presence of an acid catalyst.

In this reaction, the styrene derivative acts at the $\alpha$-position thereof on one or more aromatic substituents of the salicylic acid resin obtained in the first-stage reaction, thereby introducing the corresponding number of benzyl groups in the resin. In other words, the styrene derivative reacts at the $\alpha$-position thereof with one or more benzene rings other than the skeletal benzene ring of salicylic acid.

In addition, an excess portion of the styrene derivative also reacts with aromatic substituents of the salicylic acid resin and also with benzene rings of the styrene derivative bonded to such aromatic substituents, whereby the molecular weight increases.

As illustrative examples of the styrene derivative useful in the second-stage reaction, may be mentioned styrene, o-methylstyrene, m-methylstyrene, p-methylstyrene, o-ethylstyrene, p-ethylstyrene, ó-isopropylstyrene, m-isopropylstyrene, p-isopropylstyrene, p-tert-butylstyrene, $\alpha$-methylstyrene, $\beta$-methylstyrene and so on. It should however be borne in mind that the present invention is not necessarily limited to the use of the above exemplified specific styrene derivatives. It is economical styrene that is preferable from the industrial standpoint.

The styrene derivative may be used in an amount of 0.2–20 moles, preferably, 0.5–10 moles per mole of salicylic acid which is contained in the resin obtained in the first-stage reaction. If the styrene derivative is used in an amount smaller than the lower limit specified in the present invention, a color-developing agent containing a metal-modified product of the resulting resin has somewhat insufficient miscibility with a non-volatile oil in microcapsules on a CB-sheet of the above-mentioned copying paper and water insolubility. On the other hand, an amount greater than the upper limit results in a decrease to the relative proportion of salicylic acid and the density of a color to be produced will not reach a desired level. The weight average molecular weight of a resin produced by using the styrene derivative within the above-specified range falls within a range of 500–10,000, preferably, 500–5,000.

In this second-stage reaction, an acid catalyst is used.

Illustrative examples of the acid catalyst may include mineral acids such as hydrochloric acid, sulfuric acid and phosphoric acid, Friedel-Crafts catalysts such as ferric chloride, zinc chloride, aluminum chloride, stannic chloride, titanium tetrachloride and boron trifluoride, methanesulfonic acid, trifluoromethanesulfonic acid, etc. It is inexpensive sulfuric acid that is particularly preferable among these exemplary strong acid catalysts. The catalyst may be used in an amount of 0.05–200 wt. % based on the total weight of the salicylic acid resin obtained in the first-stage reaction and the styrene derivative, with 1–100 wt. % being preferably from the economical standpoint.

Further, a solvent may also be used in the second-stage reaction. Illustrative examples of the solvent may include those inert to the reaction, for example, aliphatic hydrocarbons such as n-hexane, n-heptane, n-pentane and cyclohexane; ethers such as ethyl ether and ethylene glycol dimethyl ether; esters such as ethyl acetate and butyl acetate; halogenated hydrocarbon solvents such as methylene chloride, 1,2-dichloroethane, 1,1,2-trichloroethane, carbon tetrachloride, chloroform and monochlorobenzene; organic acids such as acetic acid and propionic acid; ketones such as acetone and methyl ethyl ketone; and in addition, carbon disulfide, nitromethane, acetonitrile, tetrahydrofuran and the like.

In view of economy, it is desirable to use such a solvent in an amount not more than 30 times by volume/weight the total weight of the starting materials.

The reaction temperature upon practice of the second-stage reaction may range from −20° C. to 180° C., preferably, from 0° C. to 120° C. The reaction time may be in a range of 1–30 hours.

As a procedure for producing the resin by the second-stage reaction, it is usual to add a catalyst to an organic solvent solution of the salicylic acid resin obtained in the first-stage reaction and then to react the further starting material, i.e., the styrene derivative with the salicylic acid resin at a pre-determined temperature while adding the styrene derivative dropwise. Here, the time of the dropwise addition may preferably account for at least 50% of the whole reaction time and may usually range from 1 to 20 hours. When the solvent used is insoluble in water, water may be added to the reaction mixture after the reaction. After washing the resultant mixture with the water and allowing the resultant mixture to separate into two layers, the solvent may be distilled off to obtain the resin. As an alternative, the resin may be extracted out with a dilute aqueous alkali solution for use in the next step. Where the solvent is soluble in water, the reaction mixture may be poured into water and the resin may then be obtained as a precipitate.

Further condensation is effected with the benzyl halide or styrene derivative subsequent to the condensation between salicylic acid and benzyl alcohol or benzyl ether, with a view toward improving the miscibility between the non-volatile oil in microcapsules coated on the back sides of the CB-sheet 1 and CB/CF-sheet 2 and a color-developing agent coated on the front sides of the CB/CF-sheet 2 and the CF-sheet 3 composed of a multi-valent metal-modified product of such a salicylic acid resin upon application of pressures.

The color-developing agent composed of a multi-valent metal-modified product of the copolymer formed of structural units represented by the formulae (I), (II) and (III) respectively reacts promptly with a colorless pressure-sensitive dyestuff precursor dissolved in the non-volatile oil upon application of pressures, thereby bringing about a merit that vivid pressure-sensitive marks are formed instantaneously.

A description will next be made of multi-valent metal-modified products of the above-described salicylic acid resins. As described above, the term "multi-valent metal-modified product of a salicylic acid resin" as used herein means either a multi-valent metal salt of the salicylic acid resin or a molten mixture containing the multi-valent-metal salt.

Several known processes may be applied to produce a multi-valent metal salt of the salicylic acid resin described above. For example, it may be produced by reacting an alkali metal salt of the resin and a water-soluble multi-valent metal in water or a solvent in which the alkali metal salt and water-soluble multi-valent metal can be dissolved. Namely, the multi-valent metal salt can be formed by reacting the hydroxide, the carbonate or an alkoxide of an alkali metal with the resin to obtain the alkali metal salt of the resin, an aqueous solution thereof, an alcohol solution thereof or a water-alcohol mixed solution thereof and then reacting a water-soluble multi-valent metal salt further. More specifically, the copolymer is dispersed in an aqueous solution, alcohol solution or water-alcohol solution containing the hydroxide, the carbonate or an alkoxide of an alkali metal in an amount at least equivalent to carboxyl groups in the copolymer, whereby the copolymer is dissolved at 0°–100° C. A water-soluble multi-valent metal salt is then added as is or as an aqueous solution, alcohol solution or water-alcohol solution, and reacted with the resulting solution at 0°–100° C., so that the metal salt of the copolymer is obtained as a precipitate. It is desirable to react the water-soluble multi-valent metal salt in an amount of about 0.5–1 equivalent relative to the carboxyl groups in the copolymer.

In order to obtain a molten mixture containing a multi-valent metal salt of a salicylic acid resin, the resin is mixed with an organic carboxylic acid such as formic acid, acetic acid, propionic acid, valeric acid, caproic acid, stearic acid or benzoic acid, heating and reacting them in a molten state and then cooling the resultant mixture. In some instances, a basic substance, for example, ammonium carbonate, ammonium bicarbonate, ammonium acetate or ammonium benzoate may be added further, followed by heating and reaction in a molten state.

It may also be obtained by using the resin and the carbonate, oxide or hydroxide of a multi-valent metal, heating them together with a basic substance, e.g., the ammonium salt of an organic carboxylic acid such as ammonium formate, ammonium acetate, ammonium caproate, ammonium stearate or ammonium benzoate, reacting the resultant mixture in a molten state, and then cooling the reaction mixture.

When the metal-modified product of the resin is produced by heating and melting the resin and multi-valent metal salt, the melting is conducted usually at 100°–180°

C., and the reaction time is about 1-several hours although it varies depending on the composition of the resin, the melting temperature and the kind and amount of the multi-valent metal salt used. Further, the multi-valent metal salt may desirably be used as an organic carboxylic acid salt thereof or the carbonate, oxide or hydroxide thereof in an amount such that the multi-valent metal is contained in an amount of 1 wt. %–about 20 wt. % based on the total weight of the resin.

Although no specific limitation is imposed on the amount of the basic substance to be used, it may generally be used in an amount of 1–15 wt. % based on the total weight of the resin. When the basic substance is used, it is more preferable to used it after mixing same with the multi-valent metal salt in advance.

The softening points (as measured by the ring and ball softening point measuring method prescribed in JIS K-2548) of metal-modified resins produced by the heating and melting method fall within a range of 50°–120° C.

Illustrative examples of the metal of the metal-modified salicylic acid co-condensation resin of this invention may embrace metals other than alkali metals such as lithium, sodium and potassium. As preferable multi-valent metals, may be mentioned calcium, magnesium, aluminum, copper, zinc, tin, barium, cobalt, nickel and the like. Among these, zinc is particularly effective. Each of these multi-valent metals forms a multi-valent metal salt between carboxyl groups within the same molecule of the salicylic acid resin or between carboxylic groups in different molecules of the salicylic acid resin.

The color-developing agent of this invention may be used in combination with one or more of known color-developing agents, namely, inorganic solid acids such as activated clay, organic polymers such as phenolformaldehyde resin and metal salts of aromatic carboxylic acids without any problems or inconvenience.

The color developing agent of this invention may also be used in combination with at least one of the oxide, hydroxide and carbonate of a multi-valent metal selected from the group consisting of zinc, magnesium, aluminum, lead, titanium, calcium, cobalt, nickel, manganese and barium.

As a method for the fabrication of the color-developing sheet of this invention suitable for use in pressure-sensitive copying paper, any one of the following methods can be employed: (1) to apply a water-base coating formulation, which makes use of an aqueous suspension of the metal-modified product, to a base material such as paper web; (2) to incorporate the metal-modified product in a base paper web when the base paper web is produced; and (3) to coat a base material with a solution or suspension of the metal-modified product in an organic solvent.

Upon preparation of a coating formulation, kaolin clay or its analogous clay, calcium carbonate, starch, synthetic or natural latex, etc. are added to obtain the coating formulation with suitable viscosity and coating applicability. The proportion of the color-developing agent in the coating formulation may preferably be 10–70% of the whole solids. If the proportion of the color-developing agent is smaller than 10%, it is impossible to exhibit sufficient color-producing ability. Any proportions greater than 70% result in color-developing sheets having poor paper surface characteristics. The coating formulation may be applied at a rate of 0.5 g/m$^2$ or more, preferably, 1–10 g/m$^2$ in terms of dry weight.

In the color-developing sheet of this invention which is suitable for pressure-sensitive copying paper, it is possible to use the color-developing agent and coating formulation in smaller amounts. In addition, the concentration, viscosity, etc. of the coating formulation can be varied over relatively wide ranges. Both on-machine and off-machine coating operations are hence feasible. A great merit has hence be brought about not only from the viewpoint of performance but also from the standpoint of fabrication steps for pressure-sensitive copying paper.

By the present invention, there have been provided the novel salicylic acid resins and their multi-valent metal salts, color-developing agents composed of multi-valent metal-modified resins of the salicylic acid resins and suited for pressure-sensitive copying paper as well as color-developing sheets containing the color-developing agents and suited for pressure-sensitive copying paper.

The color-developing sheets of this invention are substantially free from yellowing by light and gases in the air such as nitrogen oxides. Produced color marks are stable to light, plasticizers and the like and are not substantially lowered in color density. They have good waterproofness. The present invention is therefore possible to broaden the utility of pressure-sensitive copying paper to such fields that conventional color-developing sheets are not suited owing to the requirement for long-term storage stability. Accordingly, this invention has extremely great practical significance.

The present invention will hereinafter be described in further detail by the following Examples.

The following methods were relied upon for the determination of performance of color-developing sheets for pressure-sensitive copying paper.

1. Color-producing speed and produced color density [(conducted in an air-conditioned room of 20° C. and 65% R.H. except for those indicated specifically as low-temperature color production (5° C., 60% R.H.)]:

Using (1) a commercial blue-color producing CB-sheet containing Crystal Violet Lactone (CVL) as a principal pressure-sensitive dyestuff precursor ("NW-40T", trade name; product of Jujo Paper Co., Ltd.) or (2) a commercial black-color producing CB-sheet containing 3-diethylamino-6-methyl-7-phenyl-aminofluoran (ODB) as a principal pressure-sensitive dyestuff precursor ("KW-40T", trade name; product of Jujo Paper Co., Ltd.) in the case of blue color production or black color production, a sample color-developing sheet (CF-sheet) coated with a water-base coating formulation was stacked with their coated sides maintained in contiguous relation. The thus-stacked pressure-sensitive copying paper was typed by an electronic typewriter to produce a color.

The reflectance of the sample color-developing sheet was measured by a "Σ-80 Color Difference Meter" (trade name; manufactured by Tokyo Denshoku Kogyo K.K.). The same color difference meter was also used in the subsequent measuring tests.) twice, namely, 1 minute and 30 seconds after the typing and 24 hours after the typing. The results are expressed in terms of Y value.

Y value is a value obtained in accordance with the double-field display method established by CIE (Commission Internationale de l'Eclairage). It is expressed by the following equation (the same definition also applies to Y values in the subsequent measuring tests):

$$Y = k \int_{380}^{780} P(\lambda) y(\lambda) \tau(\lambda) \, d\lambda$$

$$k = 100 / \int_{380}^{780} P(\lambda) y(\lambda) \, d\lambda$$

where $P(\lambda)$: distribution of standard light source.
$y(\lambda)$: color matching function in the double field.
$\tau(\lambda)$: spectral characteristics of each sample.

Regarding $P(\lambda)$ and $y(\lambda)$, reference may be had to JIS Z8722. 2. Light fastness of produced color marks:

Each sample color-developing sheet, which had produced a color in the manner described above in the testing method 1, was exposed for 2 hours (and for 4 hours) to light on a carbon arc fade meter (manufactured by Suga Testing Machine Co., Ltd.). After the exposure, its reflectance was measured by the "Σ-80 Color Difference Meter". The results are expressed in terms of Y-value.

The smaller the Y value and the smaller its difference from the Y value before the test, the less the fading by the light and the more preferable. 3. Plasticizer resistance:

DOP microcapsule coated paper sheets were prepared by forming microcapsules, which contained dioctyl phthalate (DOP) as a core substance, had an average capsule size of 5.0 μm, and were equipped with melamine-formaldehyde resin capsule walls, adding a small amount of a starch-type binder, applying the thus-prepared coating formulation by an air-knife coater on a high-quality paper web to achieve a dry coat weight of 5 g/m² and then drying the thus-coated paper web. One of the DOP microcapsule coated paper sheets and the color-developing sheet with color marks produced above in the testing method 1 were brought into contiguous relation with their coated sides facing each other. They were thereafter caused to pass under a linear pressure of 100 Kg/cm through a super calendar roll, so that DOP was allowed to penetrate uniformly into the colored surface.

One hour after the test, the reflectance of the color-developing sheet was measured by the "Σ-80 Color Difference Meter". The results are expressed in terms of Y value. The smaller the Y value and the smaller its difference from the Y value before the test, the better the plasticizer resistance of the produced color marks. 4. Waterproofness of produced color marks:

Each sample color-developing sheet, which had been colored by the testing method 1, was dipped for 2 hours in water. Density changes of the produced color marks were observed visually. 5. Yellowing property of color-developing sheets: (5-1) Yellowing by $NO_x$:

Following JIS L-1055 (Testing Method for $NO_x$ Gas Fastness of Dyed Materials and Dyes), each sample color-developing sheet was stored for 1 hour in a closed vessel of an atmosphere of $NO_x$ occurred by the reaction of $NaNO_2$ (sodium sulfite) and $H_3PO_4$ (phosphoric acid). The degree of its yellowing was investigated.

Upon an elapsed time of 1 hour after completion of the storage, the reflectance of the color-developing sheet was measured by the "Σ-80 Color Difference Meter". The measurement results are expressed in terms of WB value. The greater the WB value and the smaller its difference from the WB value before the test, the smaller the yellowing property in an $NO_x$ atmosphere. (5-2) Yellowing by light:

Each sample color-developing sheet was exposed for 4 hours to light on the carbon arc fade meter (manufactured by Suga Testing Machine Co., Ltd.). After the test, the reflectance of the sample color-developing sheet was measured by the "Σ-80 Color Difference Meter". The measurement results are expressed in terms of WB value. The greater the WB value and the smaller its difference from the WB value before the test, the smaller the yellowing property upon exposure to light.

EXAMPLE 1

(a) Synthesis of salicylic acid resin

Charged in a glass-made reactor were 27.6 g (0.2 of salicylic acid, 24.4 g (0.2 mole) of α-methylmole) benzyl alcohol, and 3.0 g of p-toluenesulfonic acid as a catalyst. Under a nitrogen gas stream, the reactants were subjected to condensation for 3 hours at a reaction temperature of 150°–160° C., followed by a dropwise addition of 48.8 g (0.4 mole) of α-methyl benzyl alcohol at the same temperature over 5 hours. The contents were then heated to 170°–180° C., at which they were aged for 3 hours. The contents were then immediately poured into an enameled shallow pan at the same temperature. When left over, the resinous reaction product became solid to obtain 86 g of a transparent resin of a light yellowish color. The weight average molecular weight of the thus-obtained resin was 750. Its softening point was measured by the ring and ball softening point measuring apparatus in accordance with JIS K-2548. It was found to be 54° C. As a result of an analysis by high-performance chromatography, the content of unreacted salicylic acid was found to be 5 wt. % or less. A tetrahydrofuran solution of the resin was titrated with a 1/10N aqueous solution of sodium carbonate to determine the content of salicylic acid moieties in the resin. As a result of subtraction of the unreacted portion, the content of the salicylic acid moieties was found to be 23.2 wt. %.

(b) Synthesis of a multi-valent metal-modified product of the salicylic acid resin Twenty-five grams of the above resin were charged in a flask and then heated to melt same at 150°–160° C. A mixture of 6.8 g of zinc benzoate and 4 g of ammonium bicarbonate, which had been prepared in advance, was then added gradually to the molten resin over 30 minutes. Thereafter, the contents were stirred for 1 hour at 155°–165° C. to complete their reaction. After the completion of the reaction, the molten resin was taken out of the flask, cooled and then ground, thereby obtaining 27 g of powder of a zinc benzoate modified product of the salicylic acid resin. The softening point of the zinc-modified product was measured by a ring and ball softening point measuring apparatus in accordance with the method prescribed in JIS K-2548. It was found to be 78° C. (c) Use of the zinc-modified product as a color-developing agent and its performance:

Using the zinc-modified product of the salicylic acid resin as a color-developing agent, it was dispersed in accordance with the following composition by a sand grinding mill so as to prepare a suspension.

|  | Parts by weight |
| --- | --- |
| Color-developing agent | 6 |
| 10% Aq. PVA solution (PVA: "Kuraray #117", product of Kuraray Co., Ltd.) | 3 |
| Water | 22.5 |

Then, a coating formulation of the following composition was prepared by using the above suspension of the color developing agent.

|  | Parts by weight |
|---|---|
| Suspension | 10 |
| Light calcium carbonate | 10 |
| Starch | 0.8 |
| Synthetic rubber latex | 0.8 |
| Water | 32.5 |

The coating formulation was applied on a high-quality paper web to give a dry coat weight of 5.0–5.5 g/m² and was then dried, thereby obtaining color-developing sheets.

Performance of the color-developing sheets for pressure-sensitive copying paper was determined in accordance with the measurement methods described above.

EXAMPLE 2

(a) Synthesis of salicylic acid resin

Charged in a glass-made reactor were 27.6 g (0.2 mole) of salicylic acid, 54 g (0.5 mole) of benzyl alcohol, and 0.8 g of anhydrous zinc chloride and 0.8 g of p-toluenesulfonic acid as catalysts. After causing the reactants to undergo condensation for 4 hours at 130°–140° C., the contents were heated further to 160° C. at which they were reacted for two hours. The internal temperature was cooled to 100° C. and 200 ml of toluene was added to dissolve the reaction mixture. Thereafter, 500 ml of warm water was added and the resultant mixture was stirred for 20 minutes at 95°–100° C., followed by removal of a water layer. That warm water washing and separation procedure was repeated twice to remove unreacted salicylic acid. The solvent was thereafter distilled out and the condensation product was cooled to obtain 70 g of a transparent resin of a pale brown color. Its softening point was 46° C. The weight average molecular weight of the resin was 680 and the content of salicylic acid moieties in the resin was 27.2 wt. %.

(b) Synthesis of a multi-valent metal-modified product of the salicylic acid resin Ten grams of the above resin were dispersed along with 0.9 g of caustic soda in 100 g of water. The resultant mixture was heated to 70° C. under stirring, whereby the resin was dissolved. While maintaining the temperature of the solution at 45°–50° C., a solution which had been obtained in advance by dissolving 1.7 g of anhydrous zinc chloride (purity: 90%) in 30 ml of water was then added dropwise over 30 minutes.

A white precipitate was formed. After stirring the reaction mixture for 2 hours at the same temperature, the precipitate was collected by filtration. Subsequent to its washing with water, it was dried to obtain 10.5 g of white powder. It was the zinc salt of the salicylic acid resin and the zinc content was 7.4%. (c) Use of the zinc-modified product of the salicylic acid and its performance:

In accordance with the same formulation and procedure as in Example 1, the zinc-modified product of the salicylic acid resin was formulated into a suspension and coating formulation. The coating formulation was applied on a high-quality paper web, followed by its drying to obtain color-developing sheets.

EXAMPLE 3

Using 2.8 g of nickel chloride hexahydrate (purity: 96%) instead of anhydrous zinc chloride in the procedure (b) of Example 2, 11 g of the nickel salt of the salicylic acid resin was obtained as pale green powder.

In accordance with the same formulation and procedure as in Example 2, the metal-modified product was formulated into a suspension and coating formulation, and color-developing sheets were obtained

EXAMPLE 4

Using 1.0 g of magnesium chloride (purity: 95%) instead of anhydrous zinc chloride in the procedure (b) of Example 2, 9.5 g of the magnesium salt of the salicylic acid resin was obtained as white powder. Color-developing sheets were then obtained in the same manner as in Example 1.

EXAMPLES 5–12

(a) Synthesis of salicylic acid resins

Salicylic acid resins were obtained separately in the same manner as in Example 1 except that the kind of the benzyl alcohol, its molar ratio to salicylic acid, the kind and amount of the catalyst used and reaction conditions for the condensation reaction were changed correspondingly as shown in Table 1. (b) Synthesis of multi-valent metal modified products of the salicylic acid resins:

Various metal-modified products shown in Table 2 were produced in the same manner as in Example 1 except that the kinds of the metal chloride and additive were changed in accordance with the resultant co-condensation resins of salicylic acid and the various benzyl alcohols.

Color-developing sheets were thereafter obtained in the same manner as in Example 1.

TABLE 1

| | SALICYLIC ACID-BENZYL ALCOHOL CO-CONDENSATION RESIN | | | | | | | |
|---|---|---|---|---|---|---|---|---|
| | Composition of reaction mixture | | | | | Synthetic resin | | |
| | Salicylic acid | Benzyl alcohol | | Catalyst | | Reaction | Weight average molecular | Softening | Salicylic acid content in |
| Ex. | Amount (mole) | Kind | Amount (mole) | Kind | Amount* used | conditions °C./hr | weight (Mw) | point (°C.) | resin (wt. %) |
| 5 | 0.1 | α-Ethylbenzyl alcohol | 0.1** + 0.4*** | Stannic chloride | 1.0 | 140–150/8 150–160/3 | 1400 | 72 | 17.5 |
| 6 | 0.1 | p-Methylbenzyl alcohol | 0.2** + 0.6*** | Methanesulfonic acid | 1.0 | 160–170/8 170–180/3 | 1850 | 67 | 9.8 |
| 7 | 0.1 | p-Methyl-α-methylbenzyl alcohol | 0.2** + 0.6*** | p-Toluenesulfonic acid | 3.0 | 140–160/8 170–180/3 | 880 | 64 | 21.2 |
| 8 | 0.1 | o-Methylbenzyl alcohol | " | p-Toluenesulfonic acid | 3.0 | 140–160/8 170–180/3 | 880 | 60 | 23.5 |

TABLE 1-continued
SALICYLIC ACID-BENZYL ALCOHOL CO-CONDENSATION RESIN

| | Composition of reaction mixture | | | | | | Synthetic resin | | |
|---|---|---|---|---|---|---|---|---|---|
| | Salicylic acid | Benzyl alcohol | | Catalyst | | Reaction conditions °C./hr | Weight average molecular weight (Mw) | Softening point (°C.) | Salicylic acid content in resin (wt. %) |
| Ex. | Amount (mole) | Kind | Amount (mole) | Kind | Amount* used | | | | |
| 9 | 0.1 | m-Methylbenzyl alcohol | " | p-Toluene-sulfonic acid | 3.0 | 140–160/8 170–180/3 | 680 | 52 | 23.2 |
| 10 | 0.1 | p-(α-Methylbenzyl) benzyl alcohol | " | p-Toluene-sulfonic acid | 3.0 | 140–160/8 170–180/3 | 1250 | 75 | 18.8 |
| 11 | 0.1 | 3,4-Dimethylbenzyl benzyl alcohol | " | p-Toluene-sulfonic acid | 3.0 | 140–160/8 170–180/3 | 1080 | 62 | 22.2 |
| 12 | 0.1 | p-Phenyl-α-methyl-benzyl alcohol | " | p-Toluene-sulfonic acid | 3.0 | 140–160/8 170–180/3 | 1100 | 71 | 18.2 |

*wt. % based on the whole reaction mixture.
**Amount charged initially.
***Amount added dropwise.

TABLE 2
MULTIVALENT METAL-MODIFIED SALICYLIC ACID RESIN

| Ex. | Salicylic acid resin Amount (g) | Metal modifier Kind | Amount (g) | Additive Kind | Amount (g) | Softening point of metal-modified resin (°C.) |
|---|---|---|---|---|---|---|
| 5 | 10 | Zinc hydroxide | 0.6 | — | — | 84 |
| 6 | 10 | Zinc propionate | 0.8 | — | — | 77 |
| 7 | 10 | Zinc benzoate | 2.5 | Ammonium bicarbonate | 2 | 86 |
| 8 | 10 | Zinc benzoate | 2.7 | Ammonium bicarbonate | 2.2 | 91 |
| 9 | 10 | Zinc benzoate | 2.7 | Ammonium bicarbonate | 2.2 | 86 |
| 10 | 10 | Zinc oxide | 0.55 | Ammonium benzoate | 1.5 | 90 |
| 11 | 10 | Zinc oxide | 0.65 | Ammonium bicarbonate | 2.0 | 87 |
| 12 | 10 | Zinc stearate | 4.2 | — | — | 65 |

EXAMPLES 13 & 14

Coating formulations of the following composition were separately prepared by using suspensions of the multi-valent metal-modified salicylic acid resins obtained respectively in Example 1 and in the procedure (c) of Example 2.

| | Parts by weight |
|---|---|
| Suspension | 10 |
| Zinc oxide | 2 |
| Calcium carbonate | 8 |
| Starch | 0.8 |
| Synthetic rubber latex | 0.8 |
| Water | 32.5 |

Those coating formulations were separately applied on high-quality paper webs to achieve a dry coat weight of 5.0–5.5 g/m$^2$, thereby obtaining color-developing sheets.

COMPARATIVE EXAMPLE 1

Charged in a glass-made reactor were 170 g of p-phenylphenol, 22.5 g of 80% para-formaldehyde, 2.0 g of p-toluenesulfonic acid and 200 g of benzene. The contents were heated with stirring and while distilling out the resulting water as an azeotropic mixture with benzene from the reaction system, they were reacted at 70°–80° C. for 2 hours. After the reaction, 320 g of a 10% aqueous solution of sodium hydroxide was added and benzene was distilled out by steam distillation. The reaction mixture was then cooled, followed by dropwise addition of dilute sulfuric acid. The precipitated p-phenylphenol-formaldehyde polymer was collected by filtration, washed with water and then dried, thereby obtaining 176 g of white powder.

Using the p-phenylphenol-formaldehyde polymer, color-developing sheets were obtained in the same manner as in Example 1.

COMPARATIVE EXAMPLE 2

Charged in a reactor equipped with a thermometer, reflux condenser, dropping funnel and stirrer were 9.4 g of phenol and 0.2 g of sulfuric acid. Then, 23.6 g of α-methylstyrene was added dropwise under stirring at 50° C. from a dropping funnel. After completion of the dropwise addition, the reaction mixture was aged for 5 hours and then poured into a dilute aqueous solution of sodium carbonate. The resultant mixture was separated to obtain an oil layer. The oil layer was then distilled in vacuo. At a vacuum level of 3–4 mmHg, 22 g of a fraction having a boiling point of at least 220° C. was obtained. Thereafter, 7.5 g of a 40% aqueous solution of caustic soda was added to the fraction, followed by dehydration under reflux of xylene. After the dehydration, the xylene mixture was transferred to an autoclave and carbon dioxide was then charged to 30 kg/cm$^2$ at 160° C. The contents were then reacted for 5 hours at the same temperature. After the reaction, the autoclave was cooled, the remaining gas was purged, the reaction mixture was extracted with hot water and the extract was neutralized with dilute sulfuric acid. As a result, crystals were caused to precipitate. Those crystals were then collected by filtration, followed by recrystallization from an aqueous acetic acid solution to obtain 8 g of 3,5-di(α,α-dimethylbenzyl)salicylic acid. A zinc salt was produced from the salicylic acid compound in the same manner as in Example 1. Using the zinc 3,5-di(α,α-dimethylbenzyl)salicylate thus produced, color-developing sheets were obtained in the same manner as in Example 1.

apparatus in accordance with the method prescribed in JIS K-2548. It was found to be 52° C. As a result of an analysis by high-performance liquid chromatography, the content of unreacted salicylic acid was found to be 1 wt. % or less. The weight average molecular weight of the resin was 780. A tetrahydrofuran solution of the resin was titrated with a 1/10N aqueous solution of

TABLE 3

PERFORMANCE TEST RESULTS OF COLOR-DEVELOPING SHEETS

| | | | | Blue color production (20° C., 65% HR) | | | |
|---|---|---|---|---|---|---|---|
| | WB value of untested sheet | NOx yellowing resistance of color-developing sheet (WB value) | Light yellowing resistance of color-developing sheet (WB value) | Color density produced by color-developing sheet (Y) | | Light fastness of produced color marks (Y) | |
| Ex. | | | | 1.5 minutes later | 24 hours later | 2 hours | 4 hours |
| 1 | 84.1 | 81.8 | 79.9 | 56.5 | 50.2 | 67.0 | 73.2 |
| 2 | 83.9 | 80.5 | 77.9 | 57.1 | 51.3 | 67.5 | 75.4 |
| 3 | 84.5 | 81.8 | 81.5 | 59.6 | 52.2 | 63.1 | 69.0 |
| 4 | 83.0 | 79.2 | 74.3 | 57.6 | 51.5 | 69.9 | 77.8 |
| 5 | 84.1 | 81.2 | 80.5 | 58.2 | 51.9 | 64.2 | 71.5 |
| 6 | 84.6 | 80.6 | 76.2 | 57.9 | 54.5 | 67.8 | 74.9 |
| 7 | 83.6 | 82.2 | 79.8 | 57.6 | 52.0 | 63.2 | 70.9 |
| 8 | 84.1 | 81.9 | 75.4 | 57.8 | 51.5 | 67.8 | 75.2 |
| 9 | 85.6 | 82.3 | 76.3 | 58.1 | 52.1 | 67.5 | 75.9 |
| 10 | 85.2 | 82.4 | 80.9 | 59.4 | 55.3 | 63.0 | 71.8 |
| 11 | 84.0 | 81.9 | 75.0 | 57.5 | 51.5 | 68.2 | 76.0 |
| 12 | 84.1 | 82.2 | 79.2 | 59.9 | 53.6 | 63.5 | 72.4 |
| 13 | 83.6 | 80.3 | 76.9 | 58.2 | 51.7 | 66.0 | 72.8 |
| 14 | 83.7 | 81.3 | 79.2 | 57.2 | 52.5 | 66.2 | 72.0 |
| Comp. Ex. 1 | 83.9 | 57.2 | 71.9 | 60.9 | 56.9 | 67.6 | 77.1 |
| Comp. Ex. 2 | 84.3 | 80.0 | 81.0 | 59.3 | 55.2 | 63.2 | 72.9 |

| | Blue color production (20° C., 65% HR) | | Low-temp. color production (5° C., 60% RH) | |
|---|---|---|---|---|
| | Plasticizer resistance of produced color marks (Y) | Water resistance of produced color marks | Color density produced by color-developing sheet (Y) | |
| Ex. | | | 1.5 minutes later | 24 hours later |
| 1 | 51.5 | Good | 58.4 | 50.8 |
| 2 | 52.1 | Good | 59.6 | 51.8 |
| 3 | 52.5 | Good | 61.3 | 51.0 |
| 4 | 54.5 | Good | 60.0 | 52.0 |
| 5 | 50.5 | Good | 61.2 | 52.2 |
| 6 | 58.3 | Good | 58.3 | 54.6 |
| 7 | 50.5 | Good | 59.5 | 52.5 |
| 8 | 50.2 | Good | 59.4 | 51.8 |
| 9 | 49.5 | Good | 62.2 | 53.8 |
| 10 | 52.0 | Good | 62.5 | 55.5 |
| 11 | 49.8 | Good | 60.8 | 52.0 |
| 12 | 52.6 | Good | 64.3 | 55.0 |
| 13 | 51.0 | Good | 61.5 | 53.5 |
| 14 | 53.2 | Good | 59.4 | 54.0 |
| Comp. Ex. 1 | 55.8 | Good | 65.4 | 57.8 |
| Comp. Ex. 2 | 59.6 | Faded out | 70.5 | 57.6 |

EXAMPLE 15

(a) Synthesis of salicylic acid resin

Charged in a glass-made reactor were 27.6 g (0.2 mole) of salicylic acid, 109.8 g (0.8 mole) of benzyl ethyl ether and 1.3 g of p-toluenesulfonic acid as a catalyst. The reactants were subjected to condensation for 3 hours at a reaction temperature of 160–170° C. The reactants were then heated to 180° C. and reacted for 2 hours, during which 34 g of ethanol was distilled out. The contents were then immediately poured into an enameled shallow pan at the same temperature. When left over, the resinous reaction product became solid to obtain 95 g of a transparent resin of a reddish brown color. The softening point of the resultant resin was measured by the ring and ball softening point measuring sodium carbonate to determine the content of salicylic acid moieties in the resin. As a result, it was found to be 22.6 wt. %.

(b) Synthesis of a multi-valent metal-modified product of the salicylic acid resin Ten grams of the above resin were charged in a flask and then heated to melt same at 150°–160° C. A mixture of 3.3 g of zinc benzoate and 2 g of ammonium bicarbonate, which had been prepared in advance, was then added gradually under stirring to the molten resin over 30 minutes. Thereafter, the contents were stirred for 1 hour at 155°–165° C. to complete their reaction. After the completion of the reaction, the molten resin was taken out of the flask, cooled and then ground, thereby obtaining 120 g of powder of a zinc benzoate modified product of the salicylic acid resin. The softening point of the zinc-modified product was measured by the ring and ball softening point measuring apparatus in accordance with the method prescribed in JIS K-2548. It was found to be 79° C.

(c) Use of the zinc-modified product as a color-developing agent

The zinc-modified product of the salicylic acid resin was used as a color-developing agent. In accordance with the same formulation and procedure as in Example 1, a suspension and coating formulation were prepared, and the coating formulation was applied on a high-quality paper web and was then dried to obtain color-developing sheets.

The performances of the color-developing sheets of Examples 15-30 are shown collectively in Table 6, together with those of the color-developing sheets of Comparative Examples 1 and 2.

EXAMPLE 16

(a) Synthesis of salicylic acid resin

Charged in a glass-made reactor were 27.6 g (0.2 mole) of salicylic acid, 83 g (0.5 mole) of 3,5-dimethylbenzyl ethyl ether, and 0.75 g of anhydrous zinc chloride as a catalyst. After causing the reactants to undergo condensation for 4 hours at 150°-160° C., the contents were heated further to 170° C. at which they were reacted for two hours. The internal temperature was cooled to 100° C. and 200 ml of toluene was added to dissolve the reaction mixture. Thereafter, 500 ml of warm water was added and the resultant mixture was stirred for 20 minutes at 95°-100° C., followed by removal of a water layer. That warm water washing and separation procedure was repeated two more times to remove unreacted salicylic acid. The solvent was thereafter distilled out and the condensation product was cooled to obtain 68 g of a transparent resin of a reddish brown color. Its softening point was 58° C. The weight average molecular weight of the resin was 650 and the content of salicylic acid moieties in the resin was found to be 24.3 wt. % by the titration method.

(b) Synthesis of a multi-valent metal-modified product of the salicylic acid resin Ten grams of the above resin were dispersed along with 0.65 g of caustic soda in 100 g of water. The resultant mixture was heated to 70° C. under stirring, whereby the resin was dissolved. While maintaining the temperature of the solution at 45°-50° C., a solution which had been obtained in advance by dissolving 1.2 g of anhydrous zinc chloride (purity: 90%) in 30 ml of water was then added dropwise over 30 minutes.

A white precipitate was formed. After continuously stirring the reaction mixture for 2 hours at the same temperature, the precipitate was collected by filtration. Subsequent to its washing with water, it was dried to obtain 9.8 g of white powder. It was the zinc salt of the salicylic acid resin and the zinc content was 5.0%.

(c) Use of the zinc-modified product as a color-developing agent

In accordance with the same formulation and procedure as in Example 1, the zinc-modified product of the salicylic acid resin was formulated into a suspension and coating formulation, and color-developing sheets were then obtained.

EXAMPLES 17-26

(a) Synthesis of salicylic acid resins

Salicylic acid resins were obtained separately in the same manner as in Example 1 except that the kind of the benzyl alcohol, its molar ratio to salicylic acid, the kind and amount of the catalyst used and reaction conditions for the condensation reaction were changed correspondingly as shown in Table 4. The softening points and weight average molecular weights of the resultant resins and the contents of salicylic acid moieties in the resins are also shown in Table 4.

(b) Synthesis of multi-valent metal-modified products of the salicylic acid resins The resins obtained in the above procedure (a) were separately modified by using their corresponding metal modifiers and reaction conditions shown in Table 5, thereby obtaining zinc-modified salicylic acid resins whose softening points are given in Table 5.

(c) Use of the zinc-modified salicylic acid resins as color-developing agents

Using the metal-modified products shown in Table 5 separately, color-developing sheets were obtained in the same manner as in Example 15.

TABLE 4

SYNTHESIS OF VARIOUS SALICYLIC ACID RESINS

| | Salicylic acid Amount used (mole) | Benzyl alkyl ether Kind | Amount used (mole) | Catalyst Kind | Amount* used | Reaction conditions °C./hr | Co-condensation resin Softening point (°C.) | Weight average molecular weight (Mw) | Salicylic acid content (wt. %) |
|---|---|---|---|---|---|---|---|---|---|
| Ex. | | | | | | | | | |
| 17 | 0.2 | m-Methylbenzyl methyl ether | 1.0 | p-Toluene-sulfonic acid | 0.5 | 150-160/3 170-160/3 | 56 | 950 | 21.3 |
| 18 | 0.2 | p-Ethylbenzyl n-butyl ether | 1.6 | Sulfuric acid | 0.1 | 150-170/5 | 89 | 1150 | 14.2 |
| 19 | 0.2 | p-Isopropylbenzyl methyl ether | 1.0 | p-Toluene-sulfonic acid | 0.5 | 150-160/3 170-180/2 | 55 | 1000 | 19.5 |
| 20 | 0.2 | p-Tert-butylbenzyl methyl ether | 1.0 | p-Toluene-sulfonic acid | 0.5 | 150-160/3 170-180/2 | 67 | 1150 | 18.3 |
| 21 | 0.2 | o-Phenylbenzyl ethyl ether | 0.8 | p-Toluene-sulfonic acid | 0.5 | 150-160/3 170-180/3 | 102 | 950 | 23.1 |
| 22 | 0.2 | p-(α-Methylbenzyl)·benzylmethyl ether | 0.8 | p-Toluene-sulfonic acid | 0.5 | 150-160/3 170-180/3 | 88 | 1050 | 22.7 |
| 23 | 0.2 | 2,3-Dimethylbenzyl isopropyl ether | 1.0 | p-Toluene-sulfonic acid | 0.5 | 150-160/3 170-180/3 | 66 | 950 | 20.0 |
| 24 | 0.2 | 2,4-Dimethylbenzyl sec-butyl ether | 0.6 | Stannic chloride | 0.1 | 150-170/3 | 89 | 700 | 26.7 |
| 25 | 0.2 | 2,5-Dimethylbenzyl methyl ether | 1.6 | Methane-sulfonic acid | 0.5 | 150-160/3 | 55 | 1350 | 12.5 |
| 26 | 0.2 | 2-Methyl-4-(α-methyl- | 0.6 | p-Toluene- | 0.5 | 150-170/3 | 858 | 800 | 22.9 |

TABLE 4-continued

SYNTHESIS OF VARIOUS SALICYLIC ACID RESINS

| Ex. | Salicylic acid Amount used (mole) | Benzyl alkyl ether Kind | Amount used (mole) | Catalyst Kind | Amount* used | Reaction conditions °C./hr | Softening point (°C.) | Co-condensation resin Weight average molecular weight (Mw) | Salicylic acid content (wt. %) |
|---|---|---|---|---|---|---|---|---|---|
| | | benzyl)benzyl methyl ether | | sulfonic acid | | | | | |

*wt. % based on the whole reaction mixture.

TABLE 5

SYNTHESIS OF METAL-MODIFIED SALICYLIC ACID RESIN

| Ex. | Salicylic acid resin Amount (g) | Metal modifier Kind | Amount (g) | Additive Kind | Amount (g) | Reaction conditions (°C./hr) | Softening point of metal-modified resin (°C.) |
|---|---|---|---|---|---|---|---|
| 17 | 10 | Zinc propionate | 1.8 | — | — | 150–160/3 | 71 |
| 18 | 10 | Zinc acetate | 1.1 | Ammonium acetate | 2.2 | 150–160/1 | 98 |
| 19 | 10 | Zinc hydroxide | 0.9 | — | — | 150–160/3 | 77 |
| 20 | 10 | Zinc benzoate | 2.1 | Ammonium bicarbonate | 1.3 | 150–165/1 | 78 |
| 21 | 10 | Zinc benzoate | 2.7 | Ammonium bicarbonate | 1.6 | 150–165/1 | 109 |
| 22 | 10 | Zinc benzoate | 2.6 | Ammonium bicarbonate | 1.6 | 150–165/1 | 92 |
| 23 | 10 | Zinc benzoate | 2.3 | Ammonium bicarbonate | 1.4 | 150–165/1 | 74 |
| 24 | 10 | Zinc benzoate | 3.1 | Ammonium bicarbonate | 1.9 | 150–165/1 | 100 |
| 25 | 10 | Zinc benzoate | 1.5 | Ammonium bicarbonate | 0.9 | 150–165/1 | 62 |
| 26 | 10 | Zinc benzoate | 2.6 | Ammonium bicarbonate | 1.6 | 150–165/1 | 77 |

EXAMPLES 27 & 28

Coating formulations of the following composition were separately prepared by using suspensions of the zinc-modified salicylic acid resins obtained respectively in the procedure (c) of Example 15 and the procedure (c) of Example 16.

| | Parts by weight |
|---|---|
| Suspension | 10 |
| Zinc oxide | 2 |
| Calcium carbonate | 8 |
| Starch | 0.8 |
| Synthetic rubber latex | 0.8 |
| Water | 32.5 |

Those coating formulations were separately applied on high-quality paper webs to achieve a dry coat weight of 5.0–5.5 g/m$^2$, thereby obtaining color-developing sheets.

EXAMPLE 29

Using 2.2 g of nickel chloride hexahydrate (purity: 96%) instead of anhydrous zinc chloride in the procedure (b) of Example 16, metal modification was carried out to obtain 10.5 g of the nickel salt of the salicylic acid resin as pale green powder. Color-developing sheets were then obtained in the same manner as in the procedure (c) of Example 1.

EXAMPLE 30

Following the procedure of Example 16 except that 1.0 g of magnesium chloride (purity: 95%) was used instead of anhydrous zinc chloride in the procedure (b) of Example 16, 9.9 g of the magnesium salt of the salicylic acid resin was obtained as white powder. Color-developing sheets were then obtained in the same manner as in the procedure (c) of Example 1.

TABLE 6

PERFORMANCE TEST RESULTS OF COLOR-DEVELOPING SHEETS

| Ex. | WB value of untested sheet | NOx yellowing resistance of color-developing sheet (WB value) | Light yellowing resistance of color-developing sheet (WB value) | Blue color production (20° C., 65% HR) Color density produced by color-developing sheet (Y) 1.5 minutes later | 24 hours later | Light fastness of produced color marks (Y) 2 hours | 4 hours | Plasticizer resistance of produced color marks (Y) | Water resistance of produced color marks | Black color production Color density produced by color-developing sheet (Y) 1.5 minutes later | 24 hours later |
|---|---|---|---|---|---|---|---|---|---|---|---|
| 15 | 84.1 | 81.5 (2.6)* | 79.8 (4.3)* | 54.9 | 51.0 | 67.1 | 72.5 | 50.2 | Good | 49.8 | 47.2 |
| 16 | 84.2 | 81.4 (2.8) | 79.2 (5.0) | 55.8 | 51.2 | 65.0 | 70.4 | 48.2 | Good | 50.5 | 47.1 |
| 17 | 84.6 | 81.5 (3.1) | 78.9 (5.7) | 56.2 | 52.3 | 67.8 | 73.1 | 50.9 | Good | 50.1 | 47.1 |
| 18 | 85.6 | 81.1 (4.5) | 79.2 (6.4) | 58.8 | 56.5 | 69.2 | 77.4 | 53.9 | Good | 50.6 | 47.3 |
| 19 | 85.2 | 81.8 (3.4) | 80.2 (5.0) | 55.9 | 51.8 | 66.8 | 74.0 | 50.2 | Good | 51.1 | 47.3 |
| 20 | 84.0 | 81.4 (2.6) | 79.5 (4.5) | 55.1 | 50.8 | 65.9 | 73.8 | 49.5 | Good | 51.5 | 46.9 |
| 21 | 84.8 | 81.8 (3.0) | 80.0 (4.8) | 56.6 | 52.9 | 66.3 | 72.9 | 51.6 | Good | 51.5 | 46.8 |
| 22 | 85.0 | 81.7 (3.3) | 80.3 (4.7) | 55.5 | 52.4 | 66.5 | 72.9 | 50.3 | Good | 50.0 | 46.3 |
| 23 | 84.2 | 81.9 (2.4) | 78.8 (5.5) | 54.2 | 50.1 | 66.9 | 72.9 | 48.8 | Good | 50.1 | 46.6 |
| 24 | 84.2 | 81.8 (2.4) | 80.0 (4.2) | 56.1 | 52.2 | 66.1 | 74.1 | 50.0 | Good | 51.2 | 47.5 |
| 25 | 84.3 | 81.2 (3.1) | 79.6 (4.7) | 56.9 | 53.1 | 64.9 | 73.1 | 51.2 | Good | 51.8 | 48.8 |
| 26 | 84.5 | 81.4 (3.1) | 79.6 (4.6) | 57.5 | 51.5 | 66.2 | 73.5 | 50.4 | Good | 53.2 | 47.1 |
| 27 | 84.3 | 80.5 (3.8) | 79.6 (4.7) | 55.5 | 52.2 | 64.8 | 70.2 | 49.6 | Good | 51.7 | 47.3 |
| 28 | 84.4 | 80.4 (4.0) | 79.0 (5.4) | 55.2 | 52.0 | 64.1 | 70.1 | 50.5 | Good | 51.6 | 47.4 |

TABLE 6-continued

PERFORMANCE TEST RESULTS OF COLOR-DEVELOPING SHEETS

| Ex. | WB value of untested sheet | NOx yellowing resistance of color-developing sheet (WB value) | Light yellowing resistance of color-developing sheet (WB value) | Blue color production (20° C., 65% HR) | | | | Water resistance of produced color marks (Y) | Black color production Color density produced by color-developing sheet (Y) | |
|---|---|---|---|---|---|---|---|---|---|---|
| | | | | Color density produced by color-developing sheet (Y) | | Light fastness of produced color marks (Y) | | Plasticizer resistance of produced color marks (Y) | | |
| | | | | 1.5 minutes later | 24 hours later | 2 hours | 4 hours | | 1.5 minutes later | 24 hours later |
| 29 | 84.3 | 82.8 (1.5) | 80.5 (3.8) | 56.8 | 50.2 | 56.0 | 60.1 | 49.5 | Good | 52.2 | 48.8 |
| 30 | 83.9 | 78.6 (5.3) | 76.3 (7.6) | 53.9 | 51.5 | 71.2 | 78.8 | 53.9 | Good | 55.3 | 49.8 |
| Comp. Ex. 1 | 83.9 | 57.2 (26.7) | 71.9 (12.0) | 61.9 | 56.9 | 67.6 | 77.1 | 55.8 | Good | 53.4 | 49.8 |
| Comp. Ex. 2 | 84.3 | 80.0 (4.3) | 81.0 (3.3) | 59.3 | 55.2 | 63.2 | 72.9 | 59.6 | Faded out | 70.5 | 57.6 |

*Each value in parentheses is a difference in WB value between an untreated sheet and the same sheet after its test.

EXAMPLE 31

(a) Synthesis of salicylic acid resin

Charged in a glass-made reactor were 27.6 g (0.2 mole) of salicylic acid, 109 g (0.8 mole) of p-methylbenzyl methyl ether and 1.3 g of p-toluene-sulfonic acid as a catalyst The reactants were subjected to condensation for 3 hours at a reaction temperature of 160°–170° C. The reactants were then heated to 180° C. and reacted for 2 hours, during which 24 g of methanol was distilled out. The contents were then immediately poured into an enameled shallow pan at the same temperature. When left over, the resinous reaction product became solid to obtain 96 g of a transparent resin of a reddish brown color. The softening point of the resultant resin was measured by the ring and ball softening point measuring apparatus in accordance with the method prescribed in JIS K-2548. It was found to be 40° C. As a result of an analysis by high-performance liquid chromatography, the content of unreacted salicylic acid was found to be 1 wt. % or less.

Results of an IR analysis (measured by the KBr tablet method) are shown in FIG. 2.

(b) Synthesis of a multi-valent metal-modified product of the salicylic acid resin Twenty-five grams of the above resin were charged in a flask and then heated to melt same at 150°–160° C. A mixture of 8.2 g of zinc benzoate and 5 g of ammonium bicarbonate, which had been prepared in advance, was then added gradually under stirring to the molten resin over 30 minutes. Thereafter, the contents were stirred for 1 hour at 155°–165° C. to complete their reaction. After the completion of the reaction, the molten resin was taken out of the flask, cooled and then ground, thereby obtaining 30 g of powder of a zinc benzoate modified product of the salicylic acid resin. The softening point of the zinc-modified product was measured by the ring and ball softening point measuring apparatus in accordance with the method prescribed in JIS K-2548. It was found to be 75° C.

(c) Use of the zinc-modified product as a color-developing agent and its performance In accordance with the same formulation and procedure as in Example 1, the zinc-modified product of the salicylic acid resin was formulated into a suspension and coating formulation, and the coating formulation was applied on a high-quality paper web and was then dried to obtain color-developing sheets.

The performances of the color-developing sheets of Examples 31–34 and 36–39 are shown in Table 8, together with that of the color-developing sheet of Comparative Example 1.

EXAMPLE 32

Charged in a glass-made reactor were 27.6 g (0.2 mole) of salicylic acid, 75 g (0.5 mole) of p-methylbenzyl ethyl ether, and 0.75 g of anhydrous zinc chloride as a catalyst. After causing the reactants to undergo condensation for 4 hours at 150°–160° C., the contents were heated further to 170° C. at which they were reacted for two hours. The internal temperature was cooled to 100° C. and 200 ml of methyl isobutyl ketone was added to dissolve the reaction mixture. Thereafter, 500 ml of warm water was added and the resultant mixture was stirred for 20 minutes at 95°–100° C., followed by removal of a water layer. That warm water washing and separation procedure was repeated two more times to remove unreacted salicylic acid. The solvent was thereafter distilled out and the condensation product was cooled to obtain 75 g of a transparent oily resin of a reddish brown color. The content of salicylic acid moieties in the resin was found to be 25.2 wt. % by the titration method.

Ten grams of the above resin were dispersed along with 0.75 g of caustic soda in 100 g of water. The resultant mixture was heated to 70° C. under stirring, whereby the resin was dissolved. While maintaining the temperature of the solution at 45°–50° C., a solution which had been obtained in advance by dissolving 1.5 g of anhydrous zinc chloride (purity: 90%) in 30 ml of water was then added dropwise over 30 minutes.

A white precipitate was formed. After continuously stirring the reaction mixture for 2 hours at the same temperature, the precipitate was collected by filtration. Subsequent to its washing with water, it was dried to obtain 10.5 g of white powder. It was the zinc salt of the salicylic acid resin and the zinc content was 4.9%.

In accordance with the same formulation and procedure as in Example 31, the zinc salt of the salicylic acid resin was formulated into a suspension and coating formulation, the coating formulation was applied on a high-quality paper web and then dried to obtained color-developing sheets, and their performance was tested together with color-developing sheets obtained in the same manner as in Comparative Example 1.

EXAMPLES 33–35

Salicylic acid resins were obtained separately in the same manner as in Example 31 except that the kind of the p-methylbenzyl alkyl ether, its molar ratio to salicylic acid, the kind and amount of the catalyst used and reaction conditions for the condensation reaction were changed correspondingly as shown in Table 7.

Using 1.8 g of zinc propionate for 10 g of the resin obtained in Example 33, the reactants were heated at 150°–160° C. to conduct a reaction. During the reaction, resulting propionic acid was taken out of the system by causing nitrogen gas to flow through the reaction system.

The thus-obtained zinc acetate modified product of the salicylic acid resin had a softening point of 69° C. After cooling, it was ground into powder.

Using a mixture of 0.9 g of zinc acetate and 1.8 g of ammonium acetate for 10 g of the resin obtained in Example 34, a reaction was carried out in the same manner as in Example 32 to obtain a zinc-modified resin having a softening point of 91° C. After cooling, it was ground into powder.

In Example 35, an experiment was carried out up to the synthesis of resins. By using the zinc-modified resins of Examples 33 and 34 (described above), the color-developing sheets were tested in the same manner as in Example 32.

ride and 9.8 g of the magnesium salt of the salicylic acid resin was obtained as white powder.

EXAMPLES 38 & 39

Suspensions of the color-developing agents obtained respectively in Examples 31 and 32 were formulated separately into coating formulations of the composition employed in Examples 13 and 14, and color-developing sheets were then obtained correspondingly.

TABLE 8

PERFORMANCE TEST RESULTS OF COLOR-DEVELOPING SHEETS

| Ex. | Resin sheet | NOx yellowing resistance of color-developing sheet (WB value) | Light yellowing resistance of color-developing sheet (WB value) | Blue color production | | | | | | Black color production | |
|---|---|---|---|---|---|---|---|---|---|---|---|
| | | | | Color density produced by color-developing sheet (Y) | | Light fastness of produced color marks (Y) | | Plasticizer resistance of produced color marks (Y) | Water resistance of produced color marks | Color density produced by color-developing sheet (Y) | |
| | | | | 1.5 minutes later | 24 hours later | 2 hours | 4 hours | | | 1.5 minutes later | 24 hours later |
| 31 | 1 | 81.9 | 78.8 | 54.7 | 52.2 | 67.0 | 73.1 | 50.9 | Good | 51.1 | 47.0 |
| 32 | 2 | 81.0 | 78.2 | 55.3 | 51.7 | 66.7 | 72.9 | 51.0 | Good | 53.3 | 47.5 |
| 33 | 3 | 81.5 | 77.4 | 54.5 | 53.0 | 66.6 | 74.0 | 52.2 | Good | 53.0 | 49.2 |
| 34 | 4 | 81.2 | 78.1 | 56.5 | 54.1 | 68.2 | 77.2 | 51.6 | Good | 52.1 | 50.0 |
| 36 | 2 | 80.1 | 79.3 | 56.9 | 50.0 | 56.5 | 61.1 | 49.2 | Good | 53.3 | 47.5 |
| 37 | 2 | 78.9 | 75.9 | 54.3 | 49.9 | 70.3 | 78.2 | 53.5 | Good | 50.5 | 46.0 |
| 38 | 2 | 80.1 | 77.9 | 54.2 | 50.3 | 64.1 | 70.0 | 49.8 | Good | 50.2 | 49.5 |
| 39 | 1 | 80.6 | 78.8 | 53.1 | 51.6 | 64.8 | 71.5 | 51.3 | Good | 50.9 | 48.2 |
| Comp. Ex. 1 | Comp. 1 | 57.2 | 71.9 | 61.9 | 56.9 | 67.6 | 77.1 | 55.8 | Good | 53.4 | 49.8 |

EXAMPLE 40

(a) Synthesis of salicylic acid resin

Charged in a glass-made reactor were 27.6 g (0.2 mole) of salicylic acid, 81.7 g (0.6 mole) of α-methylbenzyl methyl ether and 3.0 g of p-toluenesulfonic acid as a catalyst. The reactants were subjected to condensation for 3 hours at a reaction temperature of 160°–170° C. The reactants were then heated to 180° C. and reacted for 2 hours, during which 18 g of methanol was distilled out. The contents were then immediately poured into an enameled shallow pan at the same temperature. When left over, the resinous reaction product

TABLE 7

| Ex. | Salicylic acid Amount used (mole) | p-Methyl benzyl alkyl ether Kind | Amount used (mole) | Catalyst Kind | Amount* used | Reaction conditions (°C./hr) | Softening point (°C.) |
|---|---|---|---|---|---|---|---|
| 33 | 0.2 | p-Methylbenzyl isopropyl ether | 1.0 | Stannic chloride | 0.5 | 150–160/3<br>165–170/2 | 48 |
| 34 | 0.2 | p-Methylbenzyl n-butyl ether | 2.0 | p-Toluenesulfonic acid<br>Zinc chloride | 0.3<br>0.3 | 150–170/7 | 83 or higher |
| 35 | 0.2 | p-Methylbenzyl n-amyl ether | 0.6 | Sulfuric acid | 0.1 | 170–180/5 | 32 |

*wt. % based on the whole reaction mixture.

EXAMPLE 36

An experiment was carried out in the same manner as in Example 32 except that 2.3 g of nickel chloride hexahydrate (purity: 96%) was used instead of anhydrous zinc chloride and 10.5 g of the nickel salt of the salicylic acid resin was obtained as pale green powder.

EXAMPLE 37

An experiment was carried out in the same manner as in Example 32 except that 1.0 g of magnesium chloride (purity: 95%) was used instead of anhydrous zinc chlobecame solid to obtain 86 g of a transparent resin of a pale yellow color. The weight average molecular weight of the thus-obtained resin was 820. The softening point of the resin was measured by the ring and ball softening point measuring apparatus in accordance with the method prescribed in JIS K-2548. It was found to be 62° C. As a result of an analysis by high-performance liquid chromatography, the content of unreacted salicylic acid was found to be 1 wt. % or less. A tetrahydrofuran solution of the resin was titrated with a 1/10N aqueous solution of sodium carbonate to determine the content of salicylic acid moieties in the resin. As a result, it was found to be 16.3 wt. %.

(b) Synthesis of a multi-valent metal-modified product of the salicylic acid resin Ten grams of the above resin were charged in a flask and then heated to melt same at 150°-160° C. A mixture of 1.9 g of zinc benzoate and 1.2 g of ammonium bicarbonate, which had been prepared in advance, was then added gradually under stirring to the molten resin over 30 minutes. Thereafter, the contents were stirred for 1 hour at 155°-165° C. to complete their reaction. After the completion of the reaction, the molten resin was taken out of the flask, cooled and then ground, thereby obtaining 10.8 g of powder of a zinc benzoate modified product of the salicylic acid resin. The softening point of the zinc-modified product was measured by the ring and ball softening point measuring apparatus in accordance with the method prescribed in JIS K-2548. It was found to be 75° C.

(c) Use of the zinc-modified product as a color-developing agent

The zinc-modified product of the salicylic acid resin was used as a color-developing agent. Color-developing sheets were obtained in the same manner as in Example 1.

EXAMPLE 41

(a) Synthesis of salicylic acid resin

Charged in a glass-made reactor were 27.6 g (0.2 mole) of salicylic acid, 81.2 g (0.5 mole) of p-methyl-α-methylbenzyl ethyl ether, and 0.75 g of anhydrous zinc chloride as a catalyst. After causing the reactants to undergo condensation for 4 hours at 140°-150° C., the contents were heated further to 160° C. at which they were reacted for two hours. The internal temperature was cooled to 100° C. and 200 ml of toluene was added to dissolve the reaction mixture. Thereafter, 500 ml of warm water was added and the resultant mixture was stirred for 20 minutes at 95°-100° C., followed by removal of a water layer. That warm water washing and separation procedure was repeated two more times to remove unreacted salicylic acid. The solvent was thereafter distilled out and the condensation product was cooled to obtain 81 g of a transparent resin of a pale brown color. The weight average molecular weight of the thus-obtained resin was 750 and its softening point was 58° C. The content of salicylic acid moieties in the resin was found to be 19.8 wt. % by the titration method.

(b) Synthesis of a multi-valent metal-modified product of the salicylic acid resin Ten grams of the above resin were dispersed along with 0.6 g of caustic soda in 100 g of water. The resultant mixture was heated to 70° C. under stirring, whereby the resin was dissolved. While maintaining the temperature of the solution at 45°-50° C., a solution which had been obtained in advance by dissolving 1.2 g of anhydrous zinc chloride (purity: 90%) in 30 ml of water was then added dropwise over 30 minutes.

A white precipitate was formed. After continuously stirring the reaction mixture for 2 hours at the same temperature, the precipitate was collected by filtration. Subsequent to its washing with water, it was dried to obtain 9.8 g of white powder. It was the zinc salt of the salicylic acid resin and the zinc content was 4.5%.

(c) Use of the zinc-modified product as a color-developing agent

Using the zinc-modified product of the salicylic acid resin, color-developing sheets were obtained in the same manner as in Example 1.

Examples 42-50

(a) Synthesis of salicylic acid resins

Salicylic acid resins were obtained separately in the same manner as in Example 40 except that the kind of the benzyl alcohol, its molar ratio to salicylic acid, the kind and amount of the catalyst used and reaction conditions for the condensation reaction were changed correspondingly as shown in Table 9. The weight average molecular weights and softening points of the resultant resins and the contents of salicylic acid moieties in the resins are also shown in Table 9.

(b) Synthesis of multi-valent metal-modified products of the salicylic acid resins The resins obtained in the above procedure (a) were separately modified by using their corresponding metal modifiers and reaction conditions shown in Table 10, thereby obtaining zinc-modified salicylic acid resins whose softening points are given in Table 10.

(c) Use of the zinc-modified salicylic acid resins as color-developing agents

Using the metal-modified products shown in Table 10 separately, color-developing sheets were obtained in the same manner as in Example 1.

TABLE 9

| | SYNTHESIS OF VARIOUS SALICYLIC ACID RESINS | | | | | | | |
|---|---|---|---|---|---|---|---|---|
| | Salicylic acid | α-Alkylbenzyl alkyl ether | | Catalyst | | Reaction conditions °C./hr | Synthetic resin | | |
| Ex. | Amount used (mole) | Kind | Amount used (mole) | Kind | Amount* used | | Weight average molecular weight (Mw) | Softening point (°C.) | Salicylic acid content in resin (wt. %) |
| 42 | 0.2 | o-Methyl-α-methylbenzyl isopropyl ether | 1.0 | p-Toluenesulfonic acid Anhydrous zinc chloride | 0.5 0.5 | 140-160/5 | 1380 | 62 | 14.5 |
| 43 | 0.2 | p-Methyl-α-ethylbenzyl ethyl ether | 0.6 | Stannic chloride | 0.3 | 150-170/5 | 940 | 46 | 22.6 |
| 44 | 0.2 | α-Ethylbenzyl methyl ether | 1.6 | Methanesulfonic acid | 2 | 160-180/5 | 1850 | 71 | 10.9 |
| 45 | 0.2 | m-Methyl-α-methylbenzyl methyl ether | 0.6 | p-Toluene sulfonic acid | 3 | 160-180/5 | 850 | 55 | 19.8 |
| 46 | 0.2 | p-n-Butyl-α-methylbenzyl methyl ether | 0.6 | p-Toluene sulfonic acid | 3 | 160-180/5 | 850 | 50 | 18.2 |
| 47 | 0.2 | p-Phenyl-α-methyl- | 0.6 | p-Toluene | 3 | 160-180/5 | 850 | 62 | 17.7 |

TABLE 9-continued

SYNTHESIS OF VARIOUS SALICYLIC ACID RESINS

| Ex. | Salicylic acid Amount used (mole) | α-Alkylbenzyl alkyl ether Kind | Amount used (mole) | Catalyst Kind | Amount* used | Reaction conditions °C./hr | Synthetic resin Weight average molecular weight (Mw) | Softening point (°C.) | Salicylic acid content in resin (wt. %) |
|---|---|---|---|---|---|---|---|---|---|
| 48 | 0.2 | 3,4-Dimethyl-α-methyl-benzyl methyl ether | 0.6 | p-Toluene sulfonic acid | 3 | 160–180/5 | 950 | 55 | 19.0 |
| 49 | 0.2 | 2,4-Diisopropyl-α-methyl-benzyl methyl ether | 0.6 | p-Toluene sulfonic acid | 3 | 160–180/5 | 920 | 56 | 17.3 |
| 50 | 0.2 | 2-Methyl-4-(α-methyl-benzyl)-α-methylbenzyl methyl ether | 0.6 | p-Toluene sulfonic acid | 3 | 160–180/5 | 980 | 65 | 16.2 |

*wt. % based on the whole reaction mixture.

TABLE 10

SYNTHESIS OF METAL-MODIFIED SALICYLIC ACID RESIN

| Ex. | Salicylic acid resin Amount (g) | Metal modifier Kind | Amount (g) | Additive Kind | Amount (g) | Reaction conditions (°C./hr) | Softening point of metal-modified resin (°C.) |
|---|---|---|---|---|---|---|---|
| 42 | 10 | Zinc propionate | 1.2 | — | — | 150–160/2 | 76 |
| 43 | 10 | Zinc acetate | 1.1 | Ammonium acetate | 2.2 | 150–160/2 | 88 |
| 44 | 10 | Zinc hydroxide | 0.5 | — | — | 150–160/2 | 72 |
| 45 | 10 | Zinc benzoate | 2.3 | Ammonium bicarbonate | 1.3 | 150–165/1 | 78 |
| 46 | 10 | Zinc benzoate | 2.1 | Ammonium bicarbonate | 1.3 | 150–165/1 | 76 |
| 47 | 10 | Zinc benzoate | 2.1 | Ammonium bicarbonate | 1.3 | 150–165/1 | 82 |
| 48 | 10 | Zinc benzoate | 2.2 | Ammonium bicarbonate | 1.4 | 150–165/1 | 77 |
| 49 | 10 | Zinc benzoate | 2.0 | Ammonium bicarbonate | 1.3 | 150–165/1 | 74 |
| 50 | 10 | Zinc benzoate | 1.9 | Ammonium bicarbonate | 1.2 | 150–165/1 | 84 |

EXAMPLES 51 & 52

Suspensions of the multi-valent metal modified salicylic acid resins obtained respectively in the procedure (c) of Example 40 and the procedure (c) of Example 41 were formulated respectively into coating formulations of the composition employed in Examples 13 and 14, and color-developing sheets were then obtained.

EXAMPLE 53

Metal modification was conducted in the same manner as in Example 41 except that 2.2 g of nickel chloride hexahydrate (purity: 96%) was used instead of anhydrous zinc chloride in the procedure (b) of Example 41, 10 g of the nickel salt of the salicylic acid resin was obtained as pale green powder. Color-developing sheets were then obtained in the same manner as in the procedure (c) of Example 1.

EXAMPLE 54

Metal modification was conducted in the same manner as in Example 41 except that 1.0 g of magnesium chloride (purity: 95%) was used instead of anhydrous zinc chloride in the procedure (b) of Example 41, 10 g of the magnesium salt of the salicylic acid resin was obtained as white powder. Color-developing sheets were then obtained in the same manner as in the procedure (c) of Example 1.

The color-developing sheets obtained in Examples 40–54 were subjected along with the color-developing sheets of Comparative Examples 1 and 2 to a performance test. Results are shown in Table 11.

TABLE 11

PERFORMANCE TEST RESULTS OF COLOR-DEVELOPING SHEETS

| Ex. | WB value of untested sheet | NOx yellowing resistance of color-developing sheet (WB value) | Light yellowing resistance of color-developing sheet (WB value) | Blue color production (20° C., 65% HR) Color density produced by color-developing sheet (Y) 1.5 minutes later | 24 hours later | Light fastness of produced color marks (Y) 2 hours | 4 hours | Plasticizer resistance of produced color marks (Y) | Water resistance of produced color marks | Low-temp. color production (5° C., 60% RH) Color density produced by color-developing sheet (Y) 1.5 minutes later | 24 hours later |
|---|---|---|---|---|---|---|---|---|---|---|---|
| 40 | 84.1 | 82.5 (1.6)* | 80.6 (3.5)* | 57.6 | 54.9 | 61.0 | 68.5 | 53.1 | Good | 60.0 | 55.5 |
| 41 | 85.9 | 82.7 (2.8) | 79.9 (6.0) | 58.9 | 55.0 | 60.2 | 67.9 | 53.6 | Good | 61.3 | 55.6 |
| 42 | 85.8 | 83.0 (2.8) | 80.9 (4.9) | 56.0 | 54.1 | 62.5 | 69.3 | 53.1 | Good | 58.1 | 54.3 |
| 43 | 84.8 | 82.5 (2.3) | 80.6 (4.2) | 57.6 | 55.5 | 61.5 | 69.0 | 54.0 | Good | 61.0 | 56.7 |
| 44 | 85.3 | 81.7 (3.6) | 79.8 (5.5) | 56.5 | 54.3 | 62.7 | 68.5 | 53.5 | Good | 58.5 | 56.1 |
| 45 | 84.3 | 82.5 (3.8) | 80.5 (3.8) | 58.5 | 55.2 | 61.8 | 69.2 | 55.0 | Good | 62.5 | 56.0 |
| 46 | 84.7 | 83.0 (1.7) | 80.9 (3.8) | 58.1 | 55.9 | 60.5 | 67.9 | 54.7 | Good | 60.9 | 56.7 |
| 47 | 84.2 | 82.9 (1.3) | 81.9 (2.3) | 57.6 | 54.3 | 62.9 | 69.8 | 54.0 | Good | 60.5 | 54.8 |
| 48 | 84.5 | 82.4 (2.1) | 80.5 (4.0) | 56.4 | 54.2 | 63.5 | 69.5 | 54.0 | Good | 59.2 | 54.9 |

TABLE 11-continued

PERFORMANCE TEST RESULTS OF COLOR-DEVELOPING SHEETS

| Ex. | WB value of untested sheet | NOx yellowing resistance of color-developing sheet (WB value) | Light yellowing resistance of color-developing sheet (WB value) | Blue color production (20° C., 65% HR) | | | | Plasticizer resistance of produced color marks (Y) | Water resistance of produced color marks | Low-temp. color production (5° C., 60% RH) | |
|---|---|---|---|---|---|---|---|---|---|---|---|
| | | | | Color density produced by color-developing sheet (Y) | | Light fastness of produced color marks (Y) | | | | Color density produced by color-developing sheet (Y) | |
| | | | | 1.5 minutes later | 24 hours later | 2 hours | 4 hours | | | 1.5 minutes later | 24 hours later |
| 49 | 85.1 | 83.0 (2.1) | 81.2 (3.9) | 57.1 | 55.0 | 62.5 | 68.5 | 54.2 | Good | 60.1 | 55.8 |
| 50 | 85.0 | 83.1 (1.9) | 81.5 (3.5) | 56.9 | 55.2 | 61.5 | 68.0 | 55.0 | Good | 61.4 | 55.7 |
| 51 | 84.3 | 81.5 (2.8) | 80.0 (4.3) | 57.5 | 54.9 | 60.2 | 66.1 | 53.5 | Good | 61.5 | 55.1 |
| 52 | 84.4 | 81.3 (3.1) | 79.2 (5.2) | 58.8 | 54.1 | 59.5 | 65.0 | 52.5 | Good | 62.5 | 55.1 |
| 53 | 85.5 | 82.1 (3.4) | 81.6 (3.9) | 59.5 | 56.2 | 58.5 | 62.4 | 54.1 | Good | 63.6 | 57.9 |
| 54 | 84.4 | 79.5 (4.9) | 77.5 (6.9) | 58.6 | 56.0 | 65.9 | 75.4 | 55.0 | Good | 61.5 | 57.9 |
| Comp. Ex. 1 | 83.9 | 57.2 (26.7) | 71.9 (12.0) | 61.9 | 56.9 | 67.6 | 77.1 | 55.8 | Good | 65.4 | 57.8 |
| Comp. Ex. 2 | 84.3 | 80.0 (4.3) | 81.0 (3.3) | 59.3 | 55.2 | 63.2 | 72.9 | 59.6 | Faded out | 70.5 | 57.6 |

*Each value in parentheses is a difference in WB value between an untreated sheet and the same sheet after its test.

EXAMPLE 55

(a) Synthesis of salicylic acid resin

Charged in a glass-made reactor were 27.6 g (0.2 mole) of salicylic acid, 22.6 g (0.1 mole) of di(α-methylbenzyl) ether and 3.0 g of p-toluenesulfonic acid as a catalyst. After causing the reactants to undergo condensation for 3 hours at 130°-140° C. under a nitrogen gas stream, 45.3 g (0.2 mole) of di(α-methylbenzyl) ether was dropped further at the same temperature over 5 hours The contents were then heated to 150°-160° C., at which the reaction mixture was aged for 3 hours. The contents were then immediately poured into an enameled shallow pan at the same temperature. When left over, the resinous reaction product became solid to obtain 85 g of a transparent resin of a yellowish red color. The weight average molecular weight of the thus-obtained resin was 1050 and its softening point was 59° C. as measured by the ring and ball softening point measuring apparatus in accordance with the method prescribed in JIS K-2548. As a result of an analysis by high-performance liquid chromatography, the content of unreacted salicylic acid was found to be 5 wt. % or less. A tetrahydrofuran solution of the resin was titrated with a 1/10N aqueous solution of sodium carbonate to determine the content of salicylic acid moieties in the resin. As a result of subtraction of the unreacted portion, the content of the salicylic acid moieties was found to be 29.5 wt. %.

(b) Synthesis of a multi-valent metal-modified product of the salicylic acid resin Twenty-five grams of the above resin were charged in a flask and then heated to melt same at 150°-160° C. A mixture of 8.65 g of zinc benzoate and 5.1 g of ammonium bicarbonate, which had been prepared in advance, was then added gradually to the molten resin over 30 minutes. Thereafter, the contents were stirred for 1 hour at 155°-165° C. to complete their reaction. After the completion of the reaction, the molten resin was taken out of the flask, cooled and then ground, thereby obtaining 30 g of powder of a zinc benzoate modified product of the salicylic acid resin. The softening point of the zinc-modified product was measured by the ring and ball softening point measuring apparatus in accordance with the method prescribed in JIS K-2548. It was found to be 86° C.

(c) Use of the zinc-modified product as a color-developing agent and its performance Using the zinc-modified product of the salicylic acid resin as a color-developing agent, color-developing sheets obtained in the same manner as in Example 1.

EXAMPLE 56

(a) Synthesis of salicylic acid resin

Charged in a glass-made reactor were 27.6 g (0.2 mole) of salicylic acid, 59.5 g (0.3 mole) of dibenzyl ether, and 0.8 g of anhydrous zinc chloride and 0.8 g of p-toluenesulfonic acid as catalysts. After causing the reactants to undergo condensation for 4 hours at 130°-140° C., the contents were heated further to 160° C. at which they were reacted for two hours. The internal temperature was cooled to 100° C. and 200 ml of toluene was added to dissolve the reaction mixture. Thereafter, 500 ml of warm water was added and the resultant mixture was stirred for 20 minutes at 95°-100° C., followed by removal of a water layer. That warm water washing and separation procedure was repeated two more times to remove unreacted salicylic acid. The solvent was thereafter distilled out and the condensation product was cooled to obtain 78 g of a transparent resin of a pale brown color. Its softening point was 42° C. The weight average molecular weight of the resin was 650 and the content of salicylic acid moieties in the resin was found to be 34.6 wt. %.

(b) Synthesis of a multi-valent metal-modified product of the salicylic acid resin Ten grams of the above resin were dispersed along with 1.1 g of caustic soda in 100 g of water. The resultant mixture was heated to 70° C. under stirring, whereby the resin was dissolved. While maintaining the temperature of the solution at 45°-50° C., a solution which had been obtained in advance by dissolving 2.2 g of anhydrous zinc chloride (purity: 90%) in 30 ml of water was then added dropwise over 30 minutes.

A white precipitate was formed. After continuously stirring the reaction mixture for 2 hours at the same temperature, the precipitate was collected by filtration. Subsequent to its washing with water, it was dried to obtain 10.7 g of white powder. It was the zinc salt of the salicylic acid resin and the zinc content was 7.6.

(c) Use of the zinc-modified product as a color-developing agent and its performance Following the procedure of Example 55, color-developing sheets were obtained from the above zinc-modified product of the salicylic acid resin.

EXAMPLE 57

Using 3.5 g of nickel chloride hexahydrate (purity: 96%) in place of anhydrous zinc chloride in the procedure (b) of Example 56, 11.1 g of the nickel salt of the salicylic acid resin was obtained as pale green powder.

Following the procedure of Example 55, color-developing sheets were obtained from the above metal-modified product.

EXAMPLE 58

Using 1.3 g of magnesium chloride (purity: 95%) in place of anhydrous zinc chloride in the procedure (b) of Example 56, 9.7 g of the magnesium salt of the salicylic acid resin was obtained as white powder. Color-developing sheets were then obtained in the same manner as in Example 55.

EXAMPLES 59–63

(a) Synthesis of salicylic acid resins

Salicylic acid resins were obtained separately in the same manner as in Example 55 except that the kind of the dibenzyl ether, its molar ratio to salicylic acid, the kind and amount of the catalyst used and reaction conditions for the condensation reaction were changed correspondingly as shown in Table 12.

(b) Synthesis of multi-valent metal-modified products of the salicylic acid resins Various metal-modified products shown in Table 13 were produced in the same manner as in Example 55 except that the kinds of the metal chloride and additive were changed in accordance with the resultant co-condensation resins of salicylic acid and the various dibenzyl ethers.

Color-developing sheets were thereafter obtained in the same manner as in Example 55.

EXAMPLES 64 & 65

Suspensions of the multi-valent metal modified salicylic acid resins obtained respectively in the procedures (c) of Examples 55 and 56 were formulated separately into coating formulations of the composition employed in Examples 13 and 14, and color-developing sheets were then obtained correspondingly.

The color-developing sheets obtained in Examples 55–65 were subjected along with the color-developing sheets of Comparative Examples 1 and 2 to a performance test. Results are shown in Table 14.

TABLE 12

SALICYLIC ACID-BENZYL ALCOHOL CO-CONDENSATION RESIN

| | Composition of reaction mixture | | | | | Synthetic resin | | |
|---|---|---|---|---|---|---|---|---|
| | Starting material | | | | Reaction | Weight | | |
| | Salicylic acid | Dibenzyl ether | | Catalyst | | conditions react'n tmp./ | average molecular | Softening | Salicylic acid content in |
| Ex. | Amount (mole) | Kind | Amount (mole) | Kind | Amount* used | react'n time (°C./hr) | weight (Mw) | point (°C.) | resin (wt. %) |
| 59 | 0.1 | Di(α-ethylbenzyl) ether | 0.05** + 0.2*** | Stannic chloride | 1.0 | 120–140/5 150–160/5 | 1680 | 62 | 24.2 |
| 60 | 0.1 | Di(p-methylbenzyl) ether | 0.1** + 0.3*** | Methanesulfonic acid | 1.0 | 140–160/8 | 1700 | 76 | 16.8 |
| 61 | 0.1 | Di(p-methyl-α-methylbenzyl) ether | 0.1** + 0.3*** | Aluminum chloride | 1.0 | 120–150/8 150–160/5 | 750 | 55 | 29.8 |
| 62 | 0.1 | Di(m-methylbenzyl) ether | 0.1** + 0.3*** | Aluminum chloride | 1.0 | 120–150/8 150–160/5 | 650 | 57 | 31.2 |
| 63 | 0.1 | Di(3,4-dimethylbenzyl) ether | 0.1** + 0.3*** | Aluminum chloride | 1.0 | 120–150/8 150–160/5 | 920 | 60 | 27.8 |

*wt. % based on the whole reaction mixture.
**Amount charged initially.
***Amount added dropwise.

TABLE 13

MULTIVALENT METAL-MODIFIED SALICYLIC ACID RESIN

| | Salicylic acid resin | Metal modifier | | Additive | | Softening point of metal- |
|---|---|---|---|---|---|---|
| Ex. | Amount (g) | Kind | Amount (g) | Kind | Amount (g) | modified resin (°C.) |
| 59 | 10 | Zinc hydroxide | 0.83 | — | — | 96 |
| 60 | 10 | Zinc propionate | 1.4 | — | — | 94 |
| 61 | 10 | Zinc benzoate | 3.5 | Ammonium bicarbonate | 2.8 | 75 |
| 62 | 10 | Zinc benzoate | 3.6 | Ammonium bicarbonate | 3.0 | 86 |
| 63 | 10 | Zinc oxide | 0.81 | Ammonium bicarbonate | 2.5 | 93 |

TABLE 14

PERFORMANCE TEST RESULTS OF COLOR-DEVELOPING SHEETS

| Ex. | WB value of untested sheet | NOx yellowing resistance of color-developing sheet (WB value) | Light yellowing resistance of color-developing sheet (WB value) | Blue color production (20° C., 65% HR) | | | | Plasticizer resistance of produced color marks (Y) | Water resistance of produced color marks | Low-temp. color production (5° C., 60% RH) | |
|---|---|---|---|---|---|---|---|---|---|---|---|
| | | | | Color density produced by color-developing sheet (Y) | | Light fastness of produced color marks (Y) | | | | Color density produced by color-developing sheet (Y) | |
| | | | | 1.5 minutes later | 24 hours later | 2 hours | 4 hours | | | 1.5 minutes later | 24 hours later |
| 55 | 84.6 | 81.4 (3.2)* | 80.0 (4.6)* | 56.2 | 50.5 | 63.0 | 71.0 | 50.2 | Good | 59.0 | 50.5 |
| 56 | 84.3 | 80.5 (3.8) | 79.2 (5.1) | 57.6 | 51.4 | 67.4 | 74.5 | 52.2 | Good | 60.0 | 51.8 |
| 57 | 84.8 | 81.3 (3.5) | 81.9 (2.9) | 58.0 | 51.0 | 61.5 | 69.1 | 52.5 | Good | 63.1 | 52.2 |
| 58 | 84.0 | 78.8 (5.2) | 76.2 (7.8) | 56.1 | 50.5 | 71.4 | 76.0 | 52.3 | Good | 57.4 | 51.2 |
| 59 | 85.4 | 82.6 (2.8) | 82.9 (2.5) | 55.9 | 51.6 | 62.5 | 70.2 | 52.0 | Good | 58.1 | 51.9 |
| 60 | 84.0 | 81.9 (2.1) | 80.3 (3.7) | 56.5 | 51.2 | 68.8 | 73.5 | 51.8 | Good | 59.0 | 52.1 |
| 61 | 85.3 | 82.8 (2.5) | 82.4 (2.9) | 55.8 | 50.7 | 62.9 | 70.8 | 50.5 | Good | 58.4 | 51.6 |
| 62 | 84.5 | 81.3 (3.2) | 80.2 (4.3) | 55.7 | 50.5 | 64.1 | 72.1 | 51.4 | Good | 57.8 | 50.5 |
| 63 | 84.9 | 81.6 (3.3) | 80.3 (4.6) | 55.5 | 51.1 | 66.2 | 71.6 | 50.4 | Good | 58.2 | 50.9 |
| 64 | 85.2 | 83.4 (1.8) | 83.0 (2.2) | 58.3 | 50.0 | 59.8 | 67.2 | 51.5 | Good | 61.2 | 52.5 |
| 65 | 84.8 | 82.8 (2.0) | 81.8 (3.0) | 57.0 | 51.0 | 65.2 | 71.3 | 52.1 | Good | 61.8 | 52.1 |
| Comp. Ex. 1 | 83.9 | 57.2 (26.7) | 71.9 (12.0) | 61.9 | 56.9 | 67.6 | 77.1 | 55.8 | Good | 65.4 | 57.8 |
| Comp. Ex. 2 | 84.3 | 80.0 (4.3) | 81.0 (3.3) | 59.3 | 55.2 | 63.2 | 72.9 | 59.6 | Faded out | 70.5 | 57.6 |

*Each value in parentheses is a difference in WB value between an untreated sheet and the same sheet after its test.

EXAMPLE 66

(a) Synthesis of salicylic acid resin and its multivalent metal-modified product Charged in a glass-made reactor were 27.6 g (0.2 mole) of salicylic acid, 253.2 g (2 moles) of benzyl chloride and 1.5 g of anhydrous zinc chloride as a catalyst. The reactants were condensed for 3 hours at 70°-90° C. under a nitrogen gas stream. Thereafter, the reaction temperature was raised to 120° C. and aging was performed at the same temperature for 5 hours to complete the reaction. Under stirring, 200 ml of toluene and 60 g of water were added to the reaction mixture and the resulting mixture was allowed to stand and separate into layers. The weight average molecular weight of a resin obtained here was 1550. The upper solvent layer was charged in a separate glass-made reactor, followed by addition of 20 g of 28% aqueous ammonia and 8.1 g (0.1 mole) of zinc oxide. The resultant mixture was stirred for 1 hour at room temperature. The reaction mixture was then heated to distill out the solvent. The internal temperature was cooled to 150° C., at which the reaction product was aged for 2 hours. The reaction product was degasified for 30 minutes in a vacuum of 20 mmHg and was then taken out of the reactor, thereby obtaining 212 g of a transparent zinc-modified salicylic acid resin of a reddish brown color (stoichiometric yield).

The softening point of the zinc-modified resin was measured by the ring and ball softening point measuring apparatus in accordance with the method prescribed in JIS K-2548. It was found to be 96° C.

(c) Use of the zinc-modified resin as a color-developing agent

Using the zinc-modified salicylic acid resin as a color-developing agent, color-developing sheets were obtained in the same manner as in the procedure (c) of Example 1.

EXAMPLE 67

Charged in a reactor were 27.6 g (0.2 mole) of salicylic acid, 123.7 g (0.8 mole) of p-methyl-α-methylbenzyl chloride, 100 ml of monochlorobenzene, and 5.6 g of "Nafion H" (trade name; product of E. I. du Pont de Nemours & Co., Inc.) as a catalyst. They were reacted for 5 hours under reflux of the solvent. After the reaction, 300 ml of warm water was added, the resultant mixture was stirred at 90° C. or higher for 20 minutes, and the upper water layer was removed. The weight average molecular weight of the resultant resin was 850. The lower layer was added with 1500 ml of water, followed by a dropwise addition of 36 g (0.4 mole) of a 45% aqueous solution of caustic soda. The reaction mixture was then heated to distill out the solvent azeotropically, whereby an aqueous solution was obtained in a somewhat clouded state. The solution was cooled to 40° C., to which was added dropwise an aqueous solution formed in advance by dissolving 29 g (0.1 mole) of zinc sulfate heptahydrate in 200 ml of water. A white precipitate was formed. The precipitate was collected by filtration, washed with water and then dried in vacuo, thereby obtaining 126 g of the zinc salt of the salicylic acid resin. As a result of an elemental analysis, the content of zinc was found to be 5.05%. Using the zinc-modified salicylic acid resin, color-developing sheets were obtained in the same manner as in Example 66.

EXAMPLE 68

Charged in a reactor were 27.6 g (0.2 mole) of salicylic acid, 74 g (0.4 mole) of α-methylbenzyl bromide, and 15.2 g of zinc chloride as a catalyst. They were condensed for 5 hours at 60°-90° C. under a nitrogen gas stream. The reaction temperature was thereafter raised to 135° C., at which the reaction was allowed to proceed further for 2 hours.

The weight average molecular weight of the resultant condensation resin was 550.

To the reaction mixture, 150 ml of toluene was added to dissolve same. Dilute aqueous ammonia was then added dropwise at 70°-80° C. to adjust the pH of the reaction mixture to 6. Thereafter, the mixture was stirred for 1 hour at 70°-80° C. to complete the reaction. After the completion of the reaction, the lower layer, i.e., water layer was removed and the organic layer was heated and concentrated. The thus-obtained molten resin was then taken out of the reactor, cooled and then ground, thereby obtaining 75 g of a zinc-modified product of the salicylic acid resin as powder. The softening point of the zinc-modified product was measured by the ring and ball softening point measuring apparatus in accordance with the method prescribed in JIS K-2548. It was found to be 110° C.

Using the zinc-modified salicylic acid resin, color-developing sheets were obtained in the same manner as in Example 66.

EXAMPLE 69

Charged in a reactor were 27.6 (0.2 mole) of salicylic acid, 185.6 g (1.2 moles) of 3,5-dimethylbenzyl chloride, and 0.5 g of stannic chloride as a catalyst. A first stage reaction was carried out at 90°–120° C. for 5 hours and at 120°–135° C. for 2 hours. The weight average molecular weight of the resultant condensation resin was 1240.

A mixture of 32.6 g of zinc benzoate and 20 g of ammonium bicarbonate, which mixture had been formed in advance, was added gradually to the co-condensation resin at the same temperature over 30 minutes. Thereafter, the reaction mixture was continuously stirred for 1 hour at 150°–160° C. The reaction product was then taken out of the reactor, cooled and then ground, thereby obtaining 201 g of a zinc benzoate modified product of the salicylic acid resin as powder. Its softening point was 99° C. Using the above resin powder, color-developing sheets were obtained in the same manner as in Example 66.

EXAMPLE 70

Charged in a reactor were 6.9 g (0.05 mole) of salicylic acid, 0.2 g of anhydrous zinc chloride and 10 ml of acetic acid. At an internal temperature of 90°–95° C., 46.1 g (0.2 mole) of α-methylbenzylbenzyl chloride was then added in portions over 5 hours. After completion of the addition, the reaction mixture was heated and under reflux of acetic acid, the reaction was allowed to proceed for 3 hours until the reaction was completed. Subsequently, 6.3 g (0.025 mole) of nickel acetate was added to the reaction mixture and the temperature of the resultant mixture was progressively raised to distill out acetic acid. When the temperature had reached 150° C., the pressure was reduced to a vacuum level. The reaction product was maintained in vacuo for 1 hour, thereby completing the production. The softening point of the resultant nickel-modified salicylic acid resin was 102° C. Color-developing sheets were produced in the same manner as in Example 66.

EXAMPLES 71 & 72

Suspensions of the color-developing agents obtained respectively in Examples 66 and 70 were formulated separately into coating formulations of the composition employed in Examples 13 and 14, and color-developing sheets were then obtained correspondingly.

The color-developing sheets obtained in Examples 66–72 were subjected along with the color-developing sheets of Comparative Examples 1 and 2 to a performance test. Results are shown in Table 15.

TABLE 15
PERFORMANCE TEST RESULTS OF COLOR-DEVELOPING SHEETS

| Ex. | WB value of untested sheet | NOx yellowing resistance of color-developing sheet (WB value) | Light yellowing resistance of color-developing sheet (WB value) | Blue color production (20° C., 65% HR) Color density produced by color-developing sheet (Y) 1.5 minutes later | 24 hours later | Light fastness of produced color marks (Y) 2 hours | 4 hours |
|---|---|---|---|---|---|---|---|
| 66 | 84.7 | 80.2 (4.5)* | 77.2 (7.5)* | 56.6 | 54.9 | 63.8 | 72.5 |
| 67 | 84.9 | 82.3 (2.6) | 82.8 (2.1) | 57.3 | 55.5 | 61.1 | 69.4 |
| 68 | 84.0 | 82.5 (1.5) | 82.3 (1.7) | 58.9 | 56.2 | 61.0 | 69.8 |
| 69 | 84.1 | 81.0 (3.1) | 76.8 (7.3) | 56.8 | 54.7 | 64.1 | 71.5 |
| 70 | 85.5 | 80.0 (5.5) | 80.5 (5.0) | 59.9 | 55.6 | 60.0 | 65.4 |
| 71 | 84.5 | 80.1 (4.4) | 76.9 (7.6) | 57.0 | 55.5 | 64.8 | 72.6 |
| 72 | 84.5 | 79.6 (4.9) | 80.1 (4.4) | 60.8 | 55.3 | 59.9 | 64.2 |
| Comp. Ex. 1 | 83.9 | 57.2 (26.7) | 71.9 (12.0) | 61.9 | 56.9 | 67.6 | 77.1 |
| Comp. Ex. 2 | 84.3 | 80.0 (4.3) | 81.0 (3.3) | 59.3 | 55.2 | 63.2 | 72.9 |

| Ex. | Blue color production (20° C., 65% HR) Plasticizer resistance of produced color marks (Y) | Water resistance of produced color marks | Low-temp. color production (5° C., 60% RH) Color density produced by color-developing sheet (Y) 1.5 minutes later | 24 hours later |
|---|---|---|---|---|
| 66 | 54.5 | Good | 59.5 | 55.2 |
| 67 | 55.1 | Good | 62.1 | 56.1 |
| 68 | 55.2 | Good | 63.0 | 57.0 |
| 69 | 55.0 | Good | 60.5 | 55.8 |
| 70 | 55.7 | Good | 64.7 | 57.2 |
| 71 | 56.7 | Good | 59.9 | 56.4 |
| 72 | 55.2 | Good | 62.2 | 56.8 |
| Comp. Ex. 1 | 55.8 | Good | 65.4 | 57.8 |
| Comp. Ex. 2 | 59.6 | Faded out | 70.5 | 57.6 |

*Each value in parentheses is a difference in WB value between an untreated sheet and the same sheet after its test.

EXAMPLE 73

(a) Synthesis of salicylic acid resin and its multivalent metal-modified product Charged in a glass-made reactor were 27.6 g (0.2 mole) of salicylic acid, 44.8 g (0.4 mole) of benzyl methyl ether, and 0.76 g of p-toluenesulfonic acid and 0.76 g of anhydrous zinc chloride as catalysts. The reactants were condensed for 3 hours at 125°–135° C. under a nitrogen gas stream. Thereafter, the reaction temperature was raised to 145° C. and the reaction was allowed to proceed further for 2 hours. The internal temperature was cooled to 100° C. and 1.3 g of anhydrous aluminum chloride was charged, followed by a dropwise addition of 112.5 g (0.8 mole) of p-methylbenzyl chloride at the same temperature over 5 hours. Thereafter, the reaction mixture was aged at the same temperature for 5 hours to complete the reaction. Under stirring, 200 ml of toluene and 60 g of water were added to the reaction mixture and the resulting mixture was allowed to stand and separate into layers. The weight average molecular weight of a resin obtained here was 1420. The upper solvent layer was charged in a separate glass-made reactor, followed by addition of 20 g of 28% aqueous ammonia and 8.1 g (0.1 mole) of zinc oxide. The resultant mixture was stirred for 1 hour at room temperature. The reaction mixture was then heated to distill out the solvent. The internal temperature was raised to 150° C., at which the reaction product was aged for 2 hours. The reaction product was degasified for 30 minutes in a vacuum of 20 mmHg and was then taken out of the reactor, thereby obtaining 153.5 g of a transparent zinc-modified salicylic acid resin of a reddish brown color (stoichiometric yield).

The softening point of the zinc-modified resin was measured by the ring and ball softening point measuring apparatus in accordance with the method prescribed in JIS K-2548. It was found to be 92° C.

(b) Use of the zinc-modified resin as a color-developing agent

Using the zinc-modified salicylic acid resin as a color-developing agent, color-developing sheets were obtained in the same manner as in the procedure (c) of Example 1.

EXAMPLE 74

Charged in a reactor were 27.6 g (0.2 mole) of salicylic acid, 40.8 g (0.3 mole) of p-methyl-α-methylbenzyl alcohol, 100 ml of monochlorobenzene, and 0.7 g of anhydrous zinc chloride as a catalyst. They were reacted for 5 hours under reflux of the solvent. Water, which was distilled out in the course of the reaction, was removed by a water separator. After the reaction, 300 ml of warm water was added, the resultant mixture was stirred at 90° C. or higher for 20 minutes, and the upper water layer was removed. That warm water washing and separation procedure was repeated two more times to remove unreacted salicylic acid. After drying the monochlorobenzene solution with salt cake, 0.5 g of anhydrous zinc chloride was added and under reflux of monochlorobenzene, 38 g (0.3 mole) of benzyl chloride was added dropwise over 5 hours. After the reaction, the reaction mixture was aged for 3 hours at the same temperature. The weight average molecular weight of the thus-formed resin was 970. The resin was added with 1500 ml of water, followed by a dropwise addition of 36 g (0.4 mole) of a 45% aqueous solution of caustic soda. The reaction mixture was then heated to distill out the solvent azeotropically, whereby an aqueous solution was obtained in a somewhat clouded state. The solution was cooled to 40° C., to which was added dropwise an aqueous solution formed in advance by dissolving 29 g (0.1 mole) of zinc sulfate heptahydrate in 200 ml of water. A white precipitate was formed. The precipitate was collected by filtration, washed with water and then dried in vacuo, thereby obtaining 85 g of the zinc salt of the salicylic acid resin. As a result of an elemental analysis, the content of zinc was found to be 7.56%. Using the zinc-modified salicylic acid resin, color-developing sheets were obtained in the same manner as in Example 73.

EXAMPLE 75

Charged in a reactor were 27.6 g (0.2 mole) of salicylic acid, 86.4 g (0.8 mole) of benzyl alcohol, and 1.2 g of zinc chloride as a catalyst. They were condensed for 5 hours at 125°–135° C. under a nitrogen gas stream. The reaction temperature was thereafter raised to 145° C., at which the reaction was allowed to proceed further for 2 hours. Then, 13.5 g of anhydrous zinc chloride was charged to the reaction mixture. At the same temperature, 76 g (0.6 mole) of benzyl chloride was added dropwise over 5 hours. After the dropwise addition, the reaction mixture was aged for 2 hours at the same temperature to complete the reaction. The weight average molecular weight of the resultant condensation resin was 2250.

To the reaction mixture, 150 ml of toluene was added to dissolve same. Dilute aqueous ammonia was then added dropwise at 70°–80° C. to adjust the pH of the reaction mixture to 6. Thereafter, the mixture was stirred for 1 hour at 70°–80° C. to complete the reaction. After the completion of the reaction, the lower layer, i.e., water layer was removed and the organic layer was heated and concentrated. The thus-obtained molten resin was then taken out of the reactor, cooled and then ground, thereby obtaining 148 g of a zinc-modified product of the salicylic acid resin as powder. The softening point of the zinc-modified product was measured by the ring and ball softening point measuring apparatus in accordance with the method prescribed in JIS K-2548. It was found to be 91° C.

Using the zinc-modified salicylic acid resin, color-developing sheets were obtained in the same manner as in Example 73.

EXAMPLE 76

Charged in a reactor were 27.6 (0.2 mole) of salicylic acid, 59.5 g (0.3 mole) of dibenzyl ether, and 1.2 g of aluminum chloride hexahydrate as a catalyst. A first-stage reaction was carried out for 8 hours at 125°–150° C. Then, 14.8 g of anhydrous zinc chloride was added to the reaction mixture. At the same temperature, 76 g (0.6 mole) of benzyl chloride was added dropwise over 5 hours, following by aging for 2 hours at the same temperature. The weight average molecular weight of the resultant condensation resin was 1640. The reaction mixture was zinc-modified in the same manner as in Example 75, thereby obtaining 135 g of a zinc-modified product having a softening point of 96° C. Using the zinc-modified salicylic acid resin, color-developing sheets were obtained in the same manner as in Example 73.

EXAMPLES 77–82

Various multi-valent metal-modified salicylic acid resins were obtained separately in the same manner as in Example 73 except that the kind of the benzyl alcohol, benzyl alkyl ether or dibenzyl ether, its molar ratio to salicylic acid, the kind and mount of the benzyl halide, the kind and amount of the catalyst used and reaction conditions were changed respectively as shown in Table 16. The softening points of the thus-obtained metal-modified products are shown in Table 16.

Using those multi-valent metal-modified salicylic acid resins, color-developing sheets were thereafter obtained in the same manner as in Example 1.

EXAMPLES 83 & 84

Suspensions of the color-developing agents obtained respectively in Examples 73 and 79 were formulated separately into coating formulations of the composition employed in Examples 13 and 14, and color-developing sheets were then obtained correspondingly.

TABLE 16

MULTIVALENT METAL-MODIFIED SALICYLIC ACID RESIN

| | First-stage reaction | | | | | | Second-stage reaction | | | |
|---|---|---|---|---|---|---|---|---|---|---|
| | Starting material | | | | | | Starting material | | | |
| | Salicylic acid | Benzyl compound | | Catalyst | | Reaction conditions | Benzyl halide compound | | Catalyst | |
| Ex. | (mole) | Kind | Amount (mole) | Kind | Amount (g) | (°C./hr) | Kind | Amount (mole) | Kind | Amount (g) |
| 77 | 0.2 | 3,4-Dimethyl-benzyl alcohol | 0.4 | p-Toluene-sulfonic acid | 2.0 | 150–160/10 | 2,3-Dimethyl-benzyl fluoride | 1.0 | Zinc chloride | 1.5 |
| 78 | 0.2 | p-Benzylbenzyl alcohol | 0.4 | Zinc chloride | 0.6 | 120–145/7 | Benzyl chloride | 0.6 | Zinc chloride | 1.5 |
| 79 | 0.2 | α-Methylbenzyl methyl ether | 0.4 | Stannic chloride | 0.6 | 120–140/5 | α-Methylbenzyl chloride | 0.8 | Stannic chloride | 2.4 |
| 80 | 0.2 | o-Methylbenzyl isopropyl ether | 0.4 | Zinc chloride p-Sulfonic acid | 0.5 0.5 | 120–140/5 | o-Methylbenzyl chloride | 0.8 | Anhydrous aluminum chloride | 0.8 |
| 81 | 0.2 | Di(p-methyl-benzyl) ether | 0.2 | Zinc chloride | 0.6 | 120–145/8 | Benzyl bromide | 0.8 | Zinc chloride | 0.4 |
| 82 | 0.2 | Di(3,5-dimethyl-benzyl) ether | 0.2 | Zinc chloride | 0.6 | 120–145/8 | 3,5-Dimethyl-benzyl chloride | 0.6 | Zinc chloride | 0.4 |

| | Second-stage reaction | | Third-stage reaction | | | | | |
|---|---|---|---|---|---|---|---|---|
| | Reaction conditions | Weight average molecular weight | Starting material Metal modifier | | Additive | | Reaction conditions | Softening* point |
| Ex. | (°C./hr) | (Mw) | Kind | Amount (g) | Kind | Amount | (°C./hr) | (°C.) |
| 77 | 70–75/6 | 1920 | Zinc hydroxide | 10 | — | — | 130–160/2 | 98 |
| 78 | 90–100/10 | 1550 | Zinc benzoate | 33 | Ammonium bicarbonate | 20 | 150–160/2 | 88 |
| 79 | 90–100/10 | 1400 | Zinc oxide | 8.1 | — | — | 120–150/3 | 92 |
| 80 | 90–100/10 | 1420 | Zinc oxide | 8.1 | — | — | 120–150/3 | 93 |
| 81 | 100–105/10 | 1250 | Nickel acetate | 13.5 | — | — | 150–160/4 | 105 |
| 82 | 120–130/8 | 1330 | Zinc oxide | 8.1 | — | — | 120–150/3 | 90 |

*measured by the ring and ball softening point measuring apparatus prescribed in JIS K-2548.

The color-developing sheets obtained in Examples 73–84 were subjected along with the color-developing sheets of Comparative Examples 1 and 2 to a performance test. Results are shown in Table 17.

TABLE 17

PERFORMANCE TEST RESULTS OF COLOR-DEVELOPING SHEETS

| | | | | Blue color production (20° C., 65% HR) | | | |
|---|---|---|---|---|---|---|---|
| | | NOx yellowing resistance of | Light yellowing resistance of | Color density produced by color-developing sheet (Y) | | Light fastness of produced color marks (Y) | |
| | WB value of untested | color-developing | color-developing | 1.5 minutes | 24 hours | | |
| Ex. | sheet | sheet (WB value) | sheet (WB value) | later | later | 2 hours | 4 hours |
| 73 | 84.9 | 82.1 (2.8)* | 81.8 (3.1)* | 57.8 | 55.4 | 61.5 | 68.3 |
| 74 | 85.0 | 82.8 (2.2) | 82.4 (2.6) | 57.6 | 54.2 | 60.0 | 67.2 |
| 75 | 84.2 | 81.8 (2.4) | 81.4 (2.8) | 57.3 | 55.0 | 62.0 | 69.5 |
| 76 | 84.3 | 81.7 (2.6) | 81.5 (2.8) | 57.9 | 56.0 | 62.5 | 70.0 |
| 77 | 85.6 | 81.9 (3.7) | 82.0 (3.6) | 56.6 | 54.0 | 63.0 | 71.1 |
| 78 | 84.4 | 81.6 (2.8) | 81.5 (2.9) | 58.0 | 55.2 | 61.1 | 68.3 |
| 79 | 84.9 | 82.6 (2.3) | 82.5 (2.4) | 56.2 | 54.3 | 62.7 | 69.5 |
| 80 | 84.7 | 81.5 (3.2) | 81.2 (3.5) | 56.9 | 55.2 | 62.2 | 68.7 |
| 81 | 85.0 | 82.0 (3.0) | 83.5 (1.5) | 59.5 | 54.9 | 59.0 | 63.8 |
| 82 | 84.1 | 81.5 (2.6) | 80.9 (3.2) | 57.5 | 55.2 | 62.1 | 69.9 |
| 83 | 84.7 | 82.0 (2.7) | 82.5 (2.2) | 57.5 | 55.2 | 60.2 | 67.5 |
| 84 | 84.7 | 82.2 (2.5) | 82.8 (1.9) | 56.5 | 55.4 | 61.1 | 67.5 |
| Comp. Ex. 1 | 83.9 | 57.2 (26.7) | 71.9 (12.0) | 61.9 | 56.9 | 67.6 | 77.1 |
| Comp. Ex. 2 | 84.3 | 80.0 (4.3) | 81.0 (3.3) | 59.3 | 55.2 | 63.2 | 72.9 |

Blue color production (20° C., 65% HR)  Low-temp. color production (5° C., 60% RH)

TABLE 17-continued

PERFORMANCE TEST RESULTS OF COLOR-DEVELOPING SHEETS

| Ex. | Plasticizer resistance of produced color marks (Y) | Water resistance of produced color marks | Color density produced by color-developing sheet (Y) | |
|---|---|---|---|---|
| | | | 1.5 minutes later | 24 hours later |
| 73 | 54.2 | Good | 62.4 | 55.8 |
| 74 | 54.0 | Good | 61.7 | 54.9 |
| 75 | 56.1 | Good | 63.5 | 55.8 |
| 76 | 56.5 | Good | 62.0 | 56.1 |
| 77 | 56.5 | Good | 61.2 | 55.8 |
| 78 | 53.2 | Good | 63.5 | 55.8 |
| 79 | 54.7 | Good | 62.2 | 54.5 |
| 80 | 54.9 | Good | 61.8 | 55.5 |
| 81 | 54.9 | Good | 64.2 | 55.4 |
| 82 | 54.8 | Good | 61.9 | 55.9 |
| 83 | 54.9 | Good | 63.3 | 56.7 |
| 84 | 55.6 | Good | 62.8 | 55.1 |
| Comp. Ex. 1 | 55.8 | Good | 65.4 | 57.8 |
| Comp. Ex. 2 | 59.6 | Faded out | 70.5 | 57.6 |

*Each value in parentheses is a difference in WB value between an untreated sheet and the same sheet after its test.

EXAMPLE 85

Charged in a glass-made reactor were 27.6 g (0.2 mole) of salicylic acid, 44.8 g (0.4 mole) of benzyl methyl ether, and 0.76 g of p-toluene sulfonic acid and 0.76 g of anhydrous zinc chloride as catalysts. They were condensed for 3 hours at 125°-135° C. under a nitrogen gas stream. The reaction temperature was thereafter raised to 145° C., at which the reaction was allowed to proceed further for 2 hours. The internal temperature was then cooled to 70° C., followed by an addition of 150 ml of 1,2-dichloroethane. The resultant mixture was cooled to room temperature. Thereafter, 7.5 g of 96% sulfuric acid was charged, followed by a dropwise addition of 83.2 g (0.8 mole) of styrene with vigorous stirring at 20°-30° C. over 5 hours. After the dropwise addition, the reaction mixture was aged for 5 hours at the same temperature to complete the reaction. To the reaction mixture, 60 g of water was added under stirring and the resultant mixture was allowed to stand and to separate into layers. The weight average molecular weight of the resultant condensation resin was 1380. The lower layer, namely, the solvent layer was charged in another glass-made reactor, to which 20 g of 28% aqueous ammonia and 8.1 g (0.1 mole) of zinc oxide were added. The resultant mixture was stirred for 1 hour at room temperature. The reaction mixture was then heated and reacted at 60°-70° C. for 1 hour. The reaction mixture was thereafter heated to distill out the solvent. After raising the internal temperature to 150° C., the reaction product was degasified for 30 minutes in a vacuum of 20 mmHg and was then taken out of the reactor, thereby obtaining 156 g of a transparent zinc-modified salicylic acid resin of a reddish brown color (stoichiometric yield).

The softening point of the zinc-modified resin was measured by the ring and ball softening point measuring apparatus in accordance with the method prescribed in JIS K-2548. It was found to be 85° C.

(c) Use of the zinc-modified resin as a color-developing agent

Using the zinc-modified salicylic acid resin as a color-developing agent, color-developing sheets were obtained in the same manner as in the procedure (c) of Example 1.

EXAMPLE 86

Charged in a reactor were 27.6 g (0.2 mole) of salicylic acid, 40.8 g (0.3 mole) of p-methyl-α-methylbenzyl alcohol, 100 ml of monochlorobenzene, and 0.7 g of anhydrous zinc chloride as a catalyst. They were reacted for 5 hours under reflux of the solvent. Water, which was distilled out in the course of the reaction, was removed by a water separator. After the reaction, 300 ml of warm water was added, the resultant mixture was stirred at 90° C. or higher for 20 minutes, and the upper water layer was removed. That warm water washing and separation procedure was repeated two more times to remove unreacted salicylic acid. The monochlorobenzene solution was cooled to 5° C., followed by an addition of 10 g of concentrated sulfuric acid. To the resultant mixture, 31.2 g (0.3 mole) of styrene was added dropwise at 5°-10° C. over 7 hours. After the reaction, the reaction mixture was aged for 3 hours at the same temperature. The weight average molecular weight of the thus-formed resin was 1150. The resin was added with 1500 ml of water, followed by a dropwise addition of 36 g (0.4 mole) of a 45% aqueous solution of caustic soda. The reaction mixture was then heated to distill out the solvent azeotropically, whereby an aqueous solution was obtained in a somewhat clouded state. The solution was cooled to 40° C., to which was added dropwise an aqueous solution formed in advance by dissolving 29 g (0.1 mole) of zinc sulfate heptahydrate in 200 ml of water. A white precipitate was formed. The precipitate was collected by filtration, washed with water and then dried in vacuo, thereby obtaining 92 g of the zinc salt of the salicylic acid resin. As a result of an elemental analysis, the content of zinc was found to be 6.78%. Using the zinc-modified salicylic acid resin, color-developing sheets were obtained in the same manner as in Example 85.

EXAMPLES 87–100

Various multi-valent metal-modified salicylic acid resins were produced in the same manner as in Example 85 except that the kind of the benzyl alcohol or benzyl alkyl ether, its molar ratio to salicylic acid, the kind and amount of the styrene, the kind and amount of the catalyst used and reaction conditions were changed as shown in Table 18. The softening points of the resultant metal-modified products are also shown in Table 18.

Using those multi-valent metal modified salicylic acid resins, color-developing sheets were produced in the same manner as in Example 85.

TABLE 18-1

MULTIVALENT METAL-MODIFIED SALICYLIC ACID RESIN

First-stage reaction

| | Starting material | | | Catalyst | | Reaction |
|---|---|---|---|---|---|---|
| | Salicylic acid | Benzyl compound | | | Amount | conditions |
| Ex. | (mole) | Kind | Amount (mole) | Kind | (g) | (°C./hr) |
| 87 | 0.2 | Benzyl alcohol | 1.2 | Stannic chloride | 0.65 | 130–150/5 |
| 88 | 0.2 | p-Methylbenzyl methyl ether | 0.4 | Sulfuric acid | 0.1 | 150–160/5 |
| 89 | 0.2 | α-Methylbenzyl alcohol | 0.6 | p-Toluenesulfonic acid Zinc chloride | 1 | 110–145/5 |
| 90 | 0.2 | α-Methylbenzyl ethyl ether | 0.4 | p-Toluenesulfonic acid Zinc chloride | 1 | 110–145/5 |
| 91 | 0.2 | p-Methyl-α-methylbenzyl methyl ether | 0.4 | p-Toluenesulfonic acid Zinc chloride | 1 | 110–145/5 |
| 92 | 0.2 | 2,4-Diethyl-α-methylbenzyl alcohol | 0.4 | p-Toluenesulfonic acid Zinc chloride | 1 | 110–145.5 |
| 93 | 0.2 | 3,5-Dimethylbenzyl isopropyl ether | 0.4 | p-Toluenesulfonic acid Zinc chloride | 1 | 110–145/5 |

Second-stage reaction

| | Starting material Styrene compound | | Catalyst | | Reaction conditions | Weight average molecular weight |
| Ex. | Kind | Amount (mole) | Kind | Amount (g) | (°C./hr) | (Mw) |
|---|---|---|---|---|---|---|
| 87 | α-Methylstyrene | 0.2 | Sulfuric acid | 10 | 20–30/9 | 2450 |
| 88 | Styrene | 0.4 | Methanesulfonic acid | 15 | 50–60/12 | 1400 |
| 89 | Styrene | 0.2 | Sulfuric acid | 7.5 | 20–30/9 | 1250 |
| 90 | p-Methylstyrene | 0.8 | Sulfuric acid | 7.5 | 20–30/9 | 1200 |
| 91 | Styrene | 0.8 | Sulfuric acid | 7.5 | 20–30/9 | 1650 |
| 92 | Styrene | 0.8 | Sulfuric acid | 7.5 | 20–30/9 | 2850 |
| 93 | Styrene | 0.6 | Sulfuric acid | 7.5 | 20–30/9 | 2000 |

Third-stage reaction

| | Starting material Metal modifier | | Additive | | Reaction conditions | Softening* point |
| Ex. | Kind | Amount (g) | Kind | Amount | (°C./hr) | (°C.) |
|---|---|---|---|---|---|---|
| 87 | Zinc oxide | 8.1 | 28% aq. ammonia | 20 | 60–80/1 | 78 |
| 88 | Nickel chloride hexahydrate | 24 | 28% aq. ammonia | 21 | 60–80/1 | 91 |
| 89 | Zinc oxide | 8.1 | 28% aq. ammonia | 18 | 60–80/1 | 64 |
| 90 | Zinc oxide | 8.1 | 28% aq. ammonia | 18 | 60–80/1 | 96 |
| 89 | Zinc oxide | 8.1 | 28% aq. ammonia | 18 | 60–80/1 | 86 |
| 89 | Zinc oxide | 8.1 | 28% aq. ammonia | 18 | 60–80/1 | 95 |
| 89 | Zinc oxide | 8.1 | 28% aq. ammonia | 18 | 60–80/1 | 87 |

*measured by the ring and ball softening point measuring apparatus prescribed in JIS K-2548.

TABLE 18-2

MULTIVALENT METAL-MODIFIED SALICYLIC ACID RESIN

| | First-stage reaction | | | | | Second-stage reaction | | | |
|---|---|---|---|---|---|---|---|---|---|
| | Starting material | | | | | Starting material | | | |
| | Salicylic acid | Benzyl compound | | Catalyst | | Reaction | Styrene compound | | Catalyst | |
| Ex. | (mole) | Kind | Amount (mole) | Kind | Amount (g) | conditions (°C./hr) | Kind | Amount (mole) | Kind | Amount (g) |
| 94 | 0.2 | o-Methylbenzyl alcohol | 0.4 | p-Toluenesulfonic acid Zinc chloride | 1 | 110–145/5 | Styrene | 0.8 | Phosphoric acid | 12 |
| 95 | 0.2 | p-Ethylbenzyl n-butyl ether | 0.4 | p-Toluenesulfonic acid Zinc chloride | 1 | 110–145/5 | Styrene | 1.2 | Aluminum chloride | 3 |
| 96 | 0.2 | p-Phenyl-α-methylbenzyl alcohol | 0.4 | p-Toluenesulfonic acid Zinc chloride | 1 | 110–145/5 | Styrene | 0.8 | Sulfuric acid | 7.5 |
| 97 | 0.2 | p-(α-Methylbenzyl)benzyl | 0.4 | p-Toluenesulfonic acid | 1 | 110–145/5 | Styrene | 0.8 | Sulfuric acid | 7.5 |

TABLE 18-2-continued

MULTIVALENT METAL-MODIFIED SALICYLIC ACID RESIN

| 98 | 0.2 | p-Methyl-α-ethylbenzyl ethyl ether | 0.4 | Zinc chloride p-Toluenesulfonic acid Zinc chloride | 1 | 110-145/5 | β-Methylstyrene | 0.8 | Sulfuric acid | 7.5 |
|---|---|---|---|---|---|---|---|---|---|---|
| 99 | 0.2 | 3,4-Dimethyl-α-methylbenzyl methyl ether | 0.4 | p-Toluenesulfonic acid Zinc chloride | 1 | 110-145/5 | Styrene | 0.8 | Sulfuric acid | 7.5 |
| 100 | 0.2 | 2-Methyl-4-(α-methylbenzyl)-α-methylbenzyl methyl ether | 0.4 | p-Toluenesulfonic acid Zinc chloride | 1 | 110-145/5 | Styrene | 0.8 | Sulfuric acid | 7.5 |

| | Second-stage reaction | | Third-stage reaction | | | | | |
|---|---|---|---|---|---|---|---|---|
| | Reaction conditions | Weight average molecular weight | Starting material Metal modifier | | Additive | | Reaction conditions | Softening* point |
| Ex. | (°C./hr) | (Mw) | Kind | Amount (g) | Kind | Amount | (°C./hr) | (°C.) |
| 94 | 70-85/5 | 1400 | Zinc hydroxide | 10 | — | — | 130-160/2 | 85 |
| 95 | 20-30/18 | 3500 | Zinc benzoate | 33 | Ammonium bicarbonate | 20 | 150-160/2 | 90 |
| 96 | 20-30/9 | 1750 | Zinc oxide | 8.1 | 28% aq. ammonia | 20 | 60-80/1 | 94 |
| 97 | 20-30/9 | 1520 | Zinc oxide | 8.1 | 28% aq. ammonia | 20 | 60-80/1 | 91 |
| 98 | 20-30/9 | 1300 | Zinc oxide | 8.1 | 28% aq. ammonia | 20 | 60-80/1 | 93 |
| 99 | 20-30/9 | 1420 | Magnesium oxide | 4 | 28% aq. ammonia | 20 | 60-80/1 | 87 |
| 100 | 20-30/9 | 1680 | Zinc oxide | 8.1 | 28% aq. ammonia | 20 | 60-80/1 | 85 |

*measured by the ring and ball softening point measuring apparatus prescribe in JIS K-2548.

EXAMPLES 101 & 102

Suspensions of the color-developing agents obtained respectively in Examples 85 and 90 were formulated separately into coating formulations of the composition employed in Examples 13 and 14, and color-developing sheets were then obtained correspondingly. The color-developing sheets obtained in Examples 85-102 were subjected along with the color-developing sheets of Comparative Examples 1 and 2 to a performance test. Results are shown in Table 19.

TABLE 19

PERFORMANCE TEST RESULTS OF COLOR-DEVELOPING SHEETS

| | | | | Blue color production (20° C., 65% HR) | | | |
|---|---|---|---|---|---|---|---|
| | WB value of untested sheet | NOx yellowing resistance of color-developing sheet (WB value) | Light yellowing resistance of color-developing sheet (WB value) | Color density produced by color-developing sheet (Y) | | Light fastness of produced color marks (Y) | |
| Ex. | | | | 1.5 minutes later | 24 hours later | 2 hours | 4 hours |
| 85 | 84.8 | 82.0 (2.8)* | 82.5 (2.3)* | 57.5 | 55.2 | 61.3 | 67.9 |
| 86 | 84.3 | 82.1 (2.2) | 82.0 (2.3) | 57.4 | 54.0 | 63.0 | 71.2 |
| 87 | 84.6 | 82.2 (2.4) | 81.5 (3.1) | 57.3 | 55.0 | 63.5 | 71.2 |
| 88 | 84.5 | 82.2 (2.3) | 81.9 (2.6) | 57.3 | 54.2 | 62.0 | 69.5 |
| 89 | 84.2 | 82.2 (2.2) | 82.0 (2.2) | 57.5 | 54.1 | 62.1 | 69.8 |
| 90 | 84.7 | 82.2 (2.5) | 81.6 (3.1) | 57.2 | 54.2 | 62.2 | 69.7 |
| 91 | 84.5 | 82.0 (2.5) | 82.3 (2.2) | 56.9 | 54.0 | 61.2 | 68.5 |
| 92 | 84.6 | 82.6 (2.0) | 82.1 (2.5) | 57.1 | 54.1 | 61.9 | 69.2 |
| 93 | 84.3 | 82.5 (1.8) | 81.9 (2.4) | 57.0 | 54.5 | 62.2 | 70.2 |
| 94 | 84.4 | 81.9 (2.5) | 81.6 (2.8) | 57.1 | 54.0 | 62.3 | 70.4 |
| 95 | 84.8 | 82.6 (2.2) | 81.2 (3.6) | 56.0 | 53.9 | 62.5 | 68.7 |
| 96 | 84.6 | 81.7 (2.9) | 81.3 (3.3) | 56.5 | 54.5 | 62.6 | 70.6 |
| 97 | 84.5 | 82.0 (2.5) | 82.3 (2.2) | 57.2 | 54.6 | 62.2 | 69.9 |
| 98 | 84.4 | 82.1 (2.3) | 82.0 (2.4) | 57.8 | 54.5 | 62.5 | 70.0 |
| 99 | 84.4 | 82.0 (2.4) | 81.9 (2.5) | 57.5 | 54.2 | 62.6 | 70.1 |
| 100 | 84.7 | 82.1 (2.6) | 81.7 (3.0) | 57.2 | 54.2 | 61.9 | 69.2 |
| 101 | 84.6 | 82.2 (2.4) | 81.5 (3.1) | 57.7 | 54.5 | 61.8 | 69.3 |
| 102 | 84.5 | 81.9 (2.6) | 82.0 (2.5) | 57.6 | 54.6 | 62.0 | 69.8 |
| Comp. Ex. 1 | 83.9 | 57.2 (26.7) | 71.9 (12.0) | 61.9 | 56.9 | 67.6 | 77.1 |
| Comp. Ex. 2 | 84.3 | 80.0 (4.3) | 81.0 (3.3) | 59.3 | 55.2 | 61.2 | 72.9 |

| | Blue color production (20° C., 65% HR) | | Low-temp. color production (5° C., 60% RH) | |
|---|---|---|---|---|
| | Plasticizer resistance of produced color marks | Water resistance of produced | Color density produced by color-developing sheet (Y) | |
| | | | 1.5 minutes | 24 hours |

TABLE 19-continued

| Ex. | (Y) | color marks | later | later |
|---|---|---|---|---|
| 85 | 49.8 | Good | 62.3 | 55.5 |
| 86 | 51.2 | Good | 61.5 | 54.8 |
| 87 | 52.2 | Good | 60.8 | 55.6 |
| 88 | 49.9 | Good | 59.8 | 54.6 |
| 89 | 49.8 | Good | 60.0 | 54.8 |
| 90 | 49.5 | Good | 60.5 | 55.0 |
| 91 | 50.2 | Good | 60.5 | 54.9 |
| 92 | 49.9 | Good | 60.5 | 55.0 |
| 93 | 49.7 | Good | 61.2 | 55.0 |
| 94 | 49.3 | Good | 59.2 | 54.8 |
| 95 | 50.4 | Good | 61.2 | 54.2 |
| 96 | 49.5 | Good | 60.5 | 54.5 |
| 97 | 49.3 | Good | 60.4 | 54.7 |
| 98 | 50.2 | Good | 61.3 | 54.9 |
| 99 | 49.5 | Good | 61.4 | 55.0 |
| 100 | 49.6 | Good | 61.5 | 54.8 |
| 101 | 50.3 | Good | 61.2 | 54.9 |
| 102 | 49.8 | Good | 61.5 | 54.9 |
| Comp. Ex. 1 | 55.8 | Good | 65.4 | 57.8 |
| Comp. Ex. 2 | 59.6 | Faded out | 70.5 | 57.6 |

*Each value in parentheses is a difference in WB value between an untreated sheet and the same sheet after its test.

EXAMPLE 103

(a) Synthesis of salicylic acid resin and its multi-valent metal-modified product Charged in a glass-made reactor were 27.6 g (0.2 mole) of salicylic acid, 39.7 g (0.2 mole) of dibenzyl ether, and 0.7 g of p-toluenesulfonic acid and 0.7 g of anhydrous zinc chloride as catalysts. The reactants were condensed for 3 hours at 125°–135° C. under a nitrogen gas stream. Thereafter, the reaction temperature was raised to 145° C. and the reaction was allowed to proceed further for 2 hours. The internal temperature was cooled to 70° C. and 150 ml of 1,2-dichloroethane was charged. The reaction mixture was allowed to cool down to room temperature. Thereafter, 7.5 g of 96% sulfuric acid was charged, followed by a dropwise addition of 83.2 g (0.8 mole) of styrene with vigorous stirring at 20°–30° C. over 5 hours. After the dropwise addition, the reaction mixture was aged for 5 hours at the same temperature to complete the reaction. To the reaction mixture, 60 g of water was added under stirring and the resultant mixture was allowed to stand and to separate into layers. The weight average molecular weight of the resultant condensation resin was 1100. The lower layer, namely, the solvent layer was charged in another glass-made reactor, to which 10 g of 28% aqueous ammonia and 8.1 g (0.1 mole) of zinc oxide were added. The resultant mixture was stirred for 1 hour at room temperature. The reaction mixture was then heated and reacted at 60°–70° C. for 1 hour. The reaction mixture was thereafter heated to distill out the solvent. After raising the internal temperature to 150° C., the reaction product was degasified for 30 minutes in a vacuum of 20 mmHg and was then taken out of the reactor, thereby obtaining 155 g of a transparent zinc-modified salicylic acid resin of a reddish brown color (stoichiometric yield).

The softening point of the zinc-modified resin was measured by the ring and ball softening point measuring apparatus in accordance with the method prescribed in JIS K-2548. It was found to be 78° C.

(c) Use of the zinc-modified resin as a color-developing agent

Using the zinc-modified salicylic acid resin as a color-developing agent, color-developing sheets were obtained in the same manner as in the procedure (c) of Example 1.

EXAMPLE 104

Charged in a reactor were 27.6 g (0.2 mole) of salicylic acid, 38.1 g (0.15 mole) of di(p-methyl-α-methylbenzyl) ether, 100 ml of monochlorobenzene, and 0.7 g of anhydrous zinc chloride as a catalyst. They were reacted for 5 hours under reflux of the solvent. Water, which was distilled out in the course of the reaction, was removed by a water separator. After the reaction, 300 ml of warm water was added, the resultant mixture was stirred at 90° C. or higher for 20 minutes, and the upper water layer was removed. That warm water washing and separation procedure was repeated two more times to remove unreacted salicylic acid. The monochlorobenzene solution was cooled to 5° C., followed by an addition of 10 g of concentrated sulfuric acid. To the resultant mixture, 31.2 g (0.3 mole) of styrene was added dropwise at 5°–10° C. over 7 hours. After the reaction, the reaction mixture was aged for 3 hours at the same temperature. The weight average molecular weight of the thus-formed resin was 850. The resin was added with 1500 ml of water, followed by a dropwise addition of 36 g (0.4 mole) of a 45% aqueous solution of caustic soda. The reaction mixture was then heated to distill out the solvent azeotropically, whereby an aqueous solution was obtained in a somewhat clouded state. The solution was cooled to 40° C., to which was added dropwise an aqueous solution formed in advance by dissolving 29 g (0.1 mole) of zinc sulfate heptahydrate in 200 ml of water. A white precipitate was formed. The precipitate was collected by filtration, washed with water and then dried in vacuo, thereby obtaining 90 g of the zinc salt of the salicylic acid resin. As a result of an elemental analysis, the content of zinc was found to be 6.50%. Using the zinc-modified salicylic acid resin, color-developing sheets were obtained in the same manner as in Example 103.

EXAMPLES 105–108

Various multi-valent metal-modified salicylic acid resins were produced in the same manner as in Example 103 except that the kind of the dibenzyl ether, its molar ratio to salicylic acid, the kind and amount of the styrene, the kind and amount of the catalyst used and reaction conditions were changed as shown in Table 20. The softening points of the resultant metal-modified products are also shown in Table 20.

Using those multi-valent metal modified salicylic acid resins, color-developing sheets were produced in the same manner as in Example 1.

EXAMPLES 109 & 110

Suspensions of the color-developing agents obtained respectively in Examples 103 and 108 were formulated separately into coating formulations of the composition employed in Examples 13 and 14, and color-developing sheets were then obtained correspondingly.

TABLE 20
MULTIVALENT METAL-MODIFIED SALICYLIC ACID RESIN

| | First-stage reaction | | | | | Second-stage reaction | | | |
|---|---|---|---|---|---|---|---|---|---|
| | Starting material | | | | | Starting material | | | |
| | Salicylic acid | Benzyl compound | | Catalyst | | Reacton conditions | Styrene compound | | Catalyst | |
| Ex. | (mole) | Kind | Amount (mole) | Kind | Amount (g) | (°C./hr) | Kind | Amount (mole) | Kind | Amount (g) |
| 105 | 0.2 | Dibenzyl ether | 0.6 | Stannic chloride | 0.65 | 130–150/5 | α-Methyl-styrene | 0.2 | Sulfuric acid | 10 |
| 106 | 0.2 | Di(p-methyl-benzyl) ether | 0.2 | Sulfuric acid | 0.1 | 150–160/5 | Styrene | 0.4 | Methanesulfonic acid | 15 |
| 107 | 0.2 | Di(α-methyl-benzyl) ether | 0.2 | Aluminum chloride | 1 | 110–145/5 | p-Methyl-styrene | 0.8 | Sulfuric acid | 7.5 |
| 108 | 0.2 | Di(3,5-dimethyl-benzyl) ether | 0.4 | p-Toluenesulfonic acid Zinc chloride | 1 | 110–145/5 | Styrene | 0.6 | Sulfuric acid | 7.5 |

| | Second-stage reaction | | Third-stage reaction | | | | | |
|---|---|---|---|---|---|---|---|---|
| | Reaction conditions | Weight average molecular weight | Starting material Metal modifier | | Additive | | Reaction conditions | Softening* point |
| Ex. | (°C./hr) | (Mw) | Kind | Amount (g) | Kind | Amount | (°C./hr) | (°C.) |
| 105 | 20–30/9 | 1600 | Zinc oxide | 8.1 | 28% aq. ammonia | 20 | 60–80/1 | 62 |
| 106 | 50–30/9 | 1250 | Nickel chloride hexahydrate | 24 | 28% aq. ammonia | 21 | 60–80/1 | 94 |
| 107 | 5–7/9 | 1250 | Zinc oxide | 8.1 | 28% aq. ammonia | 20 | 60–80/1 | 89 |
| 108 | 5–7/9 | 1350 | Zinc benzoate | 32 | Ammonium bicarbonate | 20 | 150–160/2 | 90 |

*measured by the ring and ball softening point measuring apparatus prescribed in JIS K-2548.

The color-developing sheets obtained in Examples 103–110 were subjected along with the color-developing sheets of Comparative Examples 1 and 2 to a performance test. Results are shown in Table 21.

TABLE 21
PERFORMANCE TEST RESULTS OF COLOR-DEVELOPING SHEETS

| | | | | Blue color production (20° C., 65% HR) | | | |
|---|---|---|---|---|---|---|---|
| | WB value of untested sheet | NOx yellowing resistance of color-developing sheet (WB value) | Light yellowing resistance of color-developing sheet (WB value) | Color density produced by color-developing sheet (Y) | | Light fastness of produced color marks (Y) | |
| Ex. | | | | 1.5 minutes later | 24 hours later | 2 hours | 4 hours |
| 103 | 85.2 | 83.6 (1.8)* | 82.8 (2.4)* | 57.2 | 54.8 | 61.7 | 67.7 |
| 104 | 84.6 | 83.3 (1.3) | 83.4 (1.2) | 56.4 | 53.0 | 59.9 | 64.9 |
| 105 | 84.9 | 82.5 (2.4) | 81.6 (3.3) | 57.2 | 55.0 | 62.7 | 68.5 |
| 106 | 85.0 | 82.7 (2.3) | 83.8 (1.2) | 58.9 | 54.3 | 58.7 | 64.5 |
| 107 | 85.1 | 82.9 (2.2) | 83.1 (2.0) | 56.5 | 54.9 | 60.1 | 66.9 |
| 108 | 84.1 | 81.6 (2.5) | 82.7 (1.4) | 57.5 | 55.6 | 62.9 | 68.8 |
| 109 | 85.0 | 83.4 (1.6) | 83.2 (1.8) | 58.5 | 55.0 | 59.2 | 64.8 |
| 110 | 84.0 | 82.0 (2.0) | 83.1 (0.9) | 58.4 | 56.1 | 60.0 | 66.6 |
| Comp. Ex. 1 | 83.9 | 57.2 (26.7) | 71.9 (12.0) | 61.9 | 56.9 | 67.6 | 77.1 |
| Comp. Ex. 2 | 84.3 | 80.0 (4.3) | 81.0 (3.3) | 59.3 | 55.2 | 63.2 | 72.9 |

| | Blue color production (20° C., 65% HR) | | Low-temp. color production (5° C., 60% RH) | |
|---|---|---|---|---|
| | Plasticizer resistance of produced color marks (Y) | Water resistance of produced color marks | Color density produced by color-developing sheet (Y) | |
| Ex. | | | 1.5 minutes later | 24 hours later |
| 103 | 52.0 | Good | 61.5 | 54.9 |
| 104 | 53.1 | Good | 62.5 | 53.7 |
| 105 | 54.8 | Good | 60.5 | 54.9 |

TABLE 21-continued

PERFORMANCE TEST RESULTS OF COLOR-DEVELOPING SHEETS

| | | | | |
|---|---|---|---|---|
| 106 | 54.8 | Good | 62.9 | 55.5 |
| 107 | 54.5 | Good | 63.3 | 55.6 |
| 108 | 54.0 | Good | 62.2 | 56.1 |
| 109 | 53.1 | Good | 62.4 | 55.8 |
| 110 | 55.1 | Good | 63.6 | 57.2 |
| Comp. Ex. 1 | 55.8 | Good | 65.4 | 57.8 |
| Comp. Ex. 2 | 59.6 | Faded out | 70.5 | 57.6 |

*Each value in parentheses is a difference in WB value between an untreated sheet and the same sheet after its test.

We claim:

1. A copolymer comprising 5 to 40 mole percent of structural units (I), 10 to 95 mole percent of structural units (III) and having a weight average molecular weight of 500 to 10,000, each of said structural units (I) being coupled via the α-carbon of one of said structural units (II) with the benzene ring of said one of said structural units (II), one or more of said structural (II) being optionally coupled via the α-carbon or α-carbons thereof to the benzene ring or rings of another or other structural units (II), one or more of said structural units (III) being coupled via the α-carbon or α-carbons thereof with the benzene ring or rings of one or more structural units (II) and/or ring or rings of another or other structural units (III), and said structural units (I), (II) and (III) being represented respectively by the following formulae (I), (II) and (III):

Formula (I):

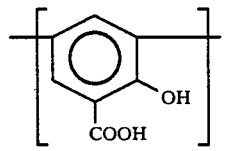

Formula (II):

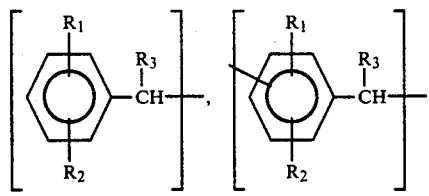

Formula (III):

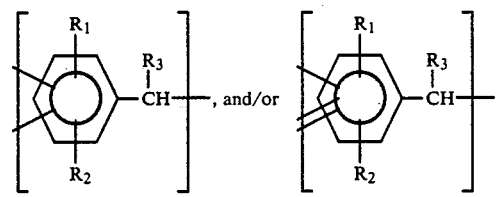

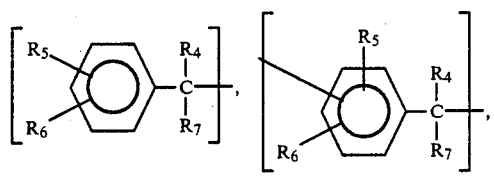

and/or

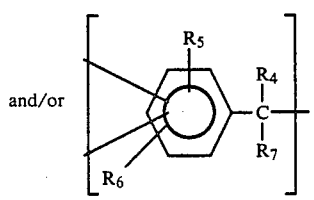

wherein $R_1$, $R_2$, $R_5$ and $R_6$ mean independently a hydrogen atom or a $C_{1-12}$ alkyl, aralkyl, aryl or cycloalkyl group, $R_3$ and $R_4$ denote independently a hydrogen atom or $CH_{1-4}$ Alkyl group, and $R_7$ stands for hydrogen atom or $-CH_2-R_8$ wherein $R_8$ is hydrogen atom or methyl group; or a multi-valent metal salt of said copolymer, in which at least one multi-valent metal atom forms said multi-valent metal salt between carboxyl groups within the same molecule of said copolymer or between carboxyl groups in different molecules of said copolymer.

2. The copolymer or multi-valent metal salt thereof as claimed in claim 1, wherein the proportions of said structural units (I), (II) and (III) are 5 to 40 mole percent, 60 to 95 percent and 0 mole percent respectively.

3. The copolymer or multi-valent metal salt thereof as claimed in claim 2, wherein $R_3$ in each structural unit (II) is a hydrogen atom.

4. The copolymer or multi-valent metal salt thereof as claimed in claim 3, wherein each structural unit (II) is a p-methylbenzyl group.

5. The copolymer or multi-valent metal salt thereof as claimed in claim 1, wherein the proportions of said structural units (I), (II) and (III) are 5 to 35 mole percent, 10 to 85 mole percent and 4 to 85 mole percent, respectively.

6. The copolymer or multi-valent metal salt in claim 5, wherein $R_4$ and $R_7$ in each structural formula (III) are individually a hydrogen atom.

7. The copolymer or multi-valent metal salt thereof as claimed in claim 5, wherein in each structural unit (III), $R_4$ means a hydrogen atom or methyl group, either one of $R_5$ and $R_6$ is a hydrogen atom and the other one is a hydrogen atom or a $C_{1-4}$ alkyl group, and $R_7$ denotes a methyl or ethyl group.

8. A color-developing agent for pressure-sensitive copying paper, which contains as an effective component the multi-valent metal salt of the copolymer according to claim 1.

9. The color-developing agent as claimed in claim 8, wherein said at least one multi-valent metal atom is a metal atom selected from the group consisting of magnesium, aluminum, copper, zinc, tin, barium, cobalt and nickel atoms.

10. The color-developing agent as claimed in claim 9, wherein said at least one multi-valent metal atom is a zinc atom.

11. A color-developing agent for pressure-sensitive copying paper, which contains as an effective component the multi-valent metal salt of the copolymer according to claim 2.

12. A color-developing agent for pressure-sensitive copying paper, which contains as an effective component the multi-valent metal salt of the copolymer according to claim 3.

13. A color-developing agent for pressure-sensitive copying paper, which contains as an effective component the multi-valent metal salt of the copolymer according to claim 4.

14. A color-developing agent for pressure-sensitive copying paper, which contains as an effective component the multi-valent metal salt of the copolymer according to claim 5.

15. A color-developing agent for pressure-sensitive copying paper, which contains as an effective component the multi-valent metal salt of the copolymer according to claim 6.

16. A color-developing agent for pressure-sensitive copying paper, which contains as an effective component the multi-valent metal salt of the copolymer according to claim 7.

17. A process for the production of the copolymer according to claim 2, which comprises condensing (i) salicylic acid with (ii) a benzyl alcohol and/or (iii) a benzyl ether or with (iii') a dibenzyl ether, both, represented by the following general formula (IV):

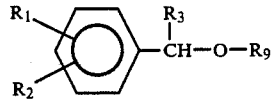

(IV)

wherein $R_1$ and $R_2$ may be the same or different and mean individually a hydrogen atom or a $C_{1-12}$ alkyl, aralkyl, aryl or cycloalkyl group, $R_3$ denotes a hydrogen atom or a $C_{1-4}$ alkyl group, and $R_9$ stands for a hydrogen atom, a $C_{1-4}$ alkyl group or

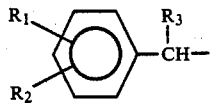

wherein $R_1$, $R_2$ and $R_3$ have the same meaning as defined above, at 100° to 240° C., in the presence of an acid catalyst, and at a molar ratio of the benzyl alcohol (ii) and/or benzyl ether (iii) to the salicylic acid (i) of 2 to 30 and the dibenzyl ether (iii') to the salicylic acid (i) of 1 to 15.

18. The production process as claimed in claim 17, wherein the benzyl ether (iii) is a p-methylbenzyl alkyl ether.

19. The production process as claimed in claim 17, wherein in the general formula (IV), $R_3$ means a hydrogen atom and $R_9$ denotes a $C_{1-4}$ alkyl group.

20. The production process as claimed in claim 17, wherein in the general formula (IV), $R_3$ and $R_9$ mean independently a $C_{1-4}$ alkyl group.

21. The production process as claimed in claim 17, wherein in the general formula (IV), $R_3$ means a hydrogen atom or a $C_{1-4}$ alkyl group and $R_9$ denotes

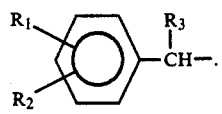

22. The production process as claimed in claim 17, wherein $R_9$ in the general formula (IV) is a hydrogen atom.

23. A process for the production of the copolymer according to claim 2, which comprises reacting (i) salicylic acid with (iv) a benzyl halide represented by the following general formula (V):

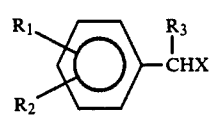

(V)

wherein $R_1$ and $R_2$ mean independently a hydrogen atom or a $C_{1-12}$ alkyl, aralkyl, aryl or cycloalkyl group, $R_3$ stands for a hydrogen atom or a $C_{1-4}$ alkyl group, and X denotes a halogen atom, at 50° to 160° C., in the presence of at least one acid catalyst and at a benzyl halide (iv)/salicylic acid (i) molar ratio of 2 to 30.

24. A process for the production of the copolymer according to claim 5, which comprises reacting (v) a benzyl halide, which is represented by the following general formula (VI):

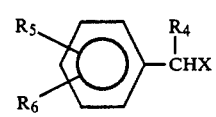

(VI)

wherein $R_4$ stands for a hydrogen atom or a $C_{1-4}$ alkyl group, $R_5$ and $R_6$ mean independently a hydrogen atom or a $C_{1-12}$ alkyl, aralkyl, aryl or cycloalkyl group, and X denotes a halogen atom, with a co-condensation resin, which has in turn been obtained by reacting in the presence of at least one acid catalyst (i) salicylic acid and (ii) a benzyl alcohol and/or (iii) a benzyl ether, both, represented by the following general formula (IV):

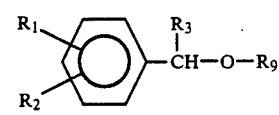

(IV)

wherein $R_1$ and $R_2$ may be the same or different and mean individually a hydrogen atom or a $C_{1-12}$ alkyl, aralkyl, aryl or cycloalkyl group, $R_3$ denotes a hydrogen atom or a $C_{1-4}$ alkyl group, and $R_9$ stands for a hydrogen atom, a $C_{1-4}$ alkyl group or

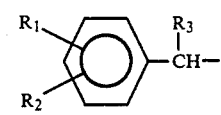

wherein $R_1$, $R_2$ and $R_3$ have the same meaning as defined above in the presence of an acid catalyst, at 50°–160° C. and a benzyl halide (v)/salicylic acid (i) molar ratio of 0.2 to 20.

25. A process for the production of the copolymer according to claim 7, which comprises reacting (vi) a styrene derivative, which is represented by the following general formula (VII):

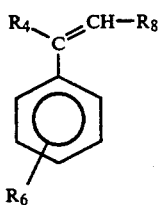

(VII)

wherein $R_4$ and $R_8$ mean independently a hydrogen atom or a methyl group and $R_6$ denotes a hydrogen atom or a $C_{1-4}$ alkyl group, with a co-condensation resin, which has in turn been obtained by reacting in the presence of at least one acid catalyst (i) salicylic acid and (ii) a benzyl alcohol and/or (iii) a benzyl ether, both, represented by the following general formula (IV):

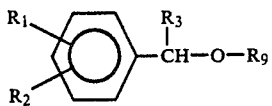

(IV)

wherein $R_1$ and $R_2$ may be the same or different and mean independently a hydrogen atom or a $C_{1-12}$ alkyl, aralkyl, aryl or cycloalkyl group, $R_3$ denotes a hydrogen atom or a $C_{1-4}$ alkyl group, and $R_9$ stands for a hydrogen atom, a $C_{1-4}$ alkyl group or

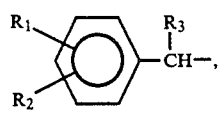

in the presence of at least one acid catalyst, at 0° to 120° C. and a styrene derivative (vi)/salicylic acid (i) molar ratio of 0.2 to 20.

26. A process for the preparation of a color-developing agent for pressure-sensitive copying paper, which is the following process (a), (b) or (c):
   (a) (i) dispersing and dissolving at 0° to 100° C. the copolymer according to claim 1 in an aqueous solution, alcohol solution or water-alcohol solution which contains the hydroxide or carbonate or an alkoxide of an alkali metal in an amount equivalent to or more than the carboxyl groups in the copolymer, thereby obtaining a substantial solution of an alkali salt of the copolymer; and
      (ii) adding and reacting at 0° to 100° C. a water-soluble multi-valent metal salt in an amount of 0.5 to 1 gram equivalent based on the carboxyl groups in the copolymer either as is or in the form of an aqueous solution, alcohol solution or water-alcohol solution to the substantial solution of the alkali salt of the copolymer, thereby obtaining the metal salt of the copolymer as a precipitate;
   (b) (i) heating, melting and reacting at 100° to 180° C. the copolymer according to claim 1 and a multi-valent metal salt of an organic carboxylic acid in such an amount that the multi-valent metal salt contains the multi-valent metal in an amount of 1 to 20 weight percent of the weight of the copolymer, optionally in the co-presence of an inorganic basic salt; and
      (ii) cooling the reaction mixture to obtain a molten mixture containing the metal salt of the copolymer; or
   (c) (i) heating, melting and reacting the copolymer according to claim 1, the carbonate, oxide or hydroxide of a multi-valent metal in such an amount that the carbonate, oxide or hydroxide contains the multi-valent metal in an amount of 1 to 20 weight percent of the weight of the copolymer and an organic basic salt in an amount equivalent to 1 to 15 weight percent of the weight of the copolymer; and
      (ii) cooling the reaction mixture to obtain a molten mixture containing the metal salt of the copolymer.

27. The preparation process as claimed in claim 26, wherein the multi-valent metal is at least one metal selected from the group consisting of magnesium, aluminum, copper, zinc, tin, barium, cobalt and nickel.

28. The preparation process as claimed in claim 27, wherein the multi-valent metal is zinc.

* * * * *

UNITED STATES PATENT AND TRADEMARK OFFICE
CERTIFICATE OF CORRECTION

PATENT NO. : 5,023,366
DATED : June 11, 1991
INVENTOR(S) : YAMAGUCHI et al

It is certified that error appears in the above-indentified patent and that said Letters Patent is hereby corrected as shown below:

Column 63, Claim 1, line 3, after "units" insert --(II) and 0 to 85 mole percent of structural units--.

Signed and Sealed this

Twelfth Day of July, 1994

Attest:

BRUCE LEHMAN

Attesting Officer    Commissioner of Patents and Trademarks